June 21, 1966 E. C. MONTGOMERY ETAL 3,257,187
PRODUCTION OF MULTIPLE GLASS SHEET GLAZING UNITS
Filed March 9, 1960 32 Sheets-Sheet 2
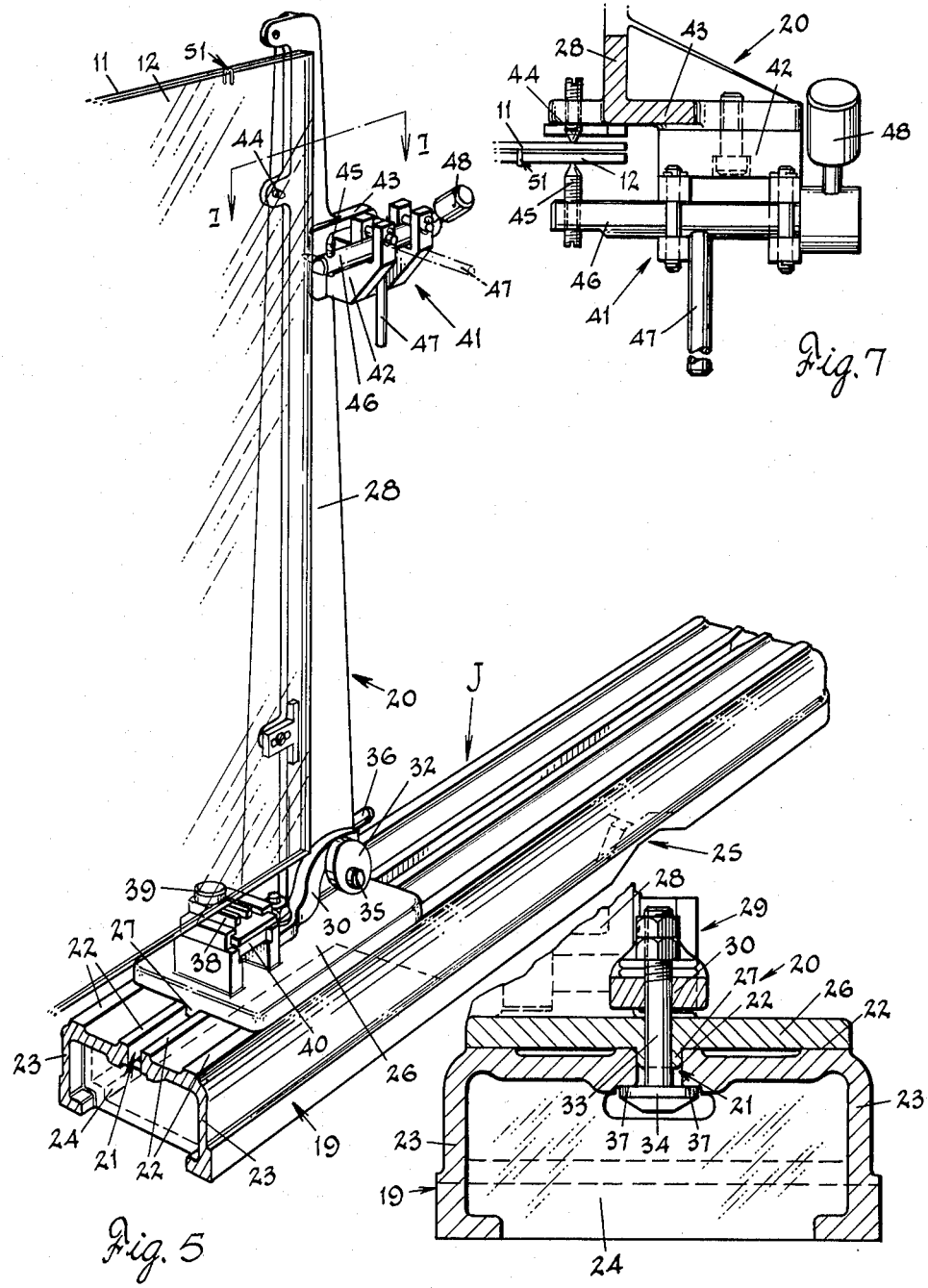
INVENTORS
Edwin C. Montgomery,
Harry N. Dean and
BY Charles H. Cowley
Nobbe & Swope
ATTORNEYS

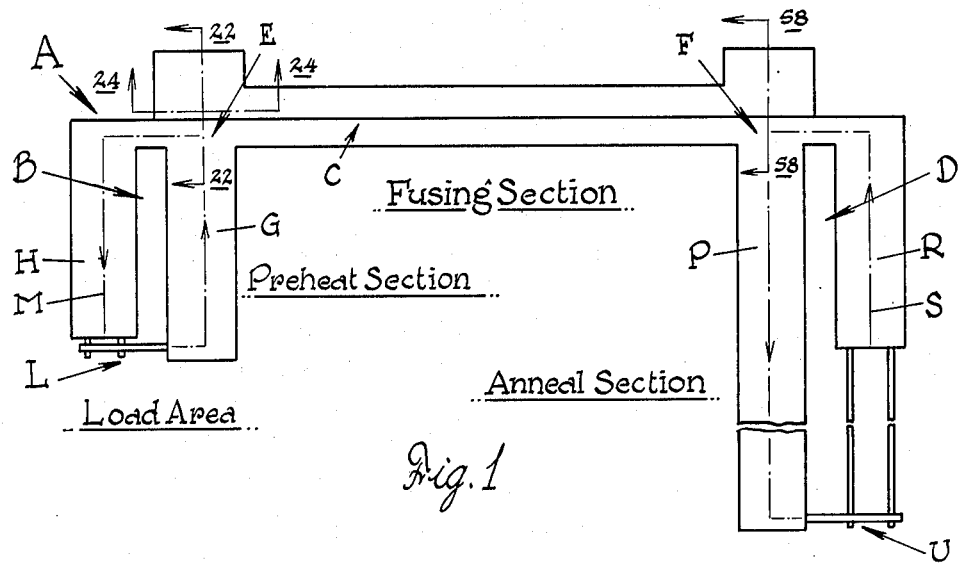
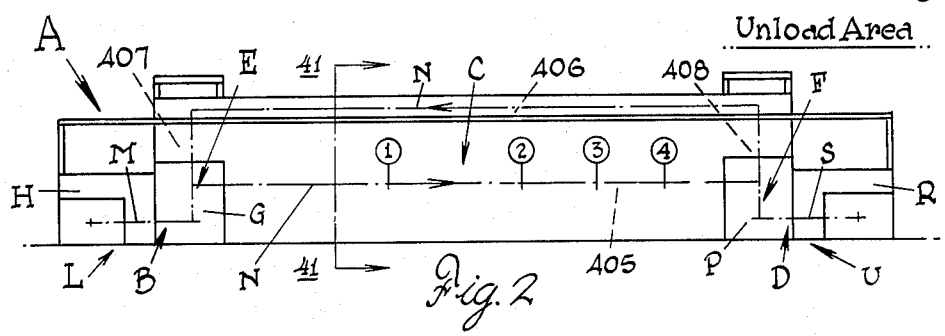
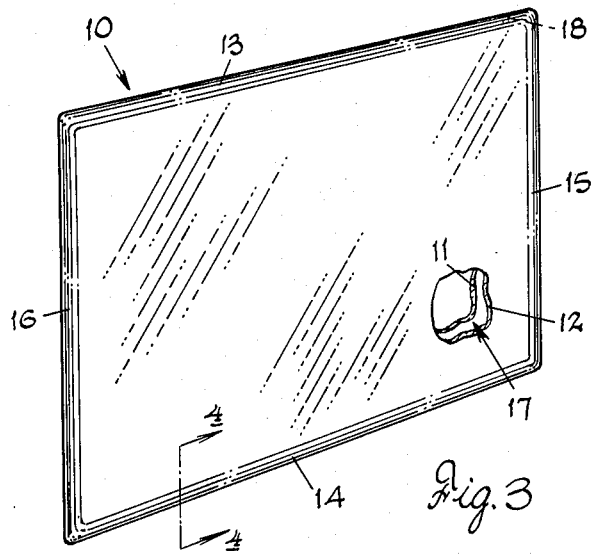
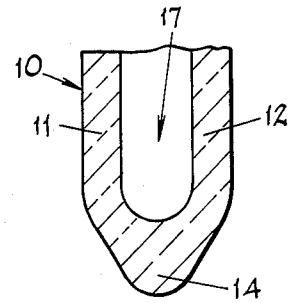

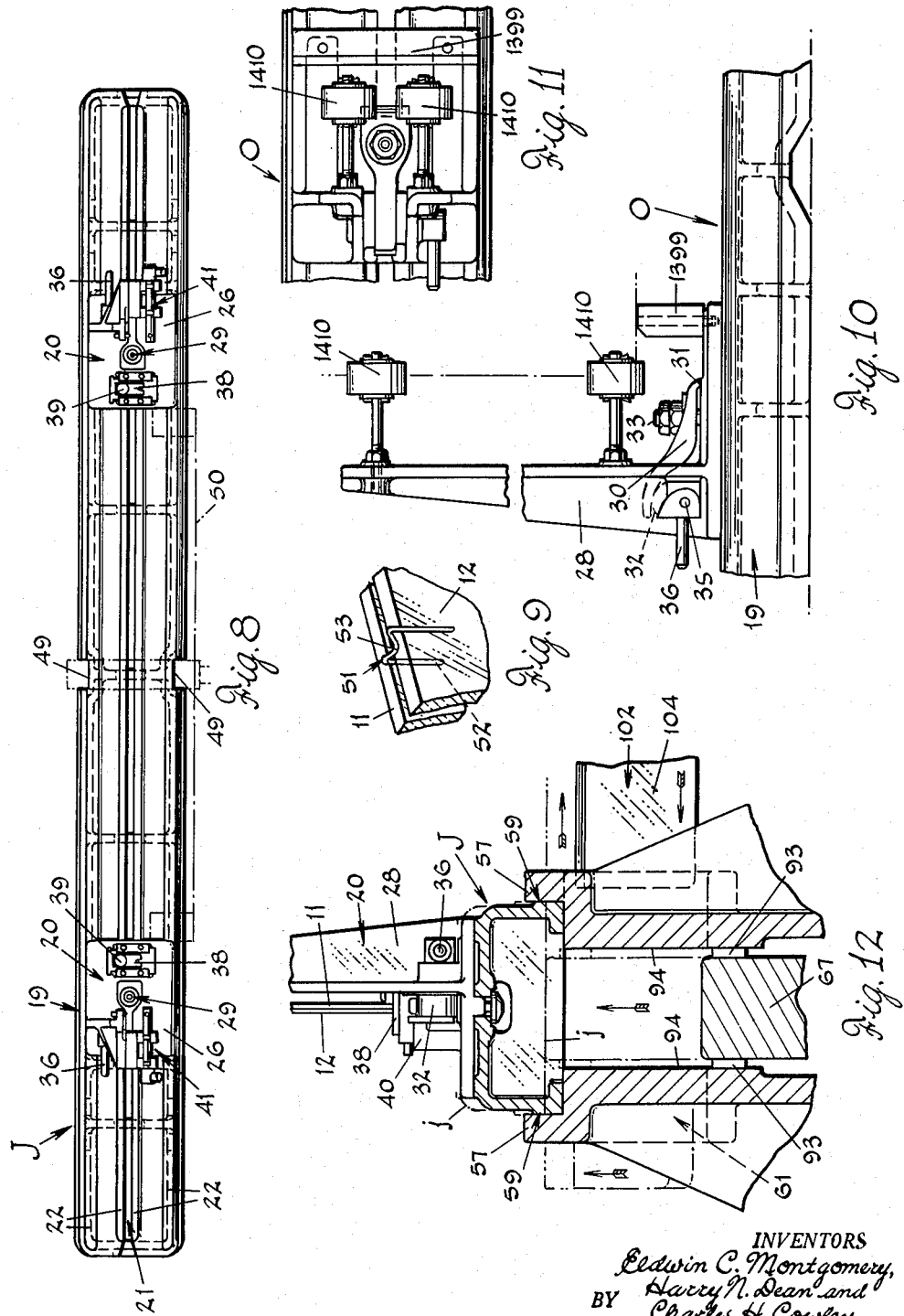

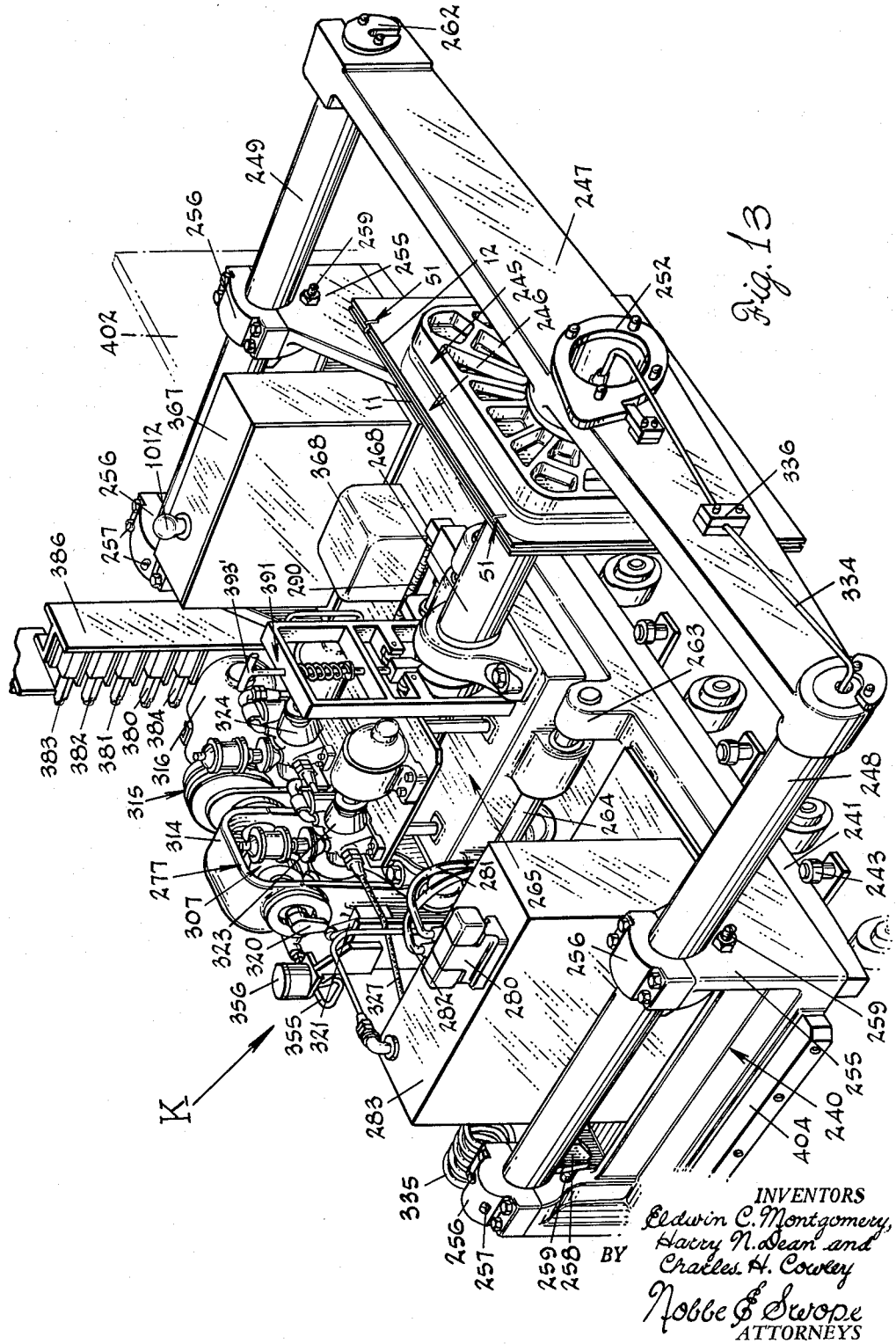

June 21, 1966  E. C. MONTGOMERY ETAL  3,257,187
PRODUCTION OF MULTIPLE GLASS SHEET GLAZING UNITS
Filed March 9, 1960  32 Sheets-Sheet 5
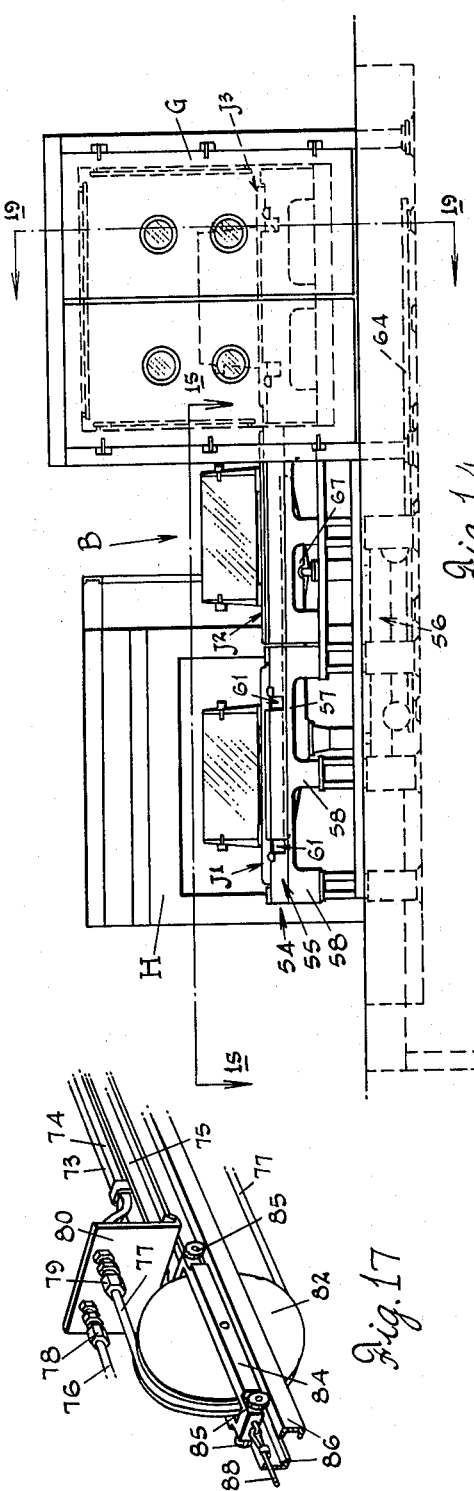
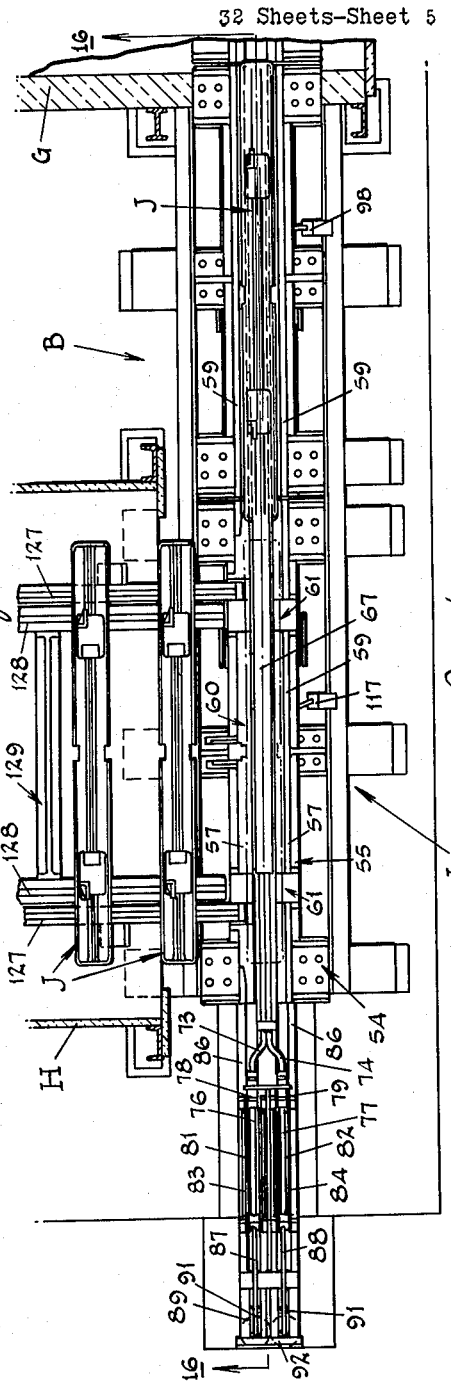
INVENTORS
Edwin C. Montgomery,
Harry N. Dean and
BY Charles H. Cowley
Nobbe & Swope
ATTORNEYS

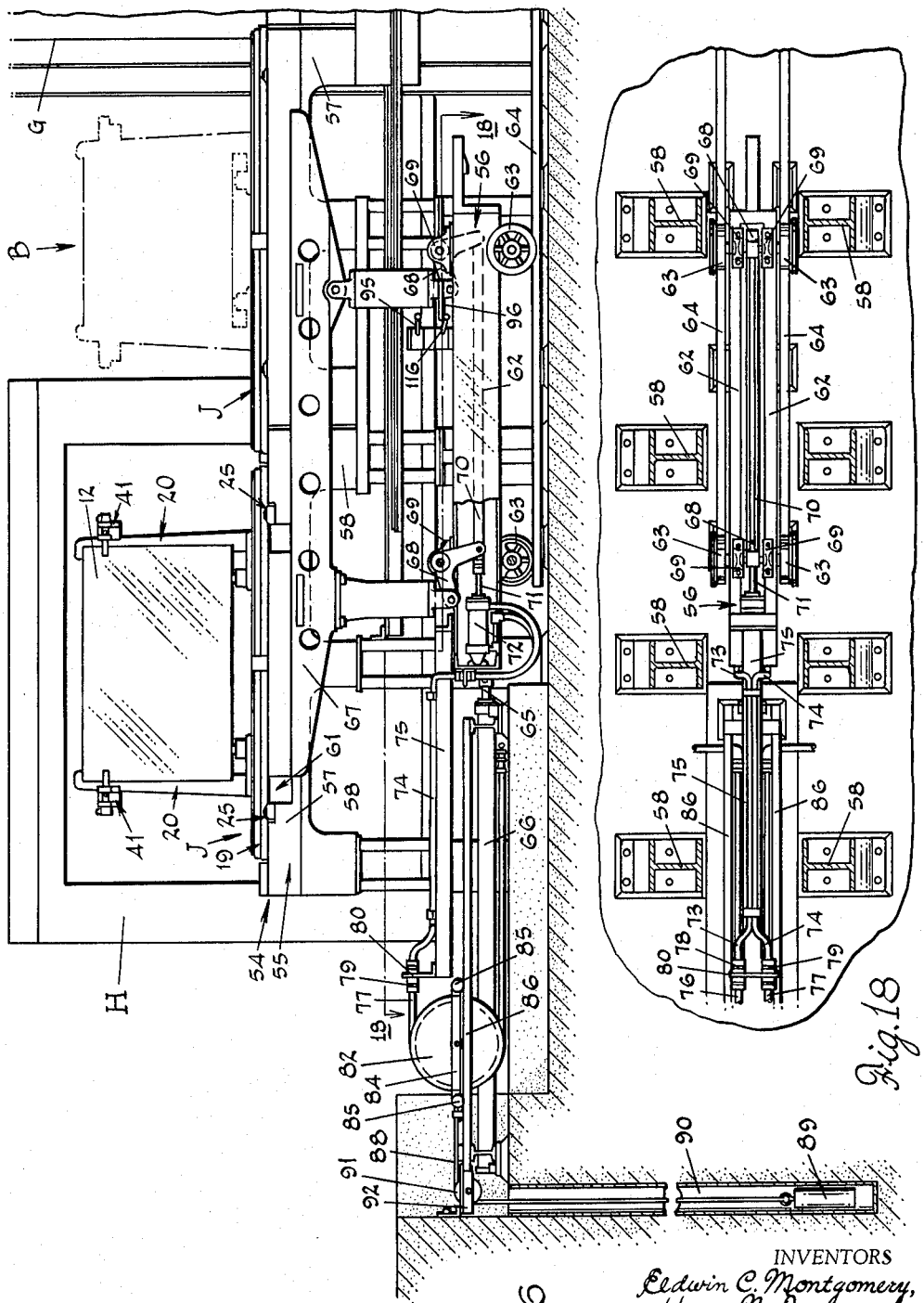

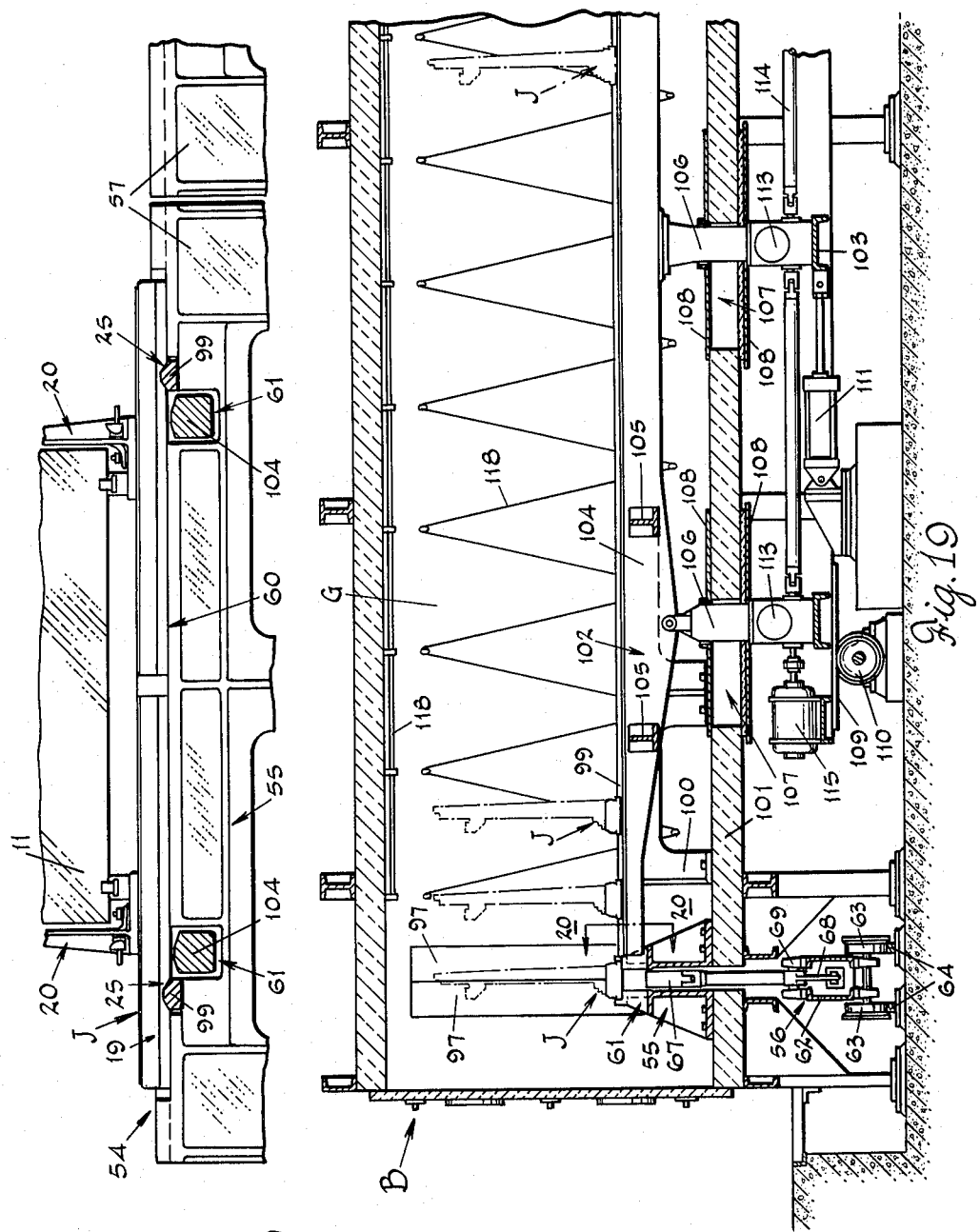

June 21, 1966  E. C. MONTGOMERY ETAL  3,257,187
PRODUCTION OF MULTIPLE GLASS SHEET GLAZING UNITS
Filed March 9, 1960  32 Sheets-Sheet 8
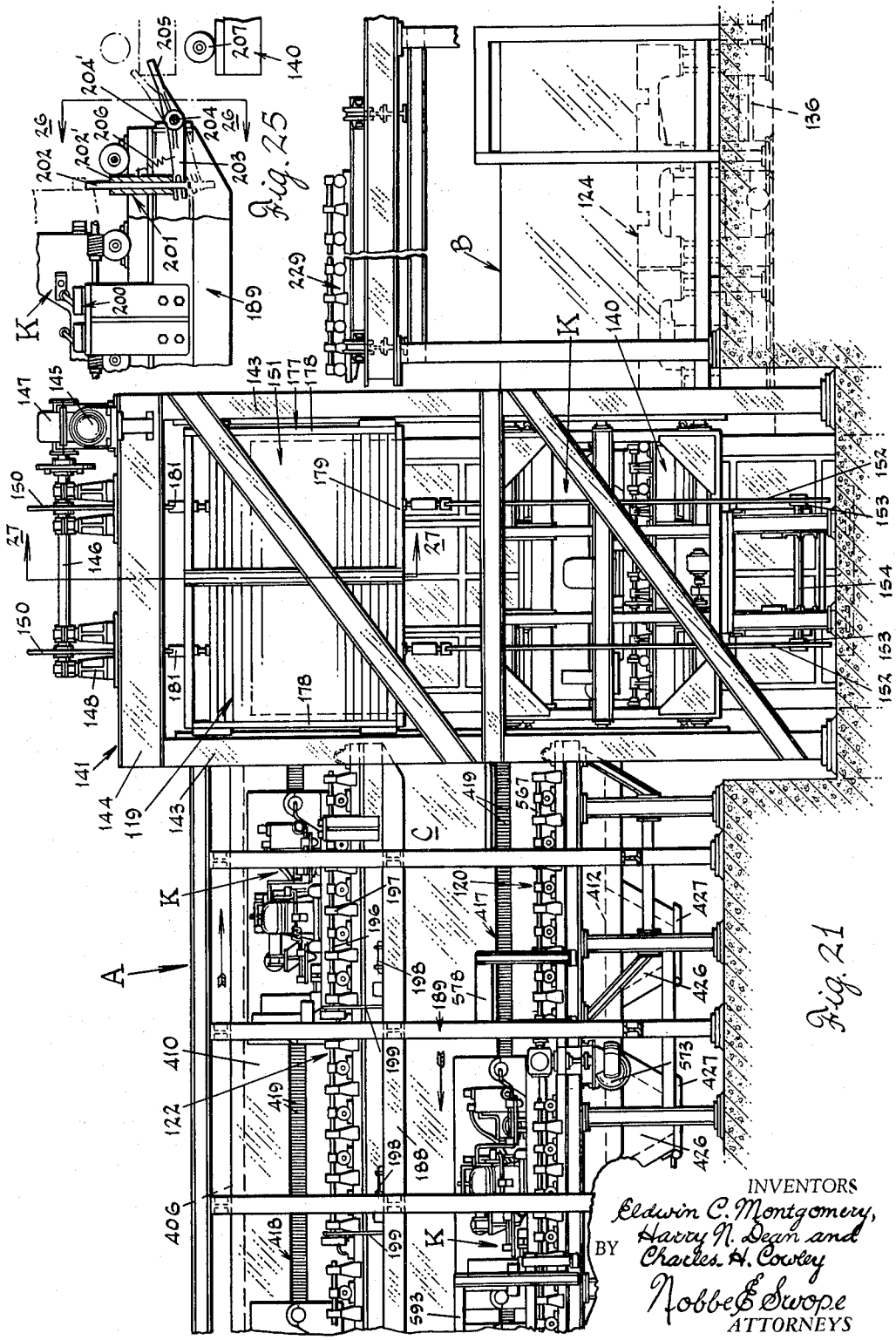
INVENTORS
Eldwin C. Montgomery,
Harry N. Dean and
BY Charles H. Cowley
Nobbe & Swope
ATTORNEYS

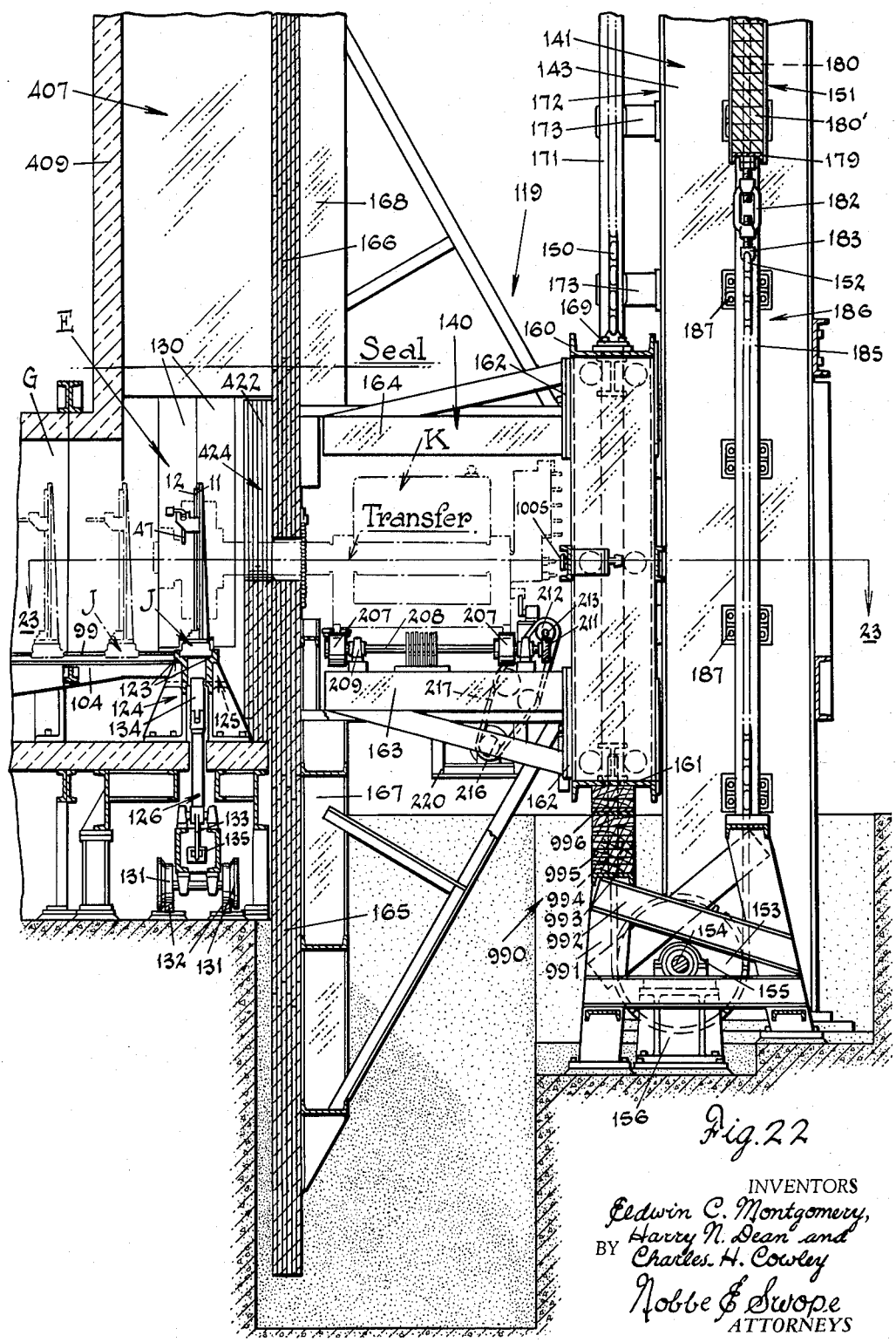

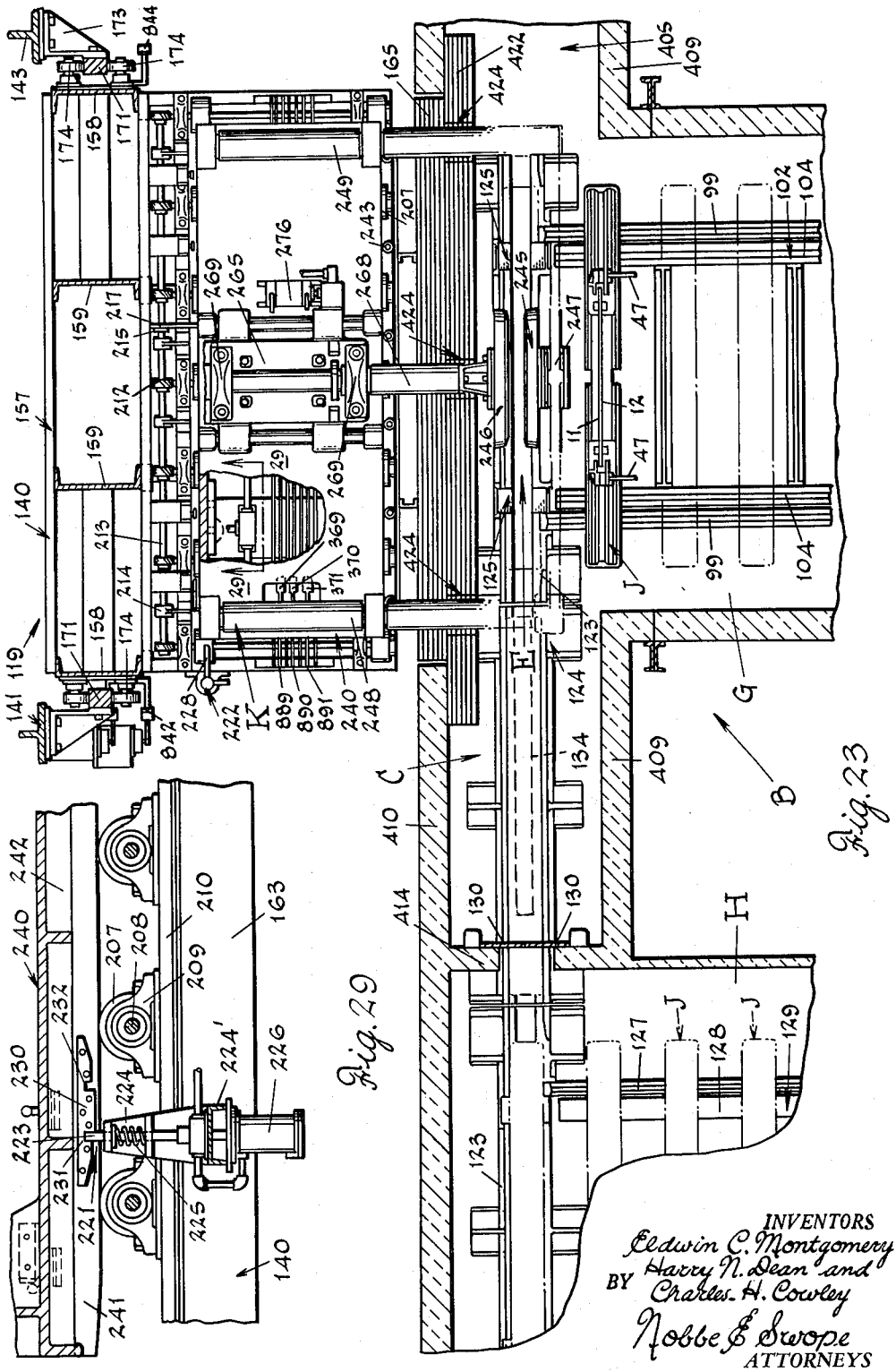

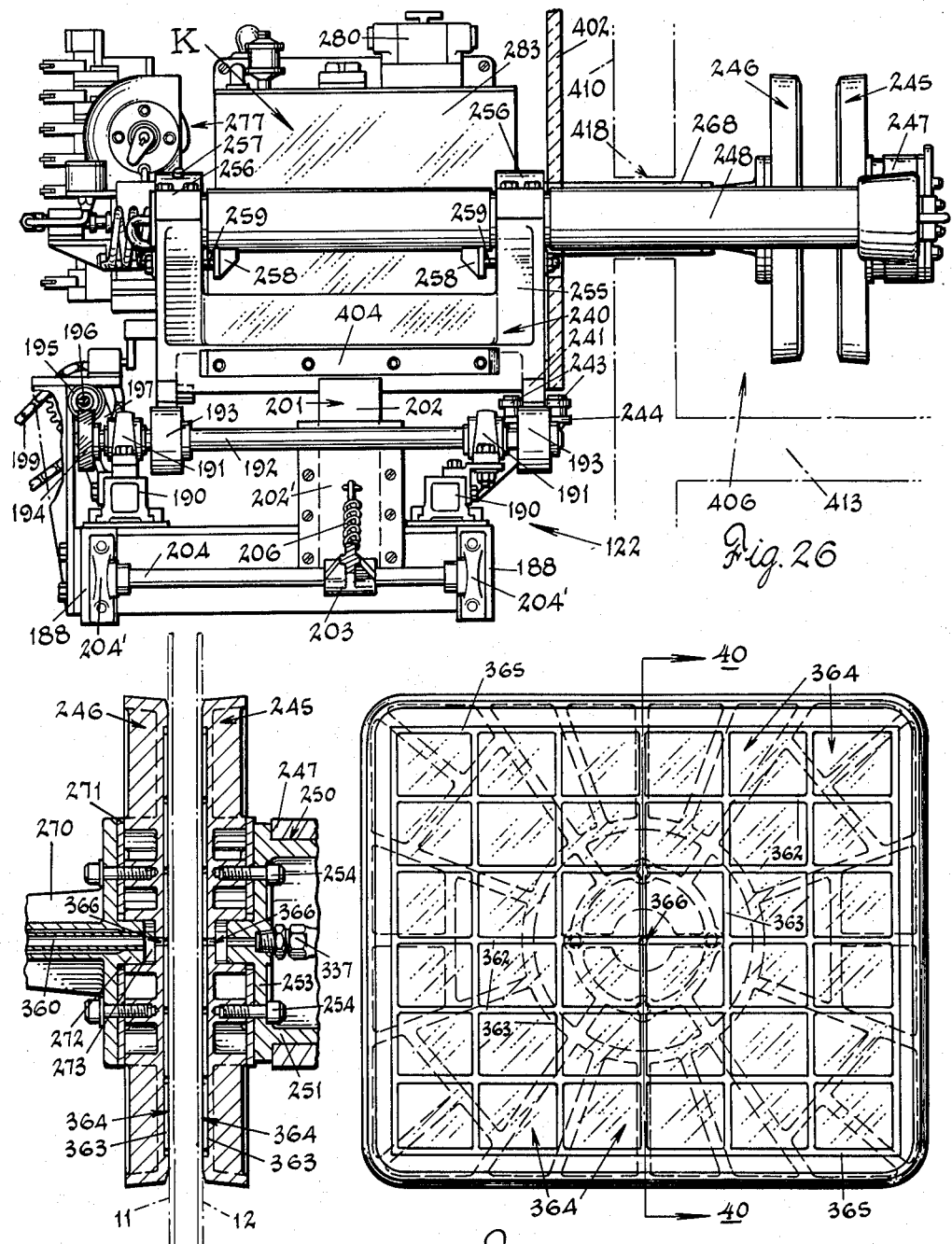

June 21, 1966  E. C. MONTGOMERY ETAL  3,257,187
PRODUCTION OF MULTIPLE GLASS SHEET GLAZING UNITS
Filed March 9, 1960  32 Sheets-Sheet 13
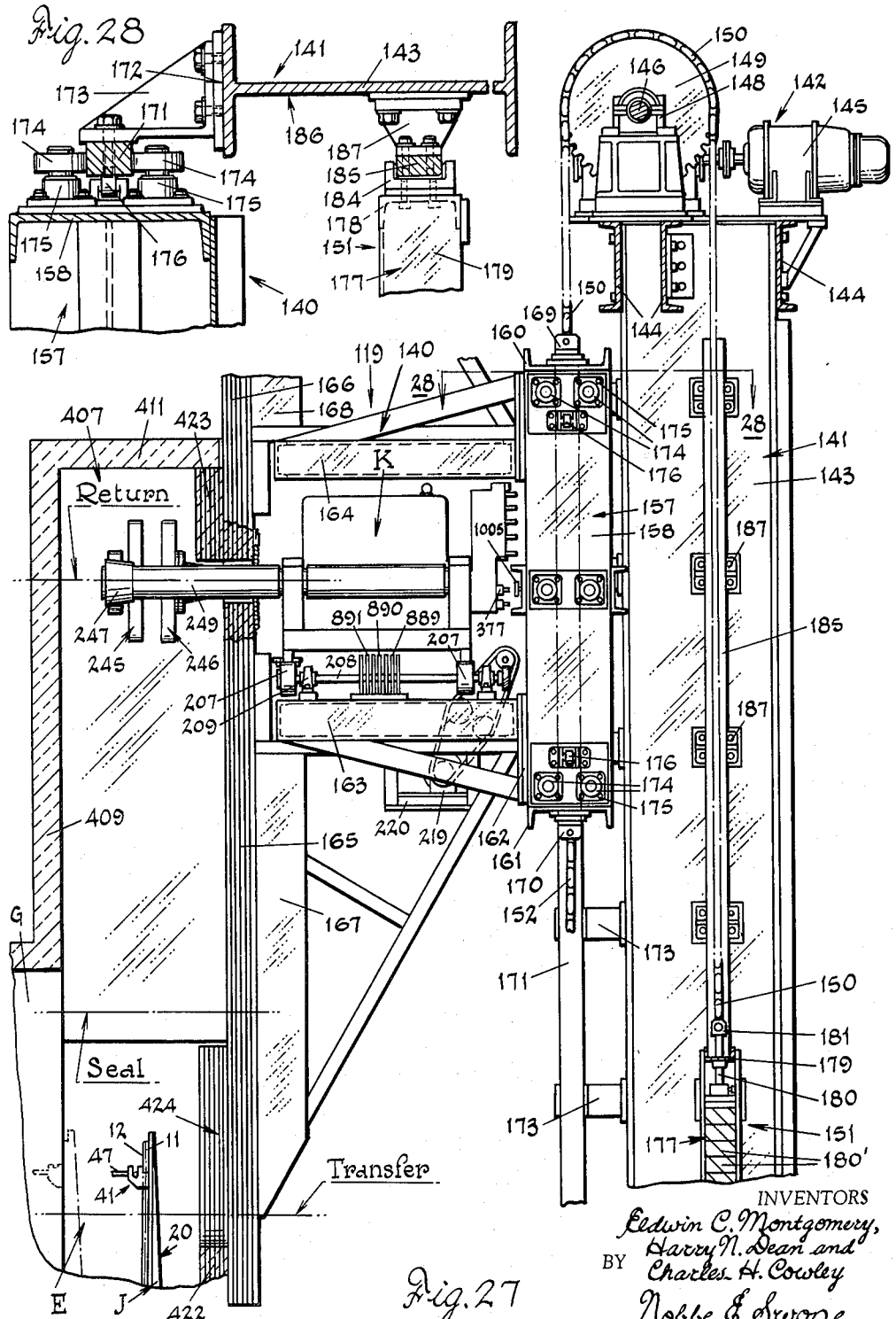
INVENTORS
Edwin C. Montgomery,
Harry N. Dean and
BY Charles H. Cowley
Nobbe & Swope
ATTORNEYS

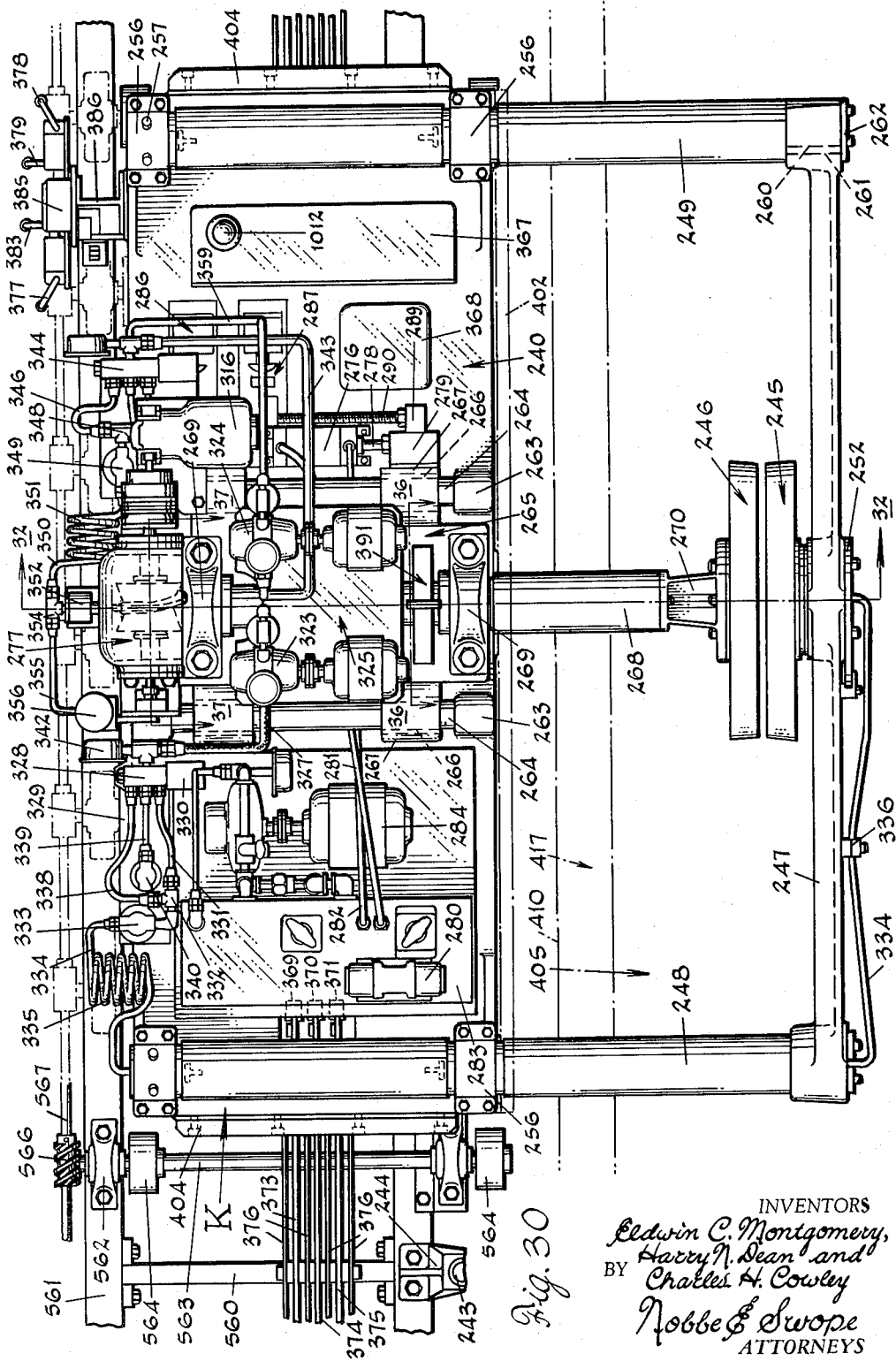

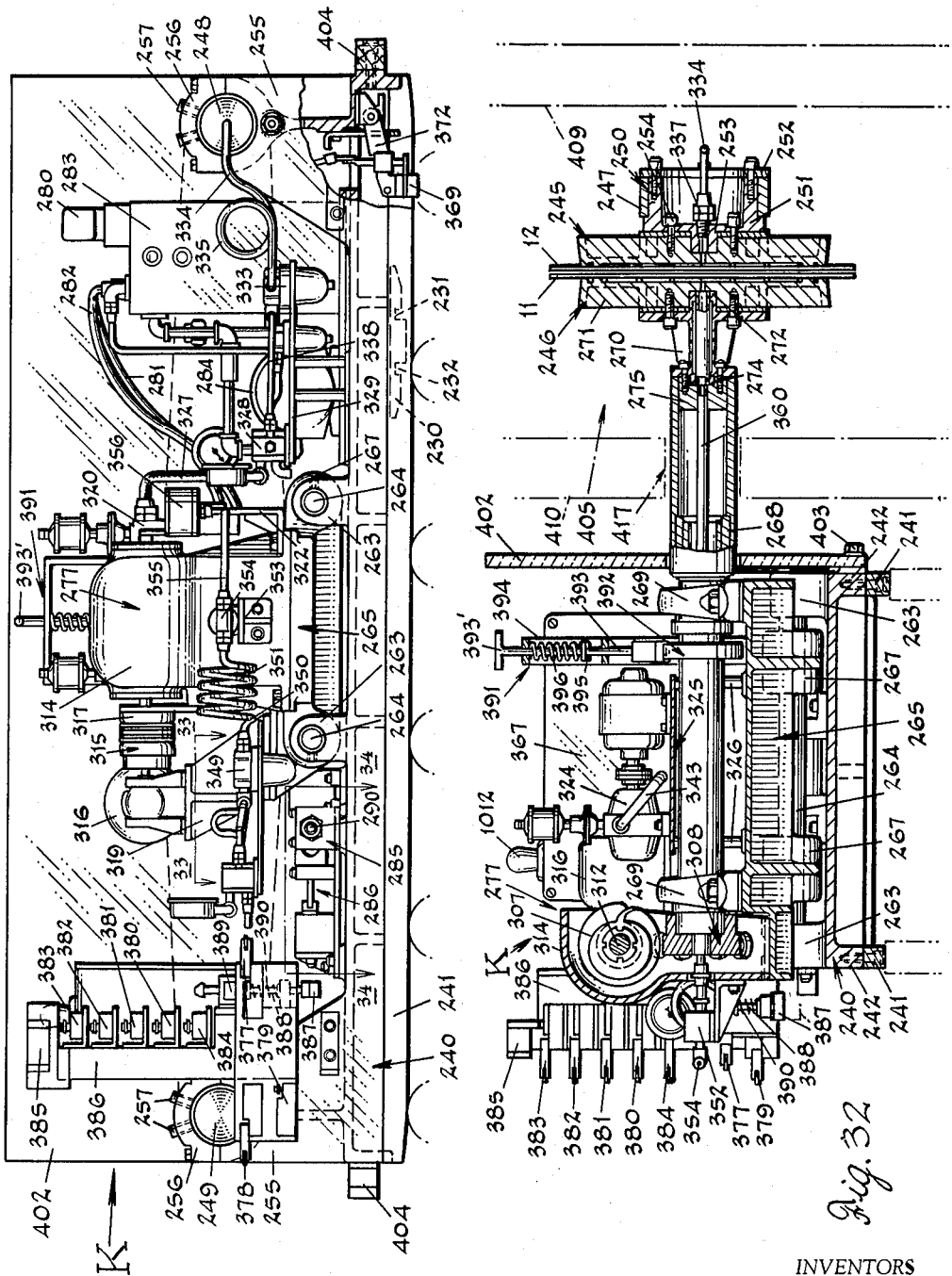

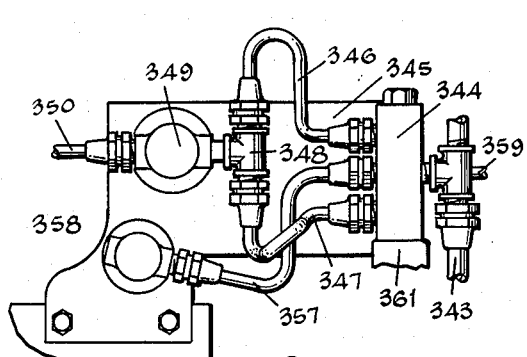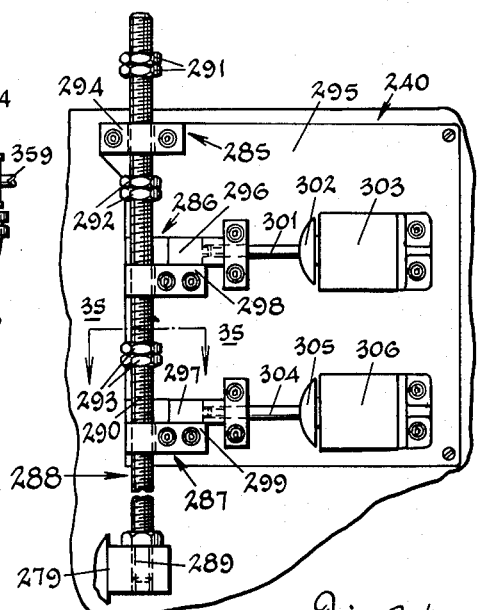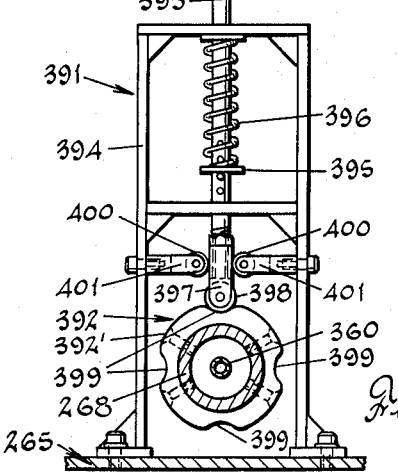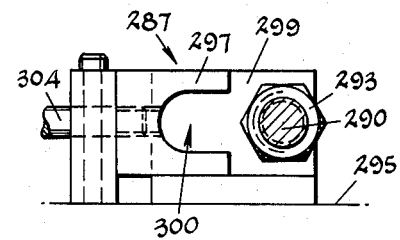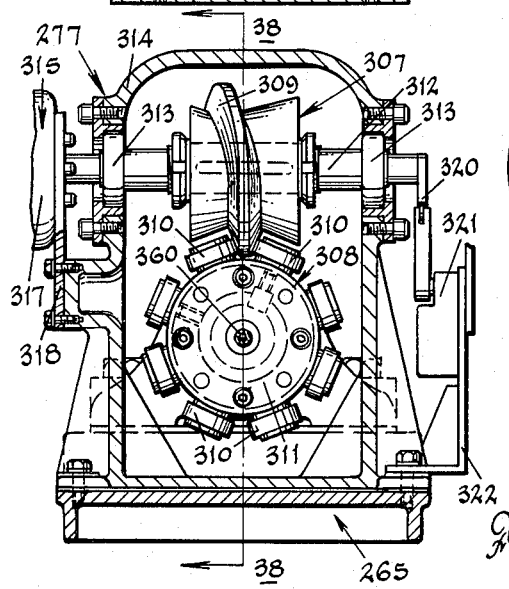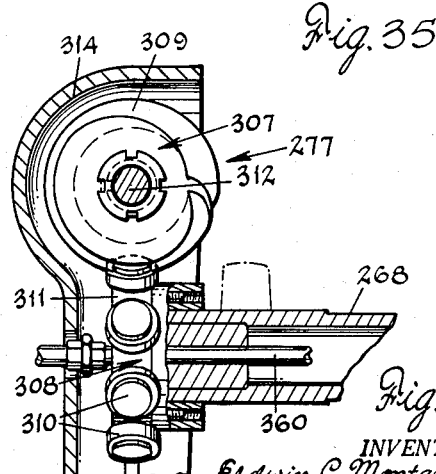

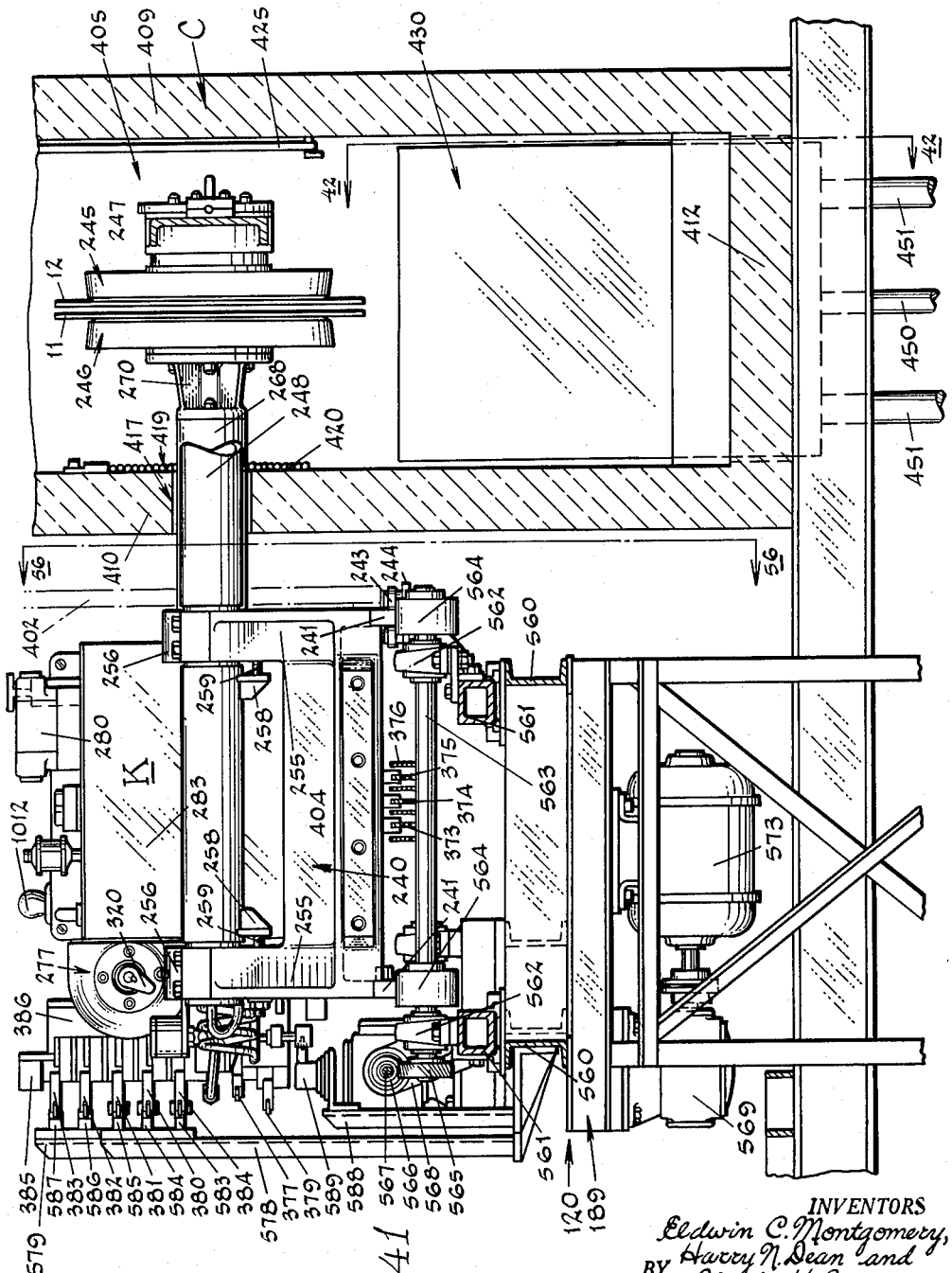

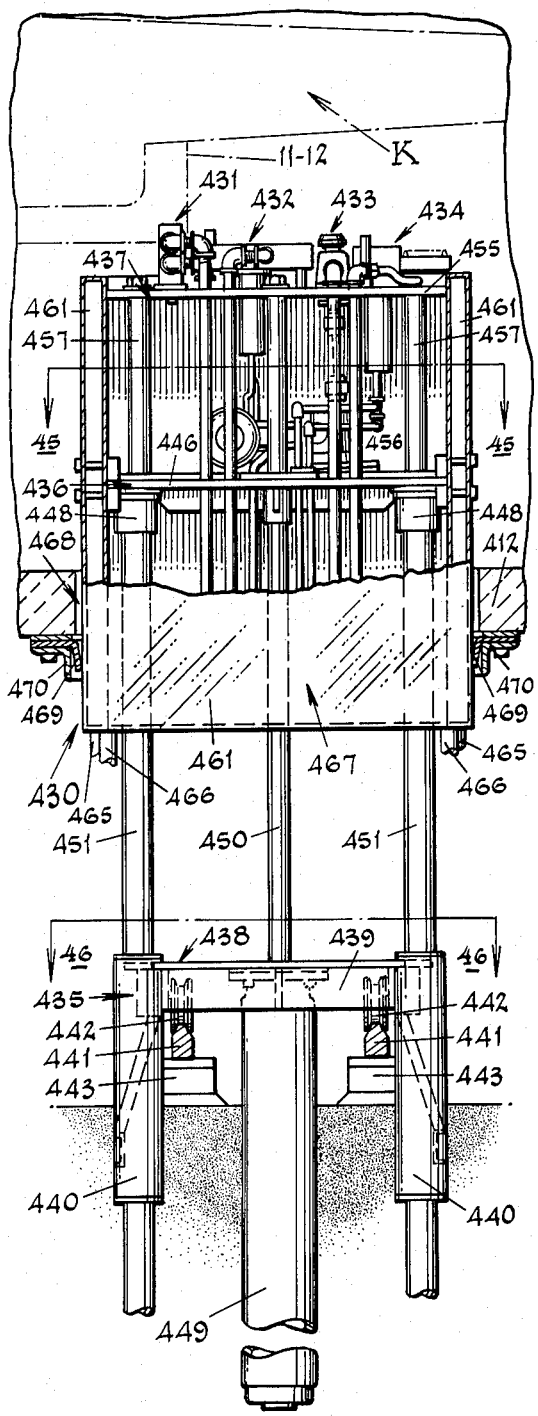
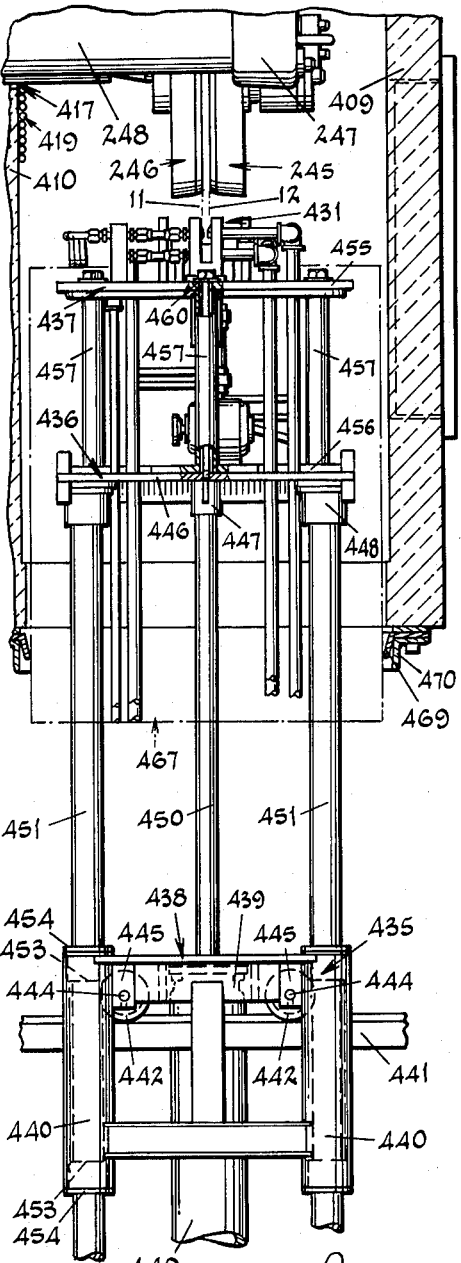
Fig. 42
Fig. 43
INVENTORS
Edwin C. Montgomery,
Harry N. Dean and
Charles H. Cowley
BY Nobbe & Swope
ATTORNEYS

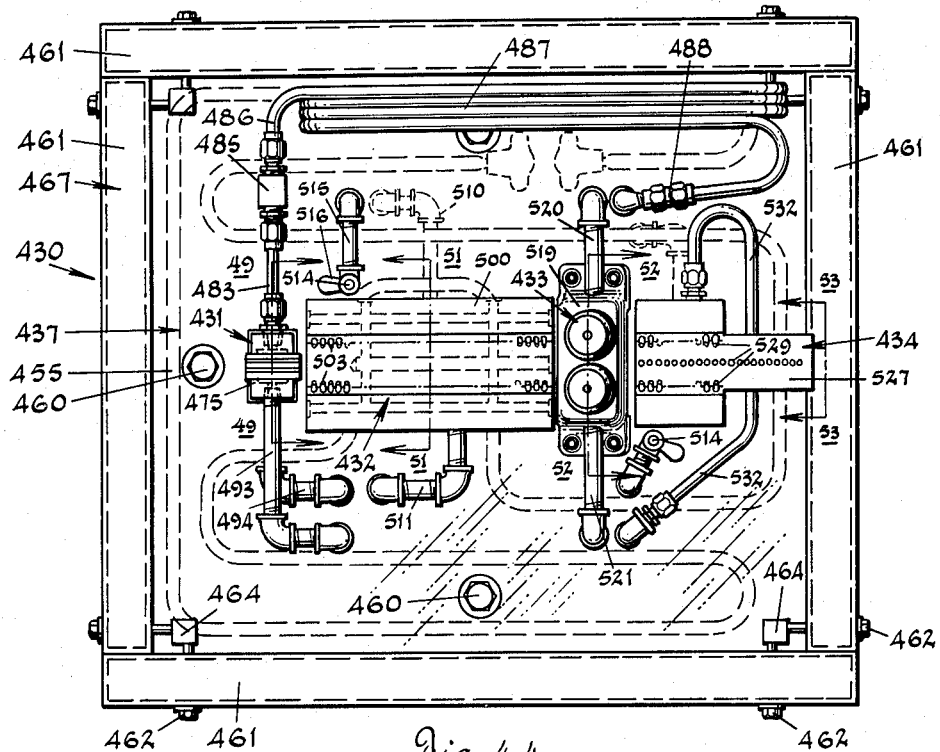
Fig. 44
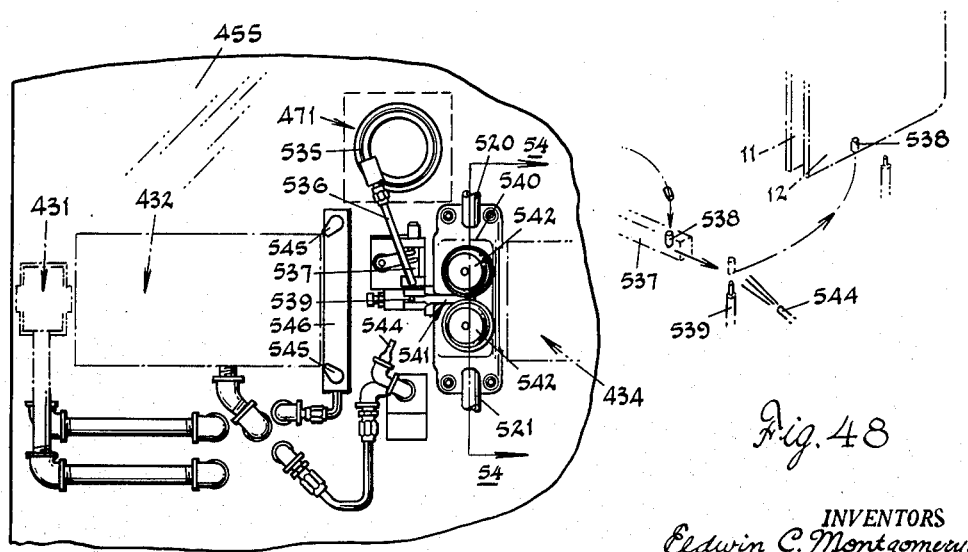
Fig. 47
Fig. 48
INVENTORS
Edwin C. Montgomery,
BY Harry N. Dean and
Charles H. Cowley
Nobbe & Swope
ATTORNEYS June 21, 1966  E. C. MONTGOMERY ETAL  3,257,187
PRODUCTION OF MULTIPLE GLASS SHEET GLAZING UNITS
Filed March 9, 1960  32 Sheets-Sheet 20

INVENTORS
Edwin C. Montgomery,
BY Harry N. Dean and
Charles H. Cowley
Nobbe & Swope
ATTORNEYS

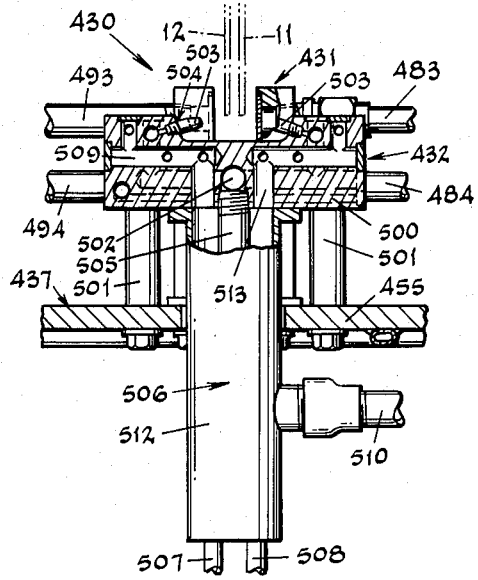
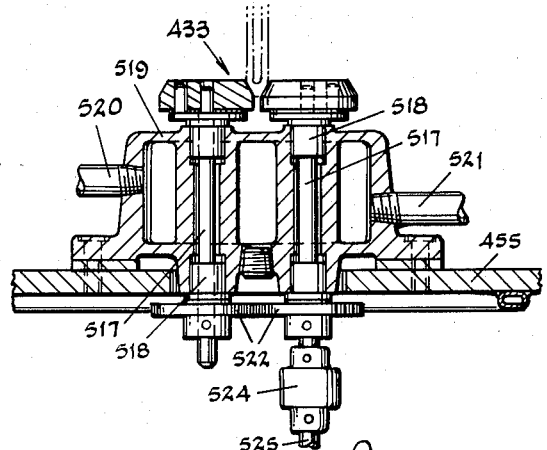
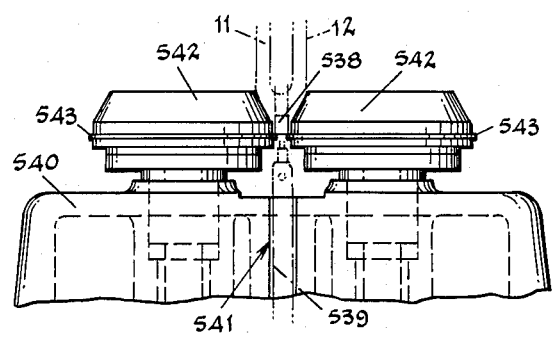
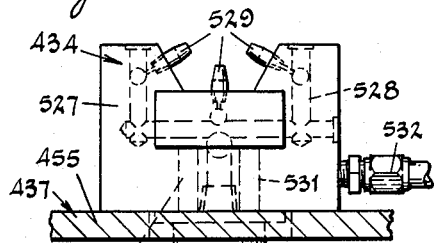
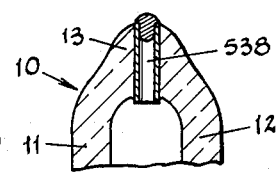
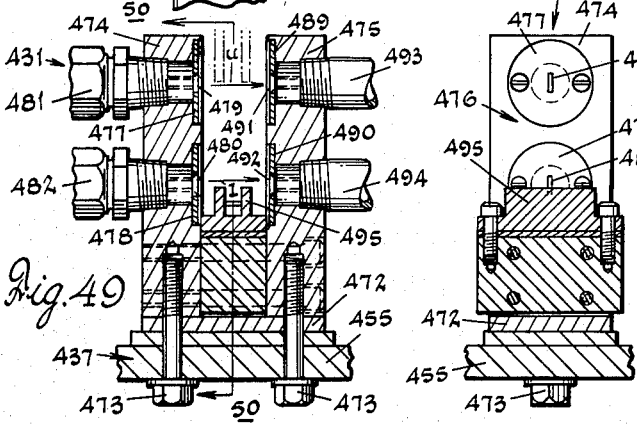

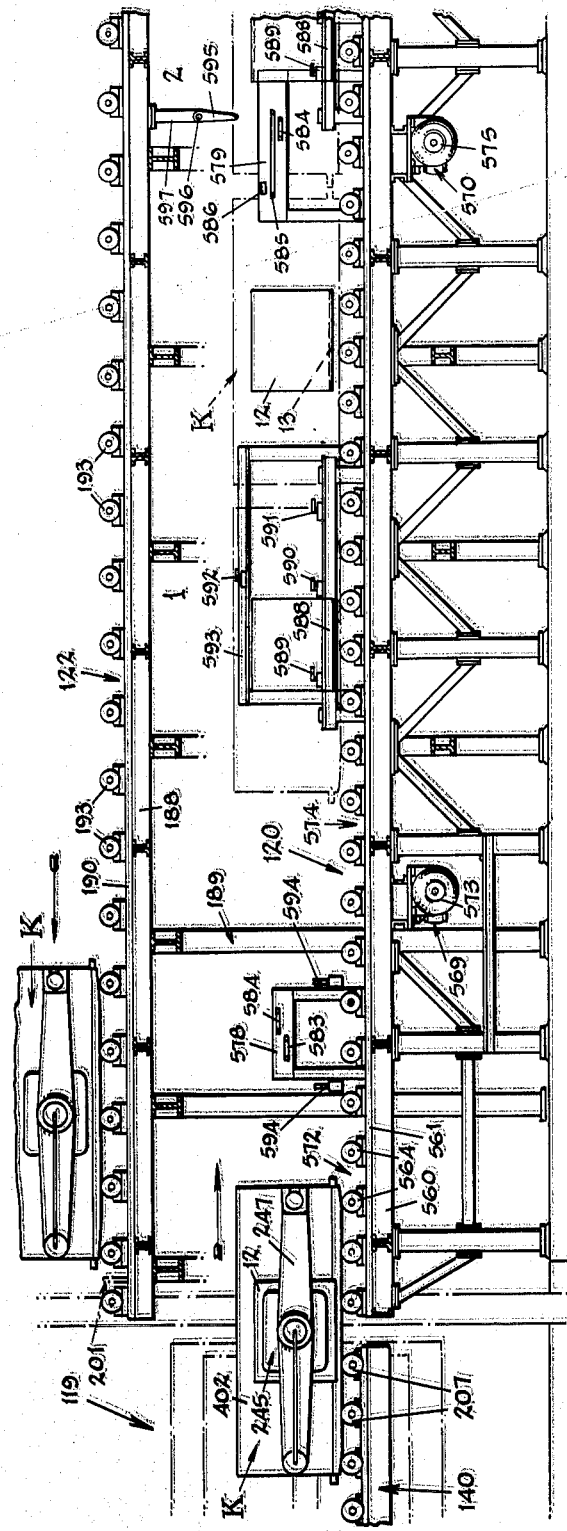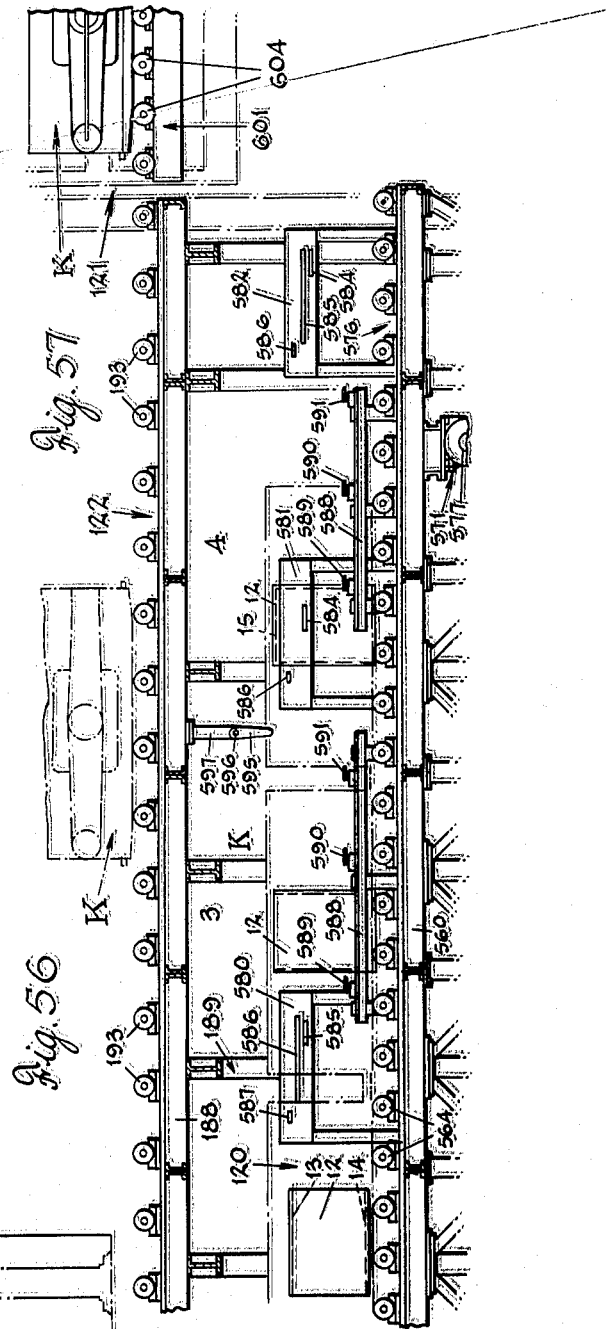

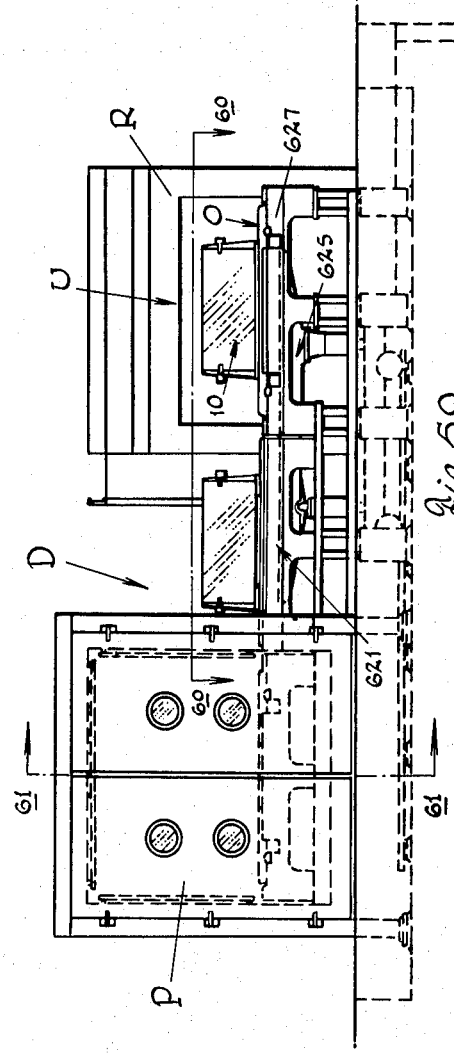
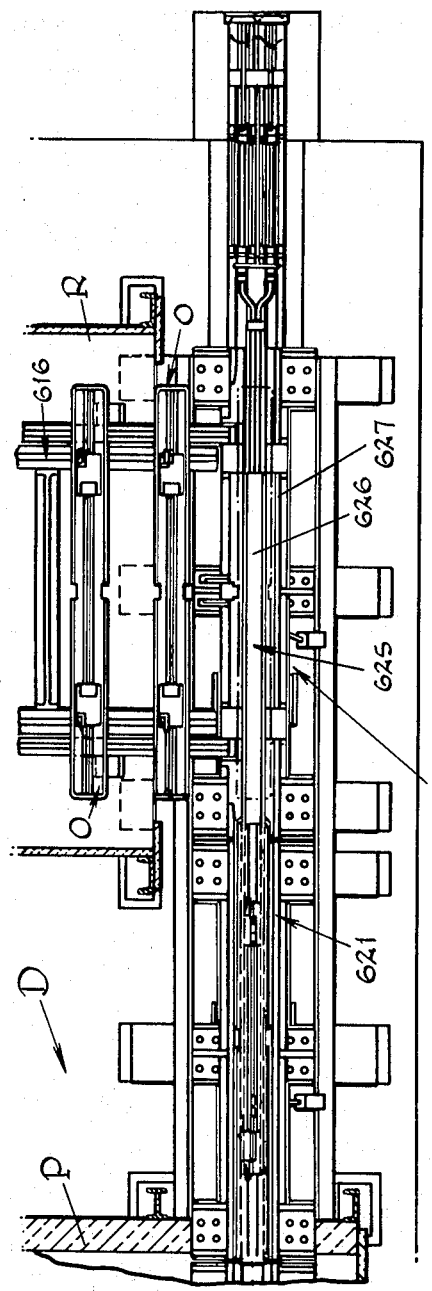

June 21, 1966  E. C. MONTGOMERY ETAL  3,257,187
PRODUCTION OF MULTIPLE GLASS SHEET GLAZING UNITS
Filed March 9, 1960  32 Sheets-Sheet 25

INVENTORS
Edwin C. Montgomery,
BY Harry N. Dean and
Charles H. Cowley
Nobbe & Swope
ATTORNEYS INVENTORS
Eldwin C. Montgomery,
Harry N. Dean and
BY Charles H. Cowley
Nobbe & Swope
ATTORNEYS INVENTORS
Edwin C. Montgomery,
Harry N. Dean and
Charles H. Cowley
BY Nobbe & Swope
ATTORNEYS

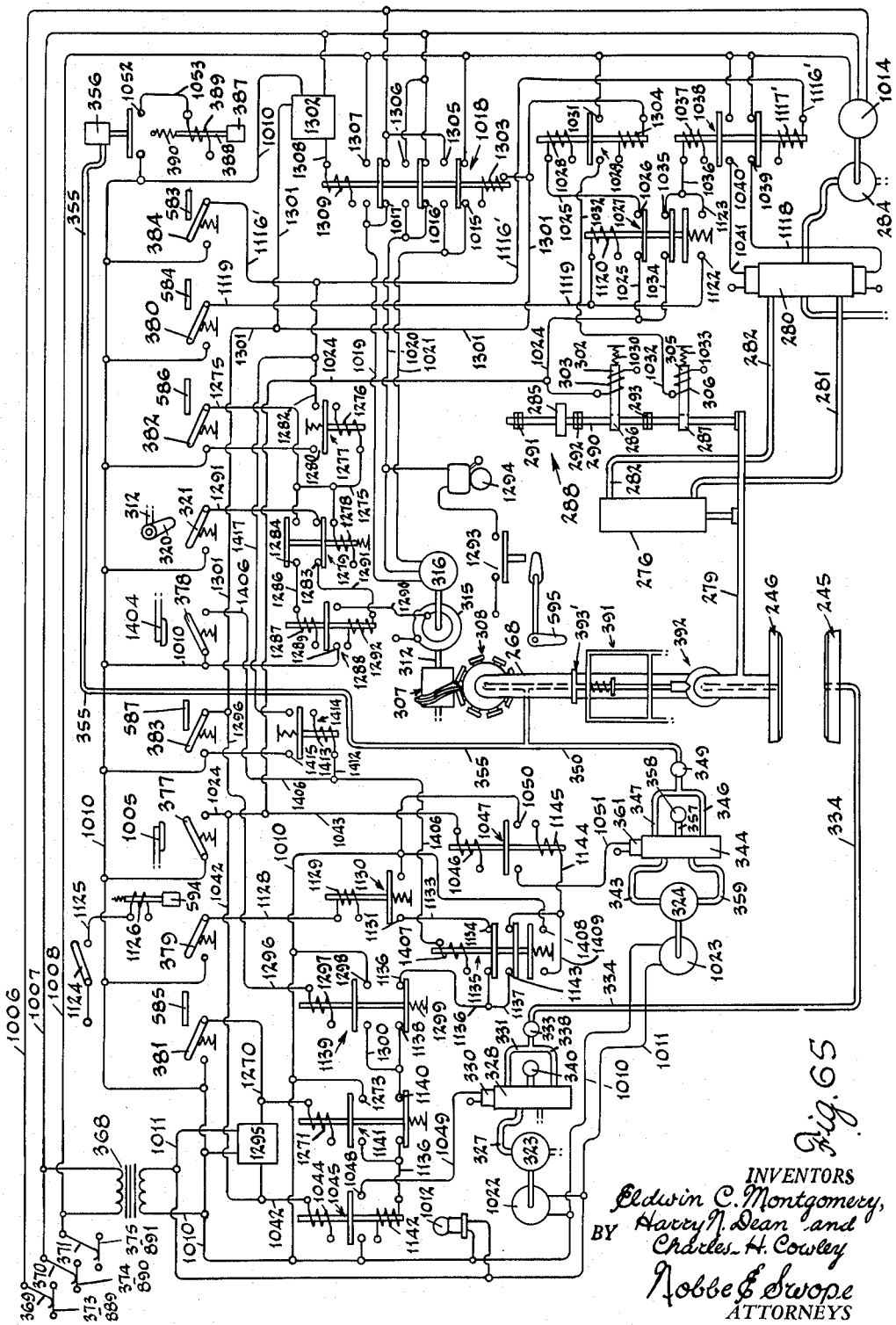

June 21, 1966  E. C. MONTGOMERY ETAL  3,257,187
PRODUCTION OF MULTIPLE GLASS SHEET GLAZING UNITS
Filed March 9, 1960  32 Sheets-Sheet 30

INVENTORS
Edwin C. Montgomery,
Harry N. Dean and
BY Charles H. Cowley

Nobbe & Swope
ATTORNEYS

INVENTORS
Edwin C. Montgomery,
Harry N. Dean and
BY Charles H. Cowley
Nobbe & Swope
ATTORNEYS

United States Patent Office 3,257,187
Patented June 21, 1966

3,257,187
PRODUCTION OF MULTIPLE GLASS SHEET GLAZING UNITS
Eldwin C. Montgomery, Shreveport, La., and Harry N. Dean, Waterville, and Charles H. Cowley, Toledo, Ohio, assignors to Libbey-Owens-Ford Glass Company, Toledo, Ohio, a corporation of Ohio
Filed Mar. 9, 1960, Ser. No. 13,921
9 Claims. (Cl. 65—152)

The present invention relates broadly to all-glass multiple sheet glazing units and more particularly to a novel and improved apparatus for continuously fusing the opposed marginal edge portions of spaced sheets of glass together.

Multiple glass sheet glazing units produced by the apparatus of this invention are comprised of two sheets of glass arranged in spaced face-to-face parallel relation and which have been fused together entirely around their marginal edge portions to provide an air space or chamber therebetween which is hermetically sealed. Due to the insulating and condensation preventing characteristics of such units, their use has become well established for the glazing of door and window openings as well as openings in showcases, vehicles, refrigerators and the like.

It is of major importance in the production of all-glass multiple sheet glazing units of this type that the opposed marginal edge portions of the glass sheets be maintained in predetermined spaced and properly aligned relationship during the fusing of said marginal edge portions together. It is also a matter of equal importance that the glass sheets be initially heated to temperatures at which the strains therein will be minimized during subsequent fusing of said marginal edge portions and then cooled or annealed after the sealing operation.

A primary object of this invention, therefore, is to provide an improved apparatus for producing all-glass multiple sheet glazing units of the above character in which pairs of glass sheets, supported in vertically disposed face-to-face relation, are successively preheated, fused together along all of their edges, and then annealed, all in a substantially continuous manner.

Another object of the invention is to provide an improved apparatus which includes means for sequentially and at timed intervals, moving successive pairs of glass sheets arranged in vertical, face-to-face contacting relation through a preheating zone, and means for engaging each pair of glass sheets after being preheated, moving them a predetermined distance from one another and carrying them in vertical, spaced face-to-face relationship through sealing zones wherein the opposed marginal edge portions of the glass sheets are progressively heated to fusion temperature and then pressed into contact with one another to form sealed edge walls.

Another object of the invention is to provide, in apparatus of the above character, support means for conveying pairs of glass sheets through a preheating zone, vacuum support means for picking up each successive pair of glass sheets from the preheat support means and conveying them through sealing zones, and support means for receiving the glass sheets from said vacuum support means when completely sealed together around their peripheral edge portions and conveying them through an annealing zone, said vacuum support means moving in a substantially continuous path through the sealing zones to the annealing zone and then automatically returning to the preheating zone to receive another pair of glass sheets.

Another object of the invention is to provide, in apparatus of the above character, means automatically operable by the vacuum support means as it enters the initial sealing zone to advance the pairs of glass sheets intermittently through the preheating zone.

Another object of the invention is to provide, in apparatus of the above character, a plurality of carriers for the vacuum support means, conveyor means for the carriers, and means automatically controlling the movement of said carriers along said conveyor means in substantially continuous closed paths between the preheating zone and annealing zone.

Another object of the invention is to provide, in apparatus of the above character, automatic control means along the carrier conveyor means for causing each carrier to move the vacuum support means thereon into the preheating zone to remove a pair of glass sheets therefrom; convey said sheets through the plurality of sealing zones to progressively seal the edge portions thereof; deposit said sealed glass sheets upon a support means in the annealing zone; and then return the carrier and vacuum support means to the preheating zone, all in a substantially continuous manner.

A further object of the invention is to provide, in apparatus of the above character, means for automatically releasing a pair of completely sealed glass sheets from the vacuum support means to a support means in the annealing zone, means for removing the vacuum means from the annealing zone, and means controlled by the vacuum means upon removal thereof from the annealing zone for advancing the sealed glass sheets intermittently through said annealing zone.

A still further object of the invention is to provide, in apparatus of the above character, an interlocking control system including means for automatically carrying out a substantially continuous series of successively occuring operations which will sequentially cause movements of pairs of glass sheets on support members from a loading area through a preheating zone; move a pair of vacuum support members into the preheating zone to receive a pair of glass sheets; initiate intermittent movement of pairs of glass sheets through the preheating zone as the vacuum support members and the pair of glass sheets supported thereby move into the sealing zones; move one of the vacuum support members relative to the other support member to establish the thickness of the air space to be formed between the sheets; rotate the glass sheets to progressively bring an unsealed edge portion of the same in position to be sealed together in timed relation to their movement through the sealing zones; form a dehydration hole in at least one edge wall formed by the opposed edge portions of the glass sheets as they are sealed together; transfer the glass sheets when completely sealed around their edge portions from the vacuum support members to a support member in the annealing zone, and then advance the sealed glass sheets through the annealing zone to an unloading area at successively and sequentially occuring intervals of time.

Other objects and advantages of the invention will become more apparent during the course of the following description, when read in connection with the accompanying drawings.

In the drawings, wherein like numerals are employed to designate like parts throughout the same:

FIG. 1 is a schematic plan view of a glass sheet sealing apparatus constructed in accordance with the invention;

FIG. 2 is a front elevational view of the apparatus;

FIG. 3 is a perspective view of an all-glass multiple sheet glazing unit as produced by the sealing apparatus;

FIG. 4 is a vertical transverse section of the multiple sheet glazing unit as taken on line 4—4 of FIG. 3;

FIG. 5 is a fragmentary perspective view of a support rack employed in the sealing apparatus;

FIG. 6 is a vertical cross-sectional detail view of the rack;

3

Figure 24:
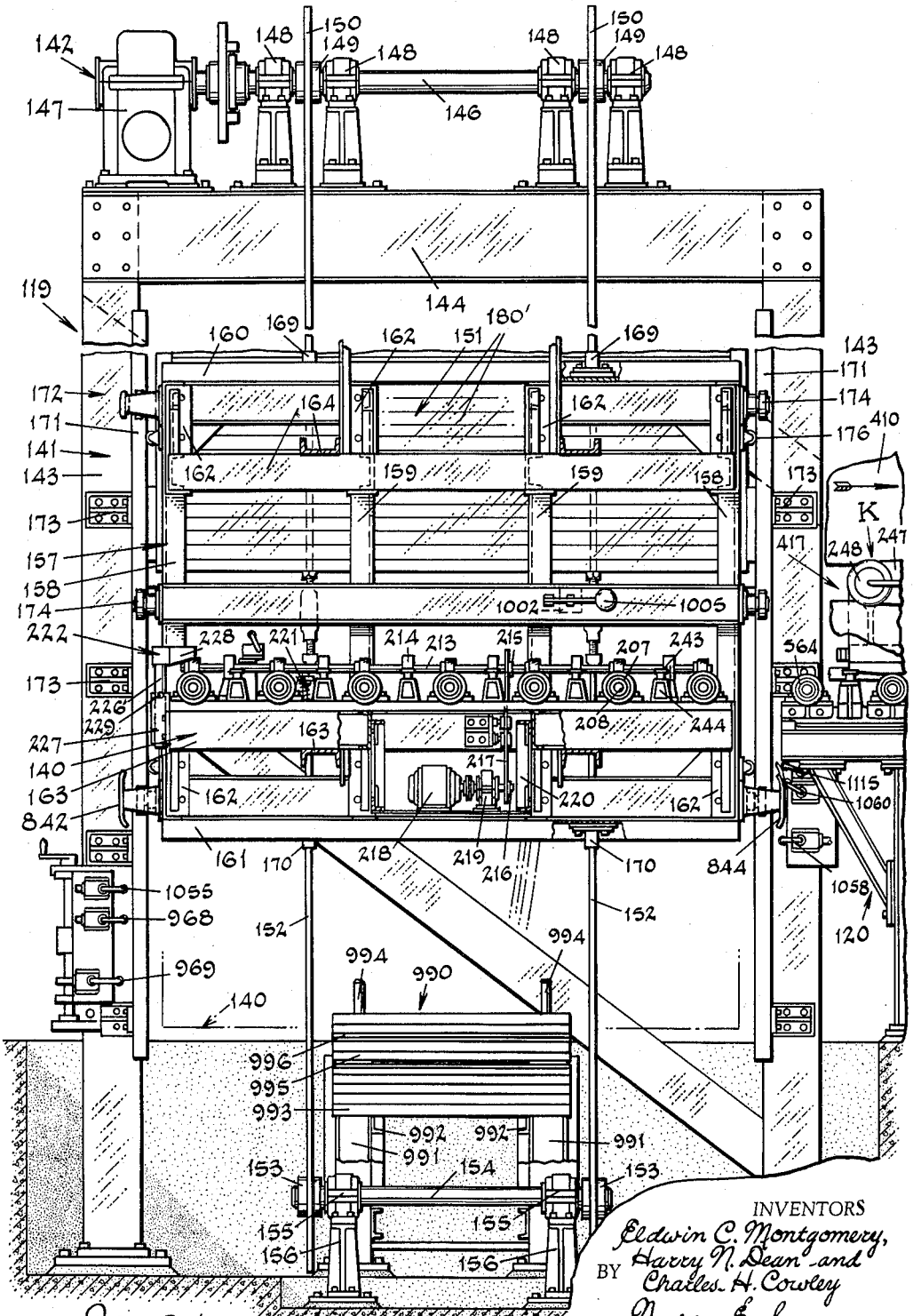

FIG. 7 is a horizontal sectional view as taken on line 7—7 of FIG. 5;
FIG. 8 is a plan view of the supporting rack;
FIG. 9 is a fragmentary perspective view of a means for spacing a pair of glass sheets;
FIG. 10 is a partial side elevation of a second form of supporting rack;
FIG. 11 is a plan view of the support rack of FIG. 10;
FIG. 12 is a vertical detail view illustrating several manners of moving the supporting racks;
FIG. 13 is a perspective view of a glass sheet carrier;
FIG. 14 is a front elevational view of the preheating section of the sealing apparatus;
FIG. 15 is a horizontal sectional view as taken on line 15—15 of FIG. 14;
FIG. 16 is a vertical longitudinal sectional view as taken on line 16—16 of FIG. 15;
FIG. 17 is a fragmentary perspective view of a part of the structure shown in FIGS. 15 and 16;
FIG. 18 is a horizontal sectional view as taken on line 18—18 of FIG. 16;
FIG. 19 is a vertical longitudinal sectional view of the entry end of the preheating section and as taken on line 19—19 of FIG. 14;
FIG. 20 is a vertical transverse sectional view as taken on line 20—20 of FIG. 19;
FIG. 21 is a rear elevational view of the transfer area and particularly illustrates the elevator and conveyor structures thereof;
FIG. 22 is a vertical transverse sectional view of a transfer area of the fusing section and as taken on line 22—22 of FIG 1;
FIG. 23 is a horizontal view of the transfer area and as taken on line 23—23 of FIG. 22;
FIG. 24 is a vertical longitudinal sectional view of the transfer end of the fusing section and as taken on line 24—24 of FIG. 1;
FIG. 25 is a fragmentary detail view of a locking device between the elevator and conveyor structures;
FIG. 26 is a vertical transverse sectional view as taken on line 26—26 of FIG. 25;
FIG. 27 is a vertical transverse sectional view of the structure of FIG. 22 and with the elevator at the upper limit of its movement;
FIG. 28 is a horizontal detail view as taken on line 28—28 of FIG. 27;
FIG. 29 is a vertical cross-sectional detail view of a locking device of the elevator as taken on line 29—29 of FIG. 23;
FIG. 30 is a plan view of the glass sheet support carrier of FIG. 13;
FIG. 31 is a rear elevational view of the support carrier;
FIG. 32 is a vertical transverse detail view of the carrier and as taken on line 32—32 of FIG. 30;
FIG. 33 is a detail view in plan as taken on line 33—33 of FIG. 31;
FIG. 34 is a detail view in plan as taken on line 34—34 of FIG. 31;
FIG. 35 is a vertical sectional view as taken on line 35—35 of FIG. 34;
FIG. 36 is an elevational view of a control device for the carrier and as taken on line 36—36 of FIG. 30;
FIG. 37 is a vertical sectional view as taken on line 37—37 of FIG. 30;
FIG. 38 is a vertical sectional detail view as taken on line 38—38 of FIG. 37;
FIG. 39 is a plan view of a vacuum platen for supporting a glass sheet;
FIG. 40 is a vertical transverse detail view as taken on line 40—40 of FIG. 39;
FIG. 41 is a vertical transverse section view through the sealing section of the apparatus as taken on line 41—41 of FIG. 2;
FIG. 42 is a side elevational view of a sheet glass sealing unit as taken on line 42—42 of FIG. 41;

4

Figure 45:
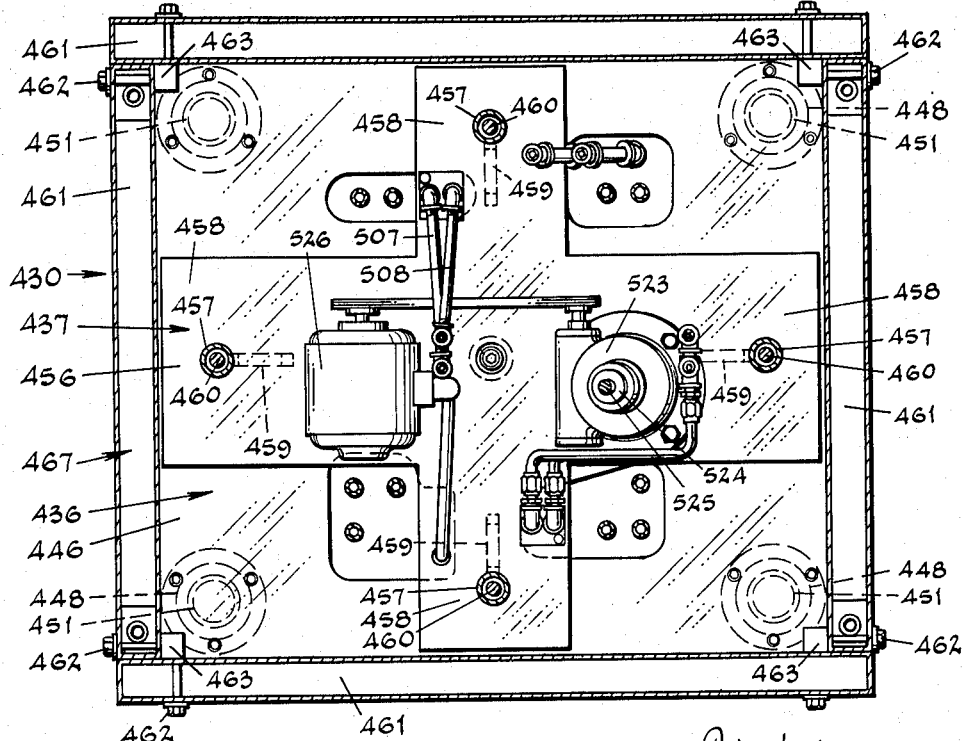
Figure 46:
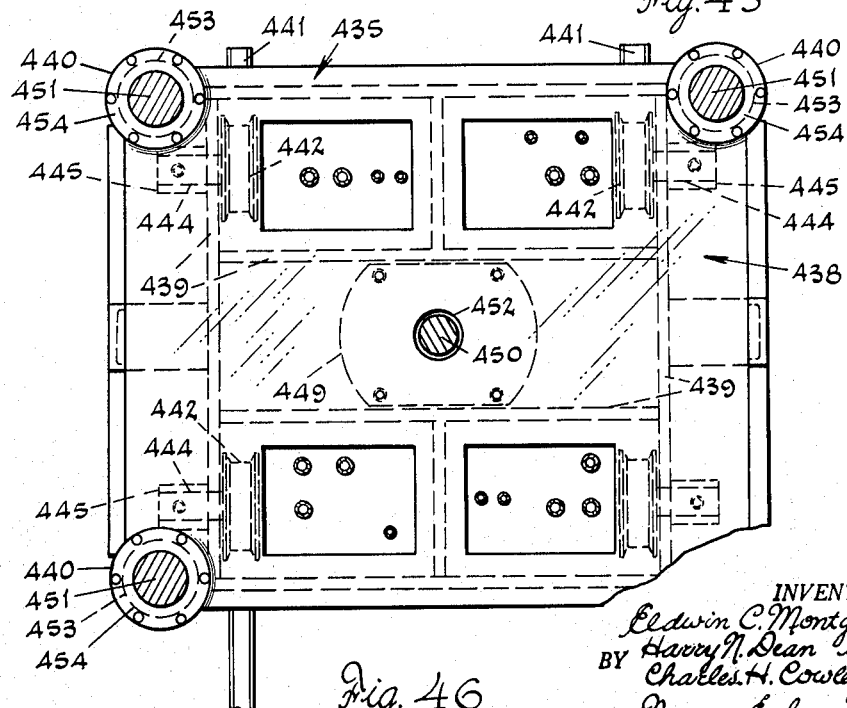
Figure 58:
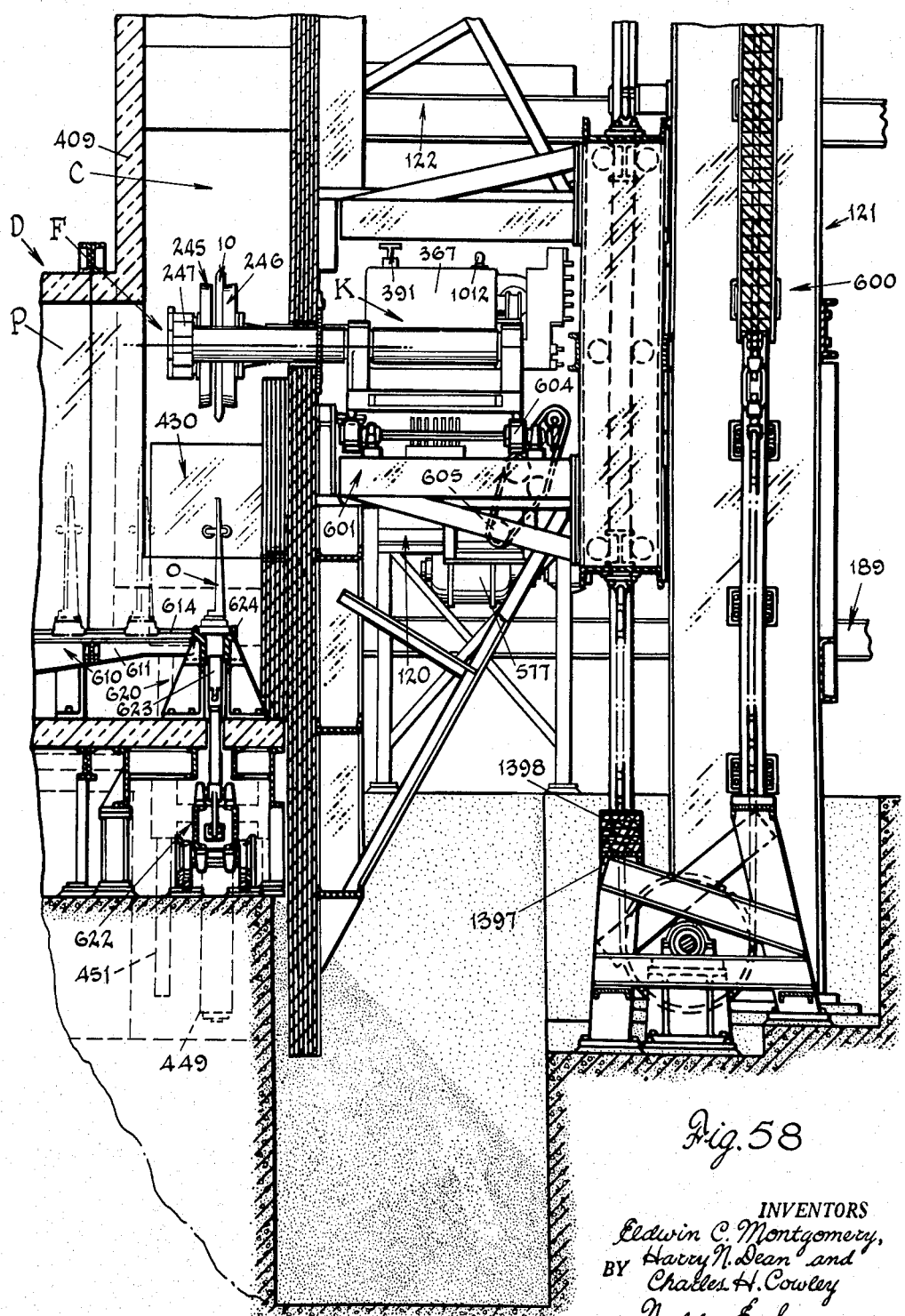
Figure 61:
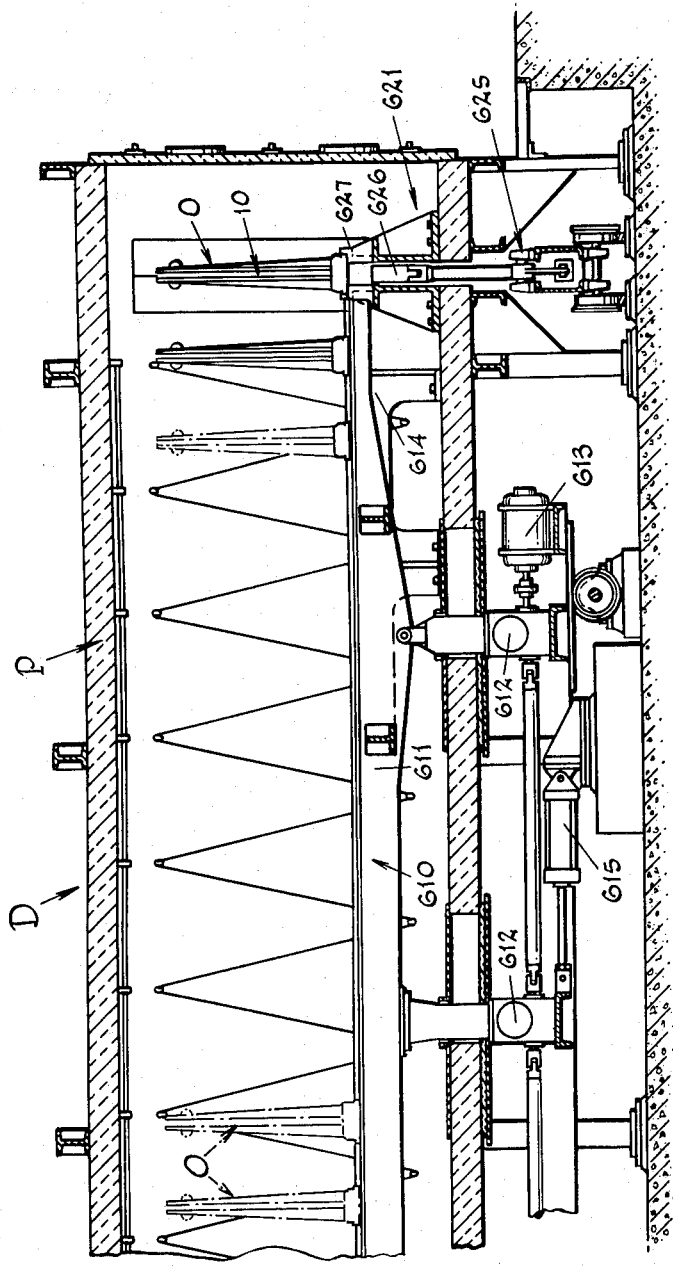
Figure 62:
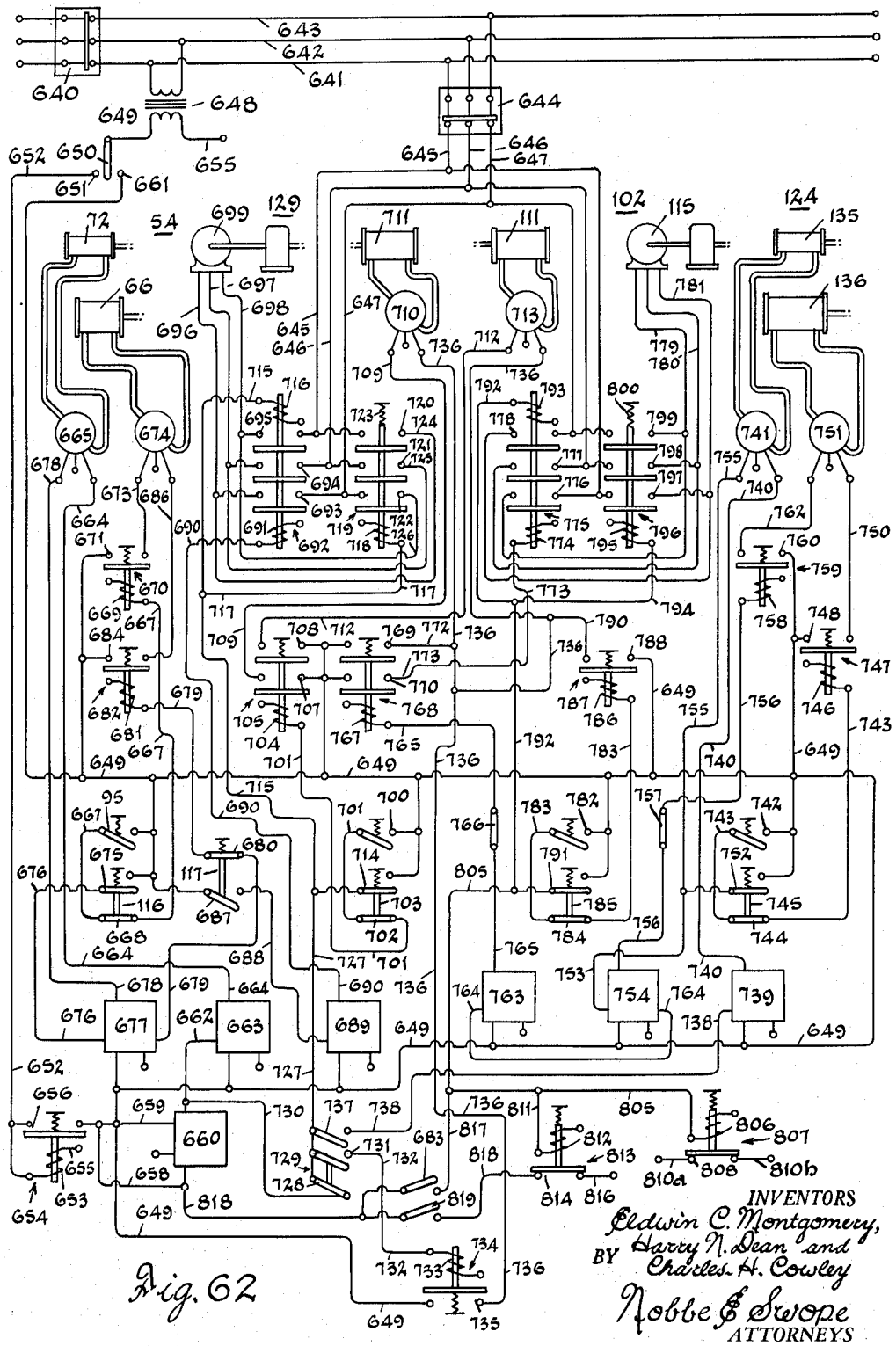
Figure 63:
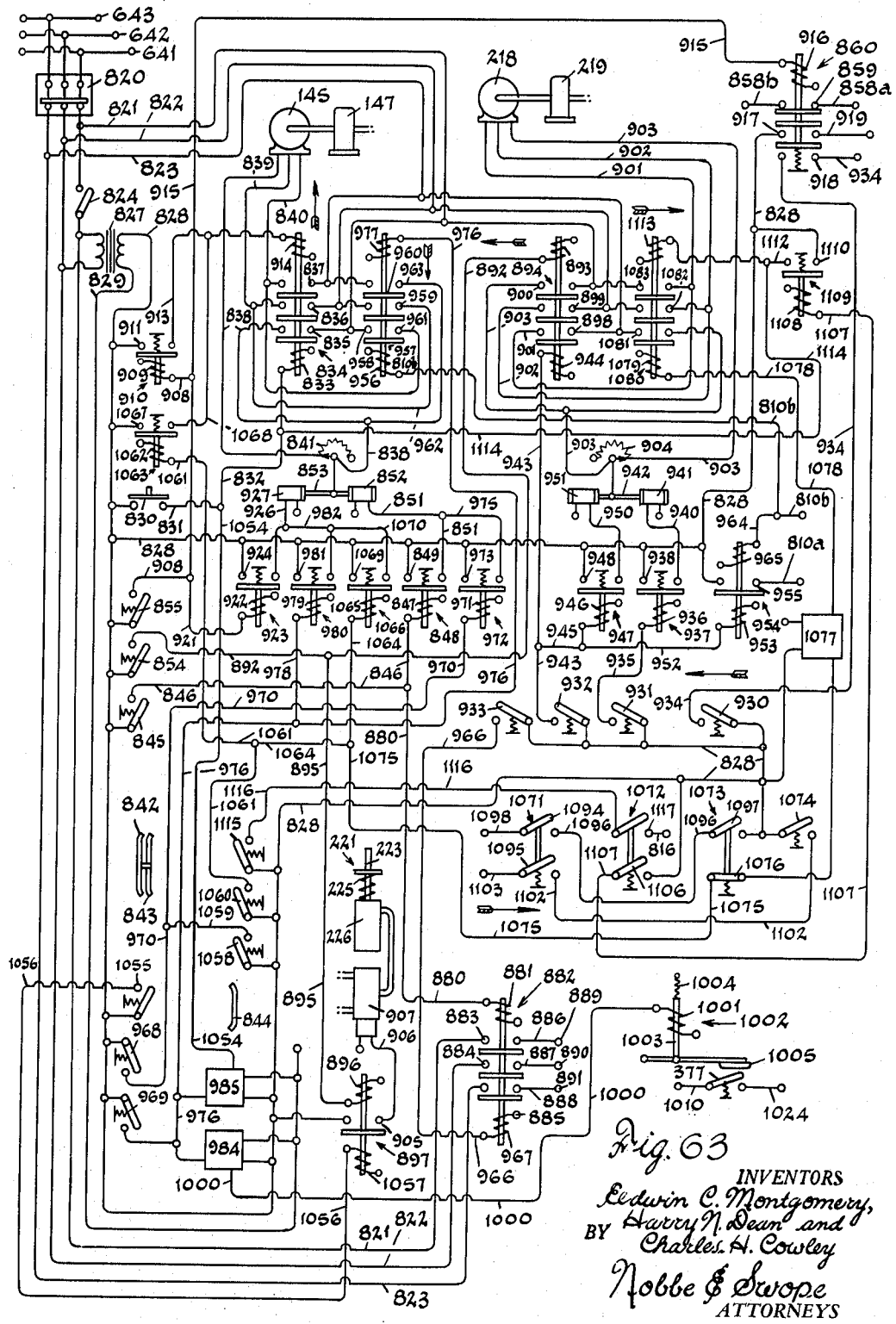
Figure 64:
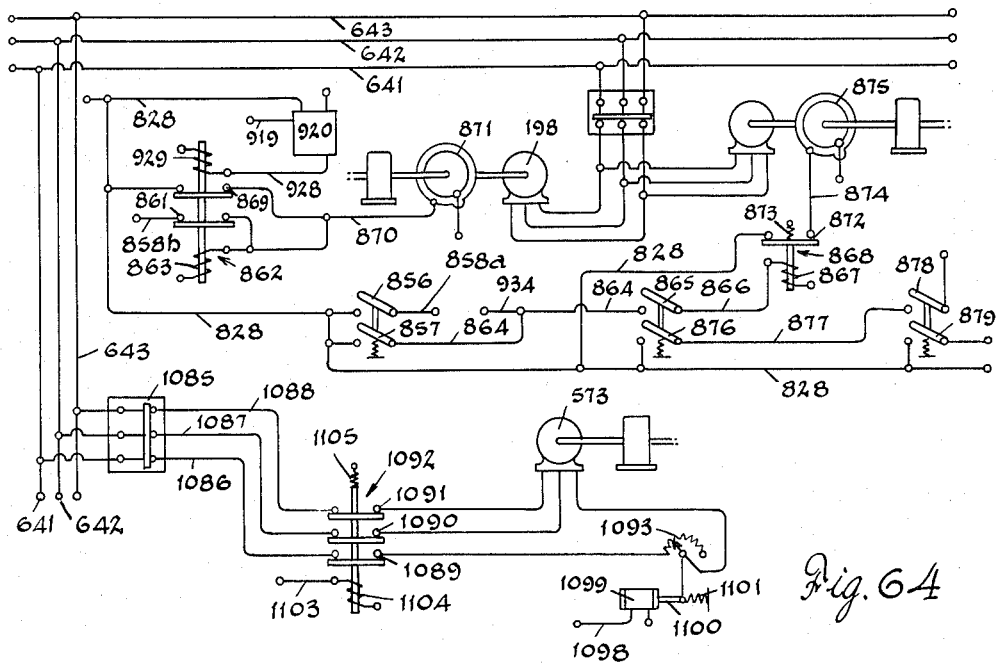
Figure 68:
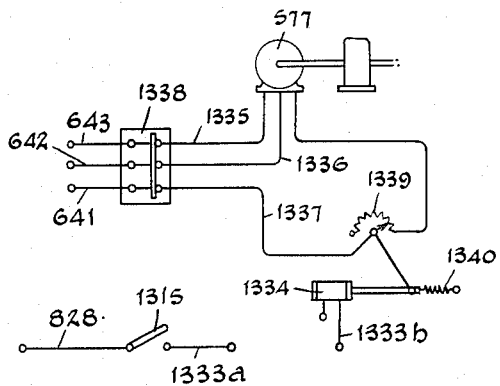
Figure 66:
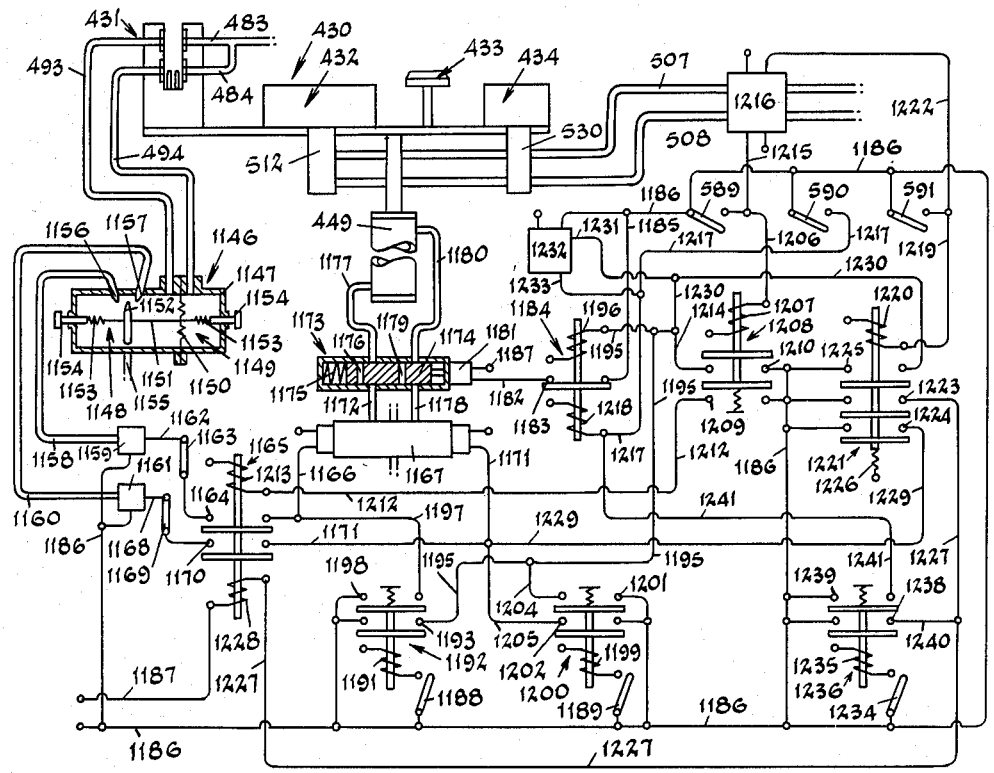
Figure 67:
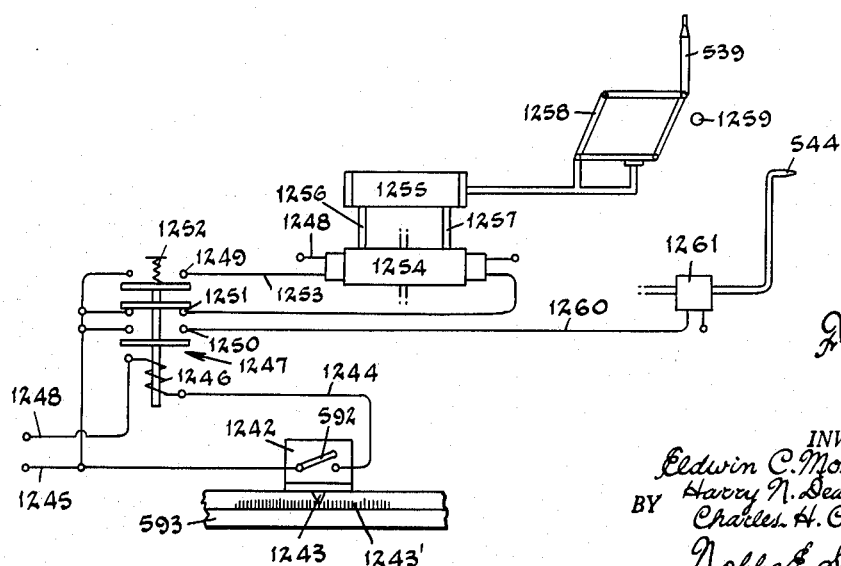
Figure 69:
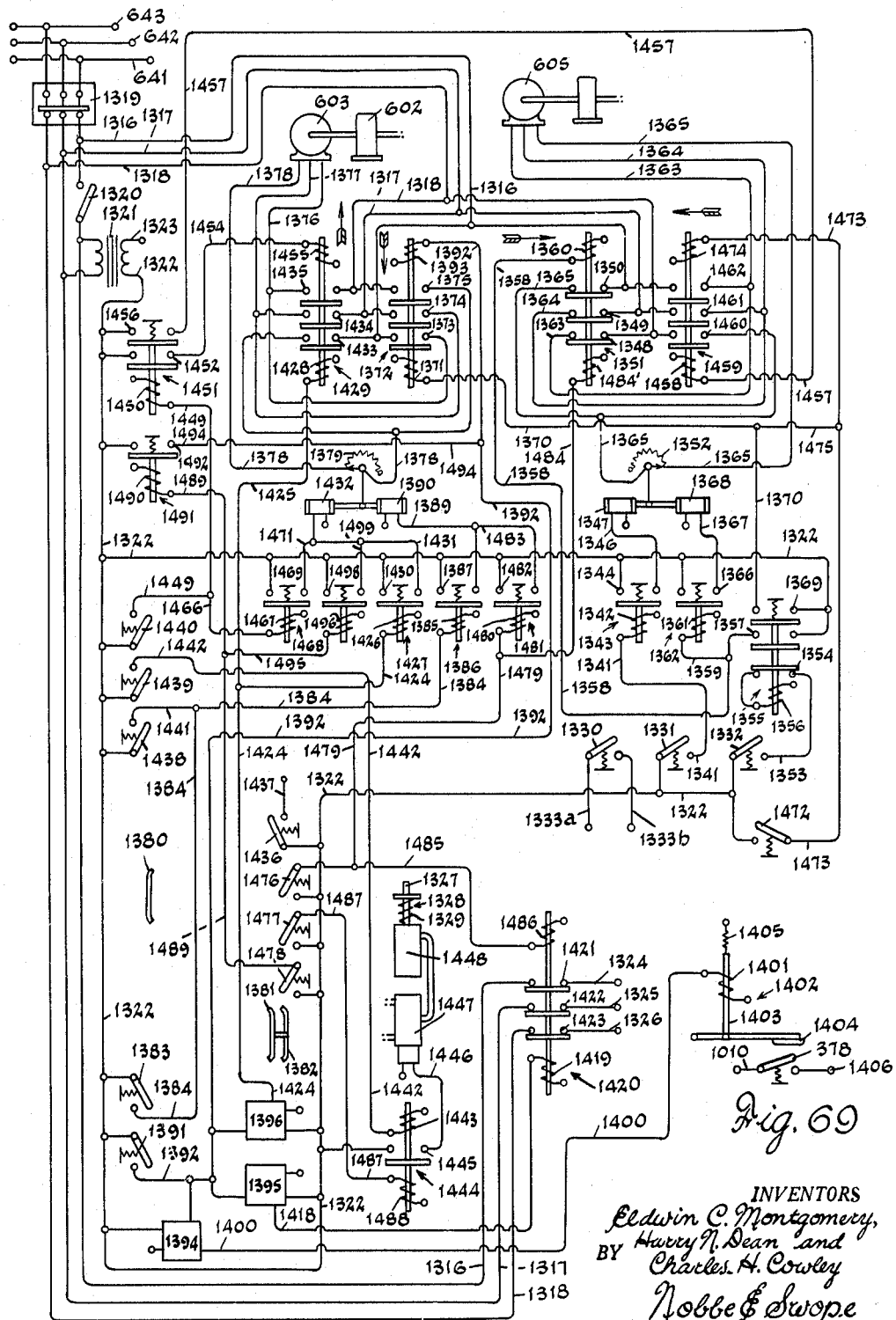
Figure 70:
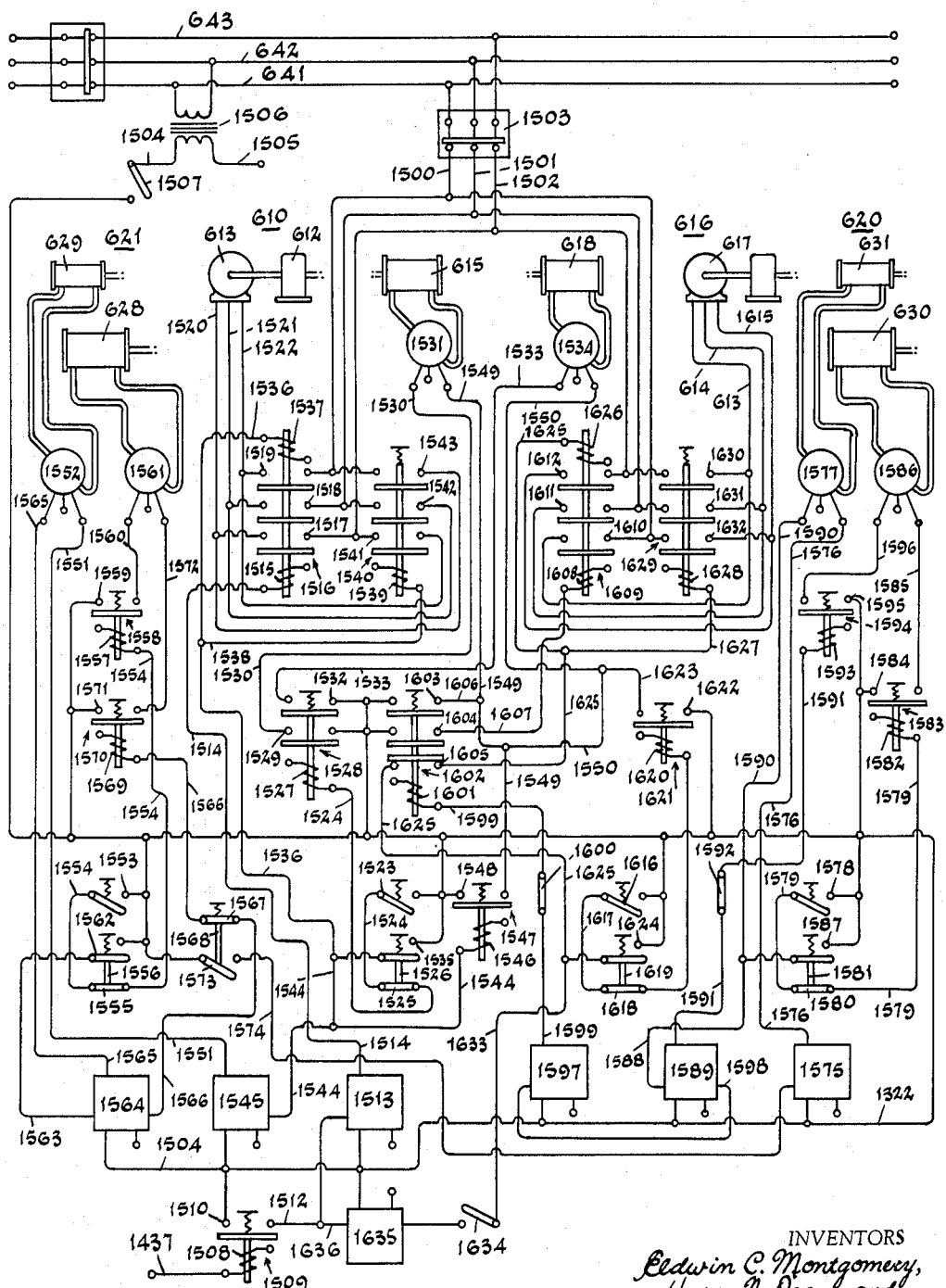

FIG. 43 is an end elevational view of the sealing unit;
FIG. 44 is a plan view of the sealing unit;
FIG. 45 is a horizontal sectional view as taken on line 45—45 of FIG. 42;
FIG. 46 is a horizontal sectional view as taken on line 46—46 of FIG. 42;
FIG. 47 is a fragmentary plan view of a second form of sealing unit;
FIG. 48 is a diagrammatic view of a step in the sealing operation produced by the unit of FIG. 47;
FIG. 49 is a vertical transverse sectional view as taken on line 49—49 of FIG. 44;
FIG. 50 is a vertical longitudinal sectional view as taken on line 50—50 of FIG. 49;
FIG. 51 is a vertical transverse sectional view as taken on line 51—51 of FIG. 44;
FIG. 52 is a vertical transverse sectional view as taken on line 52—52 of FIG. 44;
FIG. 53 is a vertical transverse sectional view as taken on line 53—53 of FIG. 44;
FIG. 54 is a vertical transverse sectional view as taken on line 54—54 of FIG. 47;
FIG. 55 is a vertical sectional view of a dehydration opening in an all-glass multiple sheet glazing unit;
FIG. 56 is a vertical longitudinal detail view of the conveyor systems of the apparatus and as taken on line 56—56 of FIG. 41;
FIG. 57 is a similar view of the conveyor systems and is a continuation of the systems of FIG. 56;
FIG. 58 is a vertical transverse sectional view of the second transfer area of the fusing section of the apparatus and as taken on line 58—58 of FIG. 1;
FIG. 59 is a front elevational view of the annealing section;
FIG. 60 is a horizontal sectional view of the annealing section of the apparatus as taken on line 60—60 of FIG. 59;
FIG. 61 is a vertical longitudinal sectional view as taken on line 61—61 of FIG. 59;
FIG. 62 is a diagrammatic view of the electrical circuit for the preheating section of the sealing apparatus;
FIG. 63 is a similar view of the electrical circuit for the loading elevator of the apparatus;
FIG. 64 is a diagrammatic view of an electrical system for a conveyor system associated with the loading elevator;
FIG. 65 is a diagrammatic view of the electrical control circuits for a glass sheet carrier;
FIG. 66 is a diagrammatic view of an electrical circuit for a control device associated with the sealing stations of the apparatus;
FIG. 67 is a diagrammatic view of an electrical circuit for a feeder device associated with one of the sealing stations;
FIG. 68 is a diagrammatic view of an electrical circuit for the conveyor system of the sealing section of the sealing apparatus;
FIG. 69 is a diagrammatic view of the electrical circuits for the unloading elevator of the apparatus; and
FIG. 70 is a diagrammatic view of the electrical circuits for the annealing section of the sealing apparatus.

Referring particularly to the drawings, there is shown in FIGS. 1 and 2 an apparatus, constructed in accordance with the invention and designated in its entirety by the letter A. This apparatus consists of a preheating section B, a fusing and/or sealing section C and an anealing section D. Between the preheating section B and sealing section C, there is a transfer area E while at the opposite end of the sealing section there is a similar transfer section F adjoining and opening into the annealing section D.

As herein disclosed, the preheating section B is formed by two tunnels G and H, arranged in parallel, the adjoining outer ends thereof defining a loading area L; while the oppositely disposed inner ends communicate with one another in the vicinity of the transfer area E. As illustrated in FIG. 5, pairs of glass sheets are carried on support racks J and moved, in timed sequences, through the tunnel G and then transferred in the area E to a carrier K, shown in FIG. 13. The emptied racks J are then progressively removed into the tunnel H and returned to the loading area L, and thus move in a horizontally disposed, rectangular path, as indicated by the broken line M in FIG. 1.

On the other hand, the carriers K support the glass sheets through the sealing section C from the transfer area E to the transfer area F and then return empty to the area E; moving through a vertically disposed, rectangular path, indicated by the broken line N in FIG. 2. The completed all-glass multiple sheet glazing units are discharged from each carrier K in the transfer area F onto racks O, shown in FIGS. 10 and 11. The racks O convey the finished units through the tunnel P of the annealing section D toward and into the unloading area U and then return to the transfer area F by way of the tunnel R. The racks O accordingly traverse a horizontally disposed, rectangular path indicated generally by the broken line S in FIG. 1.

A typical all-glass multiple sheet glazing unit, produced by the method and apparatus of this invention, is designated by the numeral 10 in FIGS. 3 and 4 and is comprised of two sheets of glass 11 and 12 spaced from one another in parallel relation by edge or side wall portions 13, 14, 15 and 16 to create a dead-air space 17 therebetween. As indicated by dotted lines at 18 in FIG. 3, each unit is provided with a dehydration opening through which dry air or gas is supplied to replace the moist air within the space 17. Thereafter, the opening is permanently sealed.

Now, with reference to FIGS. 5 to 9 inclusive, it will be seen that the racks J for supporting the glass sheets 11 and 12 during the preheating cycle are comprised of an elongated base 19 and two locating devices 20 mounted for longitudinal movement along the base 19 to accommodate glass sheets of different lengths. The base 19 is generally rectangular in vertical transverse cross-section and the upper surface thereof is formed with a medially disposed, longitudinally extending slot 21 and a plurality of finished surfaces 22, arranged longitudinally and in parallel, to provide ways for the locating devices 20. Between the vertically disposed side walls 23 of the base and regularly spaced between the ends thereof, a plurality of transverse webs 24 are provided while in the bottom surfaces of the walls 23, locator notches 25 (FIG. 5) are formed, for purposes to be disclosed hereinafter.

The locator devices 20 include a mounting pad 26, which is equipped on its undersurface with a key-rib 27, and an integrally-formed vertically-disposed post 28. The pad 26 is adapted to rest upon the finished surfaces 22 within the rib 27 fitting into the slot 21 of the base. To secure the devices 20 in position for a particular size of sheet, a locking clamp 29 is provided which is formed by a lever 30, fulcrummed at one end, as at 31 (FIG. 10) on the surface of the pad 26 and supportingly engaged at the other end by a cam element 32. Intermediate its ends, the lever is adapted to carry a vertically adjustable bolt 33 having a shank which is received in the slot 21 and an enlarged head 34 adapted to bear against the under edges of the slot (FIG. 6). The cam element 32 is mounted on a shaft 35 journaled in the post 28 and rotated by means of a handle 36 whereby the end of the lever 30 will be carried upwardly relative to the fulcrum surface 31 to urge the bolt head 34 upwardly against the under edges 37 of the slot 21 and consequently the bottom surface of the mounting pad 26 downwardly against the finished surfaces 22 to lock the locating device 20 to the base 19.

On the upper surfaces of the pads 26, there are provided suitable non-abrasive devices 38 and 39 adjustably carried on a fixed bracket 40. The locators 38 are adapted to support the bottom, longitudinally-disposed edges of the glass sheets 11 and 12, when placed thereupon, and accordingly are adjustable vertically with reference to one another (see FIG. 8) until the bottom edges of the sheets are disposed in a horizontally-disposed plane and at the desired elevation with reference to a generally predetermined reference plane of operation. This has been found preferable since in describing the operations of the sealing apparatus, several instances will be found wherein the same elevation or reference plane is of prime importance. Likewise, the locators 39 are adjustably mounted on the respective brackets 40 to align the lower edges of the glass sheets in a longitudinal and vertical plane with reference to upwardly disposed clamping members 41 provided on the posts 28.

These clamping members are pivotally carried by brackets 42 secured to flanged portions 43 of the posts 28 (FIGS. 5 and 7). Each member 41 cooperates with a fixedly mounted contact member 44, in the form of a conventional set-screw to lightly engage the outwardly facing surfaces of the glass sheets. Briefly described, the contact member 41 includes a set-screw 45 threaded through one end of a shaft 46, journaled in the bracket 42 and equipped with a handle 47 which is swung upwardly from the full line position to the broken line position of FIG. 5 to bring the point of the set-screw 45 into close proximity with the surface of the adjacent glass sheet 12. The contact members 41 and 44 loosely engage the glass sheets to sustain them in a vertical position. The shaft 46 may also be provided with an oppositely disposed weight 48 to assist in retaining the sustaining members in an active or inactive position. And, as will be more fully hereinafter set forth, when the pair of glass sheets 11 and 12 are transferred from a rack J to a carrier K, the handles 47 are engaged to swing the contact members 45 out of their glass sustaining relation.

In order that the distance between the locating devices 20 of each rack J can be readily changed for the production of glazing units of different length, the bases 19 are formed with centrally and vertically disposed notches 49. These notches are adapted, as shown in broken lines in FIG. 8, to receive a gaging tool 50, the opposite ends of which engage the inwardly opposed ends of the locator devices 20 thereby equally spacing said devices from the exact center of the rack. Of course, where the second dimension, namely the height of the glass sheets, is increased or decreased, the locator devices 20 with correspondingly longer or shorter posts 28 are substituted for the locator devices shown and are then equally spaced from the center of the rack with the aid of a gaging tool 50.

It has also been found advantageous to provide a simple means whereby the glass sheets will be slightly spaced from one another, at least along one edge. This is primarily for the purpose of preventing surface-to-surface relationship between the vertically supported pairs of glass sheets during the preheating cycle and adherence between the sheets upon transfer from a rack J onto a carrier K preparatory to the actual sealing operation. One manner of spacing is accomplished by means of a U-shaped clip 51, shown in FIG. 9. As herein employed, one leg 52 of the clip is interposed between the sheets while the re-entrantly bent web 53 is supported on the edge of a sheet but not in engagement with the corners thereof. Preferably the clip 51 is placed on the upper edge of one sheet since during the subsequent positioning or indexing of the sheets during the fusing operation, the loosely mounted clips 51 disengage and fall harmlessly to the floor of the apparatus.

*The preheat section*

Referring now to FIGS. 14 to 20 inclusive, wherein the related tunnels G and H of the preheating section B are illustrated, the side walls, ceiling and bottom of each tunnel are formed of insulation material structurally supported by channels and beams. As will be noted in FIG.

14, the outer end wall of the return tunnel H is open while the outer wall of tunnel G is closed by access doors or panels. Likewise, it will be noted, as in FIG. 15, that the outer end of tunnel H is shorter than the related end of the tunnel G. This is specifically for the purpose of locating as rack conveyor mechanism transversely between the ends of said tunnels in order that each rack J can be loaded with glass sheets upon its arrival at the outer end of the return tunnel H, in the above-described loading area L, and then moved laterally into the tunnel G.

The rack conveyor mechanism, generally designated by the numeral 54, includes a fixed base 55 and a movable cart 56. The base 55 has a pair of horizontally disposed, spaced tracks 57 that are carried by pedestals 58. The tracks are provided with vertical side walls 59; however, as seen in plan in FIG. 15, it will be noted that in the area, adjoining the end of tunnel H and indicated at 60, the wall 59 is omitted to enable movement of racks from the end of the tunnel H onto the platform area of the tracks. This situation is also true at the end of the tracks in the tunnel G to similarly enable movement of the racks therefrom. Likewise, in each of these end areas of the tracks 57 there is provided a pair of spaced, vertically open notches 61 for purposes to be hereinafter more fully disclosed.

There are ordinarily three racks located in the loading area. That is to say and as shown in FIG. 14, one rack (J¹) is located at the outer ends of the tracks 57; one (J²) is located preparatory to entry into the tunnel G while one rack (J³) is positioned on the opposite ends of tracks 57 within the said tunnel. Thus, the movement of each rack from tunnel H to tunnel G is in two stages at equally spaced intervals of time. For this purpose, the cart 56 is controlled in its movement to lift two racks (J¹ and J²) and move inwardly into the tunnel G following removal of the innermost rack (J³) from the end of track 57 therein.

The cart 56 (FIG. 16) has a base framework 62 supported by wheels 63 that are adapted to traverse rails 64. The framework 62 is connected to the piston rod 65 of a horizontally disposed cylinder 66 mounted on the floor of the structure. On the framework 62, a lift bar 67 is moveably supported by one arm of bell-cranks 68 pivotally mounted on a pair of brackets 69. The opposite bifurcated arms of the bell-cranks are interconnected by a link 70 which in turn is attached to the piston rod 71 of a hydraulic cylinder 72 mounted on the framework 62. Since the framework and cart traverse the rails 64 upon extension and retraction of the piston rod 65 of the cylinder 66, means is herein provided for maintaining the pressure connections to the cylinder 72 through a combination of rigid conduits 73 and 74 carried by a bracing structure 75 attached to the framework 62, and flexible conduits 76 and 77. The conduits 73–74 and 76–77 are interconnected at fittings 78–79 carried by a flange 80 at the end of the brace 75. The conduits 76–77 are passed about sheaves 81–82 and at their opposite ends are connected to supply pipes. Each of the sheaves 81–82 is carried by similar carts 82–84 having casters 85 traversing rails 86 (FIG. 17).

Referring also to FIG. 16, it will be noted that cables 87–88 and weights 89, vertically movable in a well 90, urge each cart 83–84 in one direction, against movement of the cart 56. For this purpose, the cables 87–88 are trained about pulleys 91 rotatably mounted on fixed brackets 92 and, accordingly, when the conveyor cart 56 is moved toward the end of the tracks 57 within the tunnel G by the cylinder 66, the flexible conduits 76–77 will follow around the sheaves 81 or 82 and pull the carts 83–84 against the retrieving action of the weights 89. Conversely as the conveyor cart 56 moves rearwardly, or from tunnel G to tunnel H, the weights 89 will exert sufficient force upon the cables 87–88 to retrieve the carts 83–84 thereby maintaining a desired amount of tension on the conduits 76–77.

In the actual sequence of operations of the conveyor mechanism 54, the cylinder 72 is actuated to raise the lift bar 67 and engage the racks J along the lower surfaces of the integral webs 24 (FIGS. 5 and 6). In order to guide the bar 67 during vertical movement, the vertical and opposed side walls of the bar 67 are provided with wear-plates 93 (FIG. 12) which slidingly engage the opposed, vertically-disposed walls 94 of the tracks 57. Also as shown in FIG. 12, the actual upward movement of the racks will be seen to be comparatively small as indicated by the broken line $j$; merely being sufficient to elevate the racks above the surfaces of the tracks and without removing the same from the confines of the track walls 59, which serve as guides during lateral movement of the racks. As the upper limit of movement of the lift bar 67, a switch 95 is closed by an arm 96 to complete a circuit to one side of a valve associated with the cylinder 66. This produces movement of the cart 56 to the right, as viewed in FIGS. 14 and 16, whereby one rack is carried into the tunnel G while the second rack is shifted from the loading area of the tracks 57 to the intermediate position. Also and preparatory to entry of the cart 56 and one rack into the tunnel, doors 97 (FIG. 19) are automatically opened (by means not shown).

The cart is halted upon engagement of a switch 98 (FIG. 15) which, as in the case of switch 95, controls operation of the above-described valve for cylinder 66. This valve and others employed in the preheating section of the sealing apparatus are shown in the diagram of FIG. 62 and will be more clearly described in the explanation thereof. Location of the switch or the actuating element therefor is determined by the amount of travel required to position the rack J entering the tunnel G with the notches 25 thereof engaging a pair of stationary rails 99 (FIG. 20). The rails are supported by pedestals 100 mounted on the floor 101 of the tunnel G and extend in parallel relation the length of the tunnel with their ends secured to the base 55 (FIGS. 19 and 20) and to the base of a similar conveyor mechanism situated in the transfer area E (FIG. 22).

As viewed in FIG. 19, each rack J loaded with a pair of glass sheets, is advanced through the tunnel G in a series of intermittent movements produced by a "walking-beam" conveyor, generally designated by the numeral 102. Structures of this well-known character include a base framework 103 and a vertically movable pair of beams 104 interconnected by braces 105. As herein disclosed, the framework 103 is located beneath the floor 101 of the tunnel G and supports the beams 104 above the floor by means of pillars 106 projecting through slots 107 in said floor. Shielding plates 108 are affixed to the pillars so that the slots remain closed at all times and thereby prevent entry of colder air into the tunnel G.

The frame 103 is supported on tracks 109 by a plurality of suitably journaled wheels 110, such as the one shown in FIG. 19, and is moved horizontally by means of a cylinder 111. To raise and lower the beams 104, the frame 103 carries gear drives 113 that are interconnected by shafting 114 and driven by a motor 115. Operations of the cylinder 111 and motor 115 are timed in relation to other sections of the apparatus. In this instance, a loaded rack J is removed from the conveyor 54 and advanced with others in the tunnel G toward the transfer area E and subsequently the rack, after transfer of the glass sheets, is removed toward the tunnel H as will be more fully hereinafter described.

The transfer of a loaded rack J from the conveyor 54 into the preheat tunnel G and the advance of a series of similarly loaded racks within the tunnel to the transfer area E is accomplished in step by step sequences of operation. Thus, a lift bar 67 elevates a rack above the surface of the track 57, as indicated at $j$ (FIG. 12); conveys the same laterally and then lowers the rack to the full line position to again place the rack on the track. After a predetermined interval of time, the ends of the beams 104 of a walking-beam conveyor, while in their lowermost positions, enter the notches 61 of the track; rise to again lift the rack; move outwardly of the notches and then lower to place the rack on the stationary rails 99. By reason of this repetitive motion, each time a rack is removed from the track 57, the preceding racks on rails 99 are simultaneously lifted and advanced a distance substantially as indicated by the spacing between the several racks shown in FIG. 19. Likewise, when the lift-bar 67 is lowered, which occurs in timed relation to stoppage of the cart 56 and upon engagement of the switch 98, the arm 96 actuates switch 116 (FIG. 16) which will cause the cylinder 66 to move or return the cart 56 outwardly to its initial or load position as shown in FIGS. 14 and 16. Upon reaching this position, the cart closes switch 117 (FIG. 15). Subsequent to this outward motion of the cart 56, the doors 97 of the preheating tunnel G are again closed.

Thus, upon return of the conveyor cart 56 to its position in the loading area L, there will be a rack J positioned on the inwardly disposed ends of tracks 57 and this rack in sequential steps will be advanced as in the case of the preceding racks along the fixed rails 99 by the walking-beam conveyor 102 through the preheat tunnel G toward the transfer area E. This step-wise movement conveys the pairs of glass sheets through a heated atmosphere provided by controlled heating sources, generally designated by the numeral 118 (FIG. 19). This constitutes the warming or preheating phase of the sealing operation and is, of course, for the purpose of raising the temperature of the glass sheets to relieve internal strains and also to eliminate breakage due to thermal shock as the glass enters the sealing section C.

By way of example, the heating sources 118 may be adjusted to maintain the atmosphere of the preheating tunnel G at approximately 1000° F., or any other temperature which is sufficient to elevate the temperature of the glass sheets 11 and 12 to approximately 900° F. as they arrive at the transfer area E. The intervals of time elapsing between each recurring movement of the loaded racks J through the tunnel G corresponds to the length of time required to transfer a pair of sheets to the carrier K and removal of the associated rack J from the transfer area E. Additionally, the accumulated length of time from the entry of a loaded rack J into the tunnel G until it reaches the transfer area E affords a sufficient period of time to preheat the glass sheets to the above prescribed temperature.

With reference to FIG. 2, it will be recalled that the carriers K traverse a path generally indicated by the broken line N. More particularly, and by means of a horizontally disposed roll conveyor system, the carriers are moved, as viewed in FIG. 2, in a leftward direction along the upper flight of the conveyor system to the transfer area E and are individually received at timed intervals by an elevator. This elevator lowers the carrier into the transfer area E which is at a level indicated by the broken line M to receive a pair of preheated glass sheets and then raises the carrier and the glass sheets to the lower flight of the path N along which said carrier is moved to the right during the sealing operation. The sealing operation is carried out at stations or areas designated by the legends 1, 2, 3 and 4. Upon arriving in the transfer area F, each carrier K is received on a second elevator and, with a completed glazing unit, is lowered to the plane of the line indicated by the letter S at which level the glazing unit is removed from the carrier in a manner to be disclosed hereinafter. The second elevator then rises and delivers the carrier to the upper flight of the conveyor upon which it moves to the left (FIG. 2) for return to the first elevator. The "loading" elevator structure in the transfer area E is generally designated by the numeral 119; the lower or sealing conveyor system is designated by the numeral 120; the "unloading" elevator structure in the transfer area F is designated by the numeral 121 and the upper conveyor is designated by the numeral 122.

The transfer area E

Referring now to FIGS. 21 to 29 inclusive, it will be seen in FIG. 22 that the fixed rails 99 are secured to the tracks 123 of a conveyor unit 124 while the proximate ends of the beams 104 of the "walking-beam" conveyor 102 are disposed outwardly from the aligned notches 125 of tracks 123. Conveyor unit 124 also includes a cart 126 adapted to carry a rack J, after the glass sheets have been removed therefrom, to the left, as viewed in FIG. 23, to the end of the tracks 123 at the inner end of the return tunnel H. The tunnel H is provided with stationary rails 127 and movable beams 128 for a "walking-beam" conveyor 129. It will likewise be apparent that the walls of the tunnels G and H are joined to the walls of the sealing section C. The tunnel H is in communication with the sealing section C through doors 130 which open to permit passage of an empty rack from the transfer area E into the tunnel H. The doors prevent excessive heat losses and major fluctuations in temperature in the sealing section C and at the transfer area E.

The cart 126 is equipped with casters or wheels 131 adapted to traverse rails 132 and, by means of bellcranks 133, operatively supports a lift bar 134. The bellcranks 133 are operated by a cylinder 135 (FIG. 22) and the cart by a cylinder 136 (FIG. 21). Further description is not believed necessary since the conveyor unit 124 is similar to the unit 54 fully set forth above. Furthermore, the structure of loading elevator 119 is fully described hereinafter in connection with its relation to the transfer area E.

The elevator structure

In FIGS. 21 to 28 inclusive, it will be seen that a carriage, generally designated by the numeral 140, is movable in a vertical direction relative to a framework 141 of the elevator 119 by means of driving means 142. The framework 141 is formed by spaced, vertically-disposed beams 143 based in a well area and interconnected at their uppermost ends by horizontally-disposed beams 144 (FIG. 27) which support a motor 145 adapted to drive a shaft 146 through a transmission unit 147. The shaft 146 is journaled in bearings 148, mounted on the beams 144, and carries sprockets 149. Chains 150 are trained about the sprockets 149 and one end of each chain is attached to the carriage 140 at its upper end, while the opposite end of each chain is attached to a counter-balance 151. Similar chains 152 are in a like manner attached to the lower end of the carriage 140 and the counter-balance 151. The chains 152 are trained about sprockets 153 mounted on a shaft 154 that is journaled in bearings 155 supported on brackets 156 in the vicinity of the base of the framework 141. Thus the motor 145 raises and lowers the carriage 140 with the weight thereof equalized by the counter-balance 151.

The carriage 140 is comprised of a substantially rectangular frame 157 formed by vertically disposed pairs of channels 158 and 159 and horizontally disposed channels 160 and 161. On the outwardly directed surfaces of channels 158 and 159, facing the transfer area E, several plates 162 are secured to mount a carriage conveyor frame 163 and an inverted mounting frame 164. Insulated panels 165 and 166 (FIG. 22) are provided with frame structures 167-168 rigidly connected to the outer ends of the respective frames 163 and 164 and to the carriage 140 thereby partitioning the shaft of elevator 119 from the transfer area E in a manner to be disclosed.

As shown in FIGS. 22 and 24, the upper channel 160 of the carriage 140 is equipped with brackets 169 to which the chains 150 are connected, while the lower channel 161 is similarly provided with brackets 170 for connecting the respective ends of chains 152 thereto. Also as viewed in these figures, the carriage 140 traverses a vertical path guided by rails 171 that are supported on the outwardly directed surfaces of flange 172 and beams 143 by means of brackets 173. On oppositely disposed surfaces of the rails 171 (FIG. 28) areas of rolling contact are afforded for pairs of rollers 174 mounted by brackets 175 in vertically spaced relation on the outermost channels 158. On the upper and lowermost brackets 175 a third roller 176 is journaled and adapted to engage a third surface of each rail 171. Thus, while the pairs of rollers 174 guide the carriage 140 in its vertical movements, the rollers 176 restrain the carriage from lateral motion.

The carriage is balanced by the above-disclosed weight 151 which is comprised of a rectangular frame 177 (FIGS. 21 and 22) formed by vertically-disposed channels 178 and horizontal channels 179. The channels 179 are suitably pierced to receive rods 180 which pass through several bars 180′, providing the actual weight of the counter-balance, and are rigidly attached to the upper channel 179 and thereabove are equipped with couplers 181 to which the related ends of chains 150 are attached. The bars or weight elements 180′ are arranged in vertically-disposed relationship on the lowermost channel 179 and between the channels 178; the rods 180 passing through each of the bars 180′. The lower end of each rod 180 has a threaded portion adapted to receive one end of a turn-buckle 182. The opposite end of each turn-buckle carries an eye-bolt 183 to which the respective ends of chains 152 are attached to provide the required amount of tension in the pairs of chains 150 and 152. The counter-weight or balance 151 is guided by means of shoes 184 along rails 185 mounted on the oppositely disposed inner surfaces of the webs 186 of the beams 143 by brackets 187 (FIGS. 27 and 28).

Accordingly, the carrier 140 is adapted to receive a carrier K from the conveyor system 122, as indicated by the legend line "Return" in FIG. 27, to lower the carrier K to the "Transfer" level and then raise the carrier K, loaded with a pair of glass sheets, to the "Sealing" level. At the level designated by the legened "Sealing," a carrier K, to which two preheated glass sheets has been transferred, is removed from the carriage 140 and is received upon the sealing conveyor system 120.

Referring to FIGS. 21, 25 and 26, the upper or carrier return conveyor system 122 is supported on a framework comprised of channels 188 rigidly connected to the main structure 189 of the sealing apparatus. By means of beams 190, a plurality of equally spaced bearings 191 are mounted on the channels 188. Each transversely related pair of bearings 191 mounts a shaft 192 on the ends of which rolls 193 are secured. As viewed in FIG. 26, the opposite end of each shaft 192 carries a pinion 194 which meshes with a worm 195. The worms 195 are rotated by support shafts 196, which are journaled in aligned bearings 197 mounted on one of the beams 190, and each shaft 196 is connected to a source of mechanical power 198 by sprocket and chain drives 199. Preferably, the drives 199 are arranged along the conveyor 122 in such a manner that a number of areas are afforded on the conveyor wherein a carrier may be halted.

Each power source 198 is controlled by one or more limit switches which are adapted to be actuated by a forwardly moving carrier. This permits the halting of the lead carrier K on the return conveyor 122 at a point adjacent the elevator 119 in the event that movement of the carriers K, along the sealing conveyor 120 therebeneath, has been stopped. The "lead" carrier K, upon being halted at the end of the conveyor system 122 adjoining the elevator 119, will institute the operation of a series of controls which, at proper intervals, halts subsequent carriers along the conveyor 122. Conversely, when movement of carriers K along the conveyor system 120 is resumed, the removal of the so-called "lead" carrier K from the conveyor system 122 will initiate forward motion of the other carriers thereon retaining the relative spacing between the carriers.

Thus, the carriers K are moved along the conveyor system 122 as indicated by the arrow in FIG. 21 until, at the end adjoining the elevator 119, further motion is halted upon engagement of a control switch 200, or in the event that the carrier is inadvertently moved beyond this area, its further progress is arrested by a mechanical stop device, generally designated by the numeral 201. The stop device (FIGS. 25 and 26) consists of a vertically movable slide plate 202, carried in a mounting bracket 202′ secured to channels 188, and an actuating lever 203 pivotally supported on a shaft 204 that is mounted in bearings 204′. The outwardly directed end 205 of this lever is positioned to be rotated by the carriage 140 as the elevator moves upwardly to lower the slide plate 202 from engagement with a carrier K. Normally, the spring 206, attached to lever 203 and bracket 202′, serves to maintain the plate 202 in its uppermost or arresting position.

As the carriage 140 of the elevator 119 moves upwardly from the lowermost position (Transfer), as shown in FIG. 27, to the uppermost position (Return), it actuates a number of limit switches which initiate the advance of carrier K from the conveyor system 122 onto carriage 140. For this purpose, the carriage 140 is equipped with a roll conveyor arrangement consisting of rolls 207 carried by shafts 208.

As illustrated in FIGS. 23, 24 and 29, the shafts 208 are arranged transversely of the frame 163 and are mounted thereon by means of bearings 209 supported on longitudinally arranged beams 210. Shafts 208 are equipped with pinions 211 operatively driven by worms 212 on shaft 213. Shaft 213 is journaled in bearings 214 and mounts a sprocket 215 that is coupled to a drive sprocket 216 by chain 217. The shafts 208 are rotated by a reversible-type motor 218 and transmission unit 219, mounted on an auxiliary frame 220 of the frame 163 through chain 217. When a carrier K is positioned centrally between the ends of the frame 163, the operation of the motor 218 is terminated and simultaneously therewith the carrier is engaged by a stop-device 221 located on the frame 163. In order that the carrier K, when moved onto the rolls 207, does not "over-run" the carriage 140, a secondary stop or abutment 222 (FIG. 24) may be employed.

The stop-device 221 is comprised of a vertically-disposed bar or "dog" 223 carried by a bracket 224 mounted on a support channel 224′ of the beams 210 (FIG. 29). The dog 223 is biased by a spring 225 toward its uppermost position and is connected to a solenoid actuated air cylinder 226 for moving the dog downwardly. As will be more fully described hereinafter, the upper end of the dog 223 is adapted to engage the carrier K as the same is moved thereover and when the transverse axis of the carrier is in vertical alignment with the transverse axis of the frame 163. For this purpose, each carrier K is provided with a plate 230 formed with notches 231 and 232; the dog 223 presently being adapted to enter the notch 231.

The secondary stop 222 is mounted at the "far" end of the frame 163, as viewed in FIG. 24, in the path of carrier K when the carrier is being moved in a leftward direction by the pairs of rolls 209. Obviously, in normal operation as a carrier moves onto the carriage 140, the dog 223 stops the carrier K in the above-described predetermined position. However, the stop 222 affords a safety factor for preventing the carrier from over-running the carriage and accidently falling therefrom. The stop 222 includes a vertically-disposed post 226′ mounted in a bracket 227 attached to the frame 163. The post 226′ is equipped at its upper end with an abutment plate 228 and, at its lower end with a handle 229, by means of which the post can be lowered to remove the plate 228 from the path of the forwardly-moving carrier. Forward movement of a carrier beyond the intentionally disabled stops 221 and 222 enables the removal of any carrier into a service or repair area, indicated generally at 229 in FIG. 21.

The glass sheet carrier

Each carrier K, as illustrated in FIG. 13 and more particularly in FIGS. 30 to 38 inclusive, is basically formed by a "skid" type base or platform 240 which traverses the several conveyor systems on hardened rails or runner bars 241 attached to the bottom surfaces of the longitudinally disposed side walls 242 thereof. While the bars 241 are adapted to be carried on movable supports such as the rolls 193 of the conveyor system 122 or the similar rolls 207 on the carriage frame 163, they are likewise guided by pairs of rollers 243 individually mounted on brackets 244. These rollers and brackets are arranged on the conveyor 122 medially between the shafts 192 and generally with reference to the ends thereof opposite to the above-described pinions 194. Since the proximate runner bar 241 is simultaneously in rolling contact with several pairs of rolls 243, it will be apparent that the carrier K will not deviate from its intended straight-forward course of movement.

Essentially, the upper surface of the base platform 240 is utilized to provide a support for vacuum platens 245 and 246 and the devices whereby motion of the platen 246 is obtained and other devices for evacuating both platens to pick up and retain the two sheets of glass. The platens 245 and 246 are similar in construction, as illustrated in FIGS. 39 and 40; however, the platen 245 is mounted in a stationary position while the opposed platen 246 is mounted for relative reciprocal and rotary movements. The platen 245 is carried by a horizontally disposed beam 247 supported on the platform and at its opposite ends by tubes 248 and 249. The beam 247, in its central area, is provided with a transverse bore 250 into which an annular, hollow support member 251 is fitted and retained by a ring plate 252. The member 251 is closed at its opposite end by a wall 253 on which the platen 245 is securely mounted by bolts 254.

The tubes 248 and 249 are heavy walled and grooved externally to provide a seat which complements a rest formed in the support surfaces of posts 255 arranged in the corners of the platform 240. This mounted relation of the tubes 248 and 249 on the platform 240 is secured by cap blocks 256 and set-screws 257 (FIGS. 30 and 31). In addition, each bar is provided with setting blocks 258 (FIG. 41), which depend therefrom when said bars are in their mounted positions. Adjusting screws 259 are threaded through each of the posts 255 to bear against the face of a setting block for aligning the platen 245.

The beam 247 is fixedly secured to the respective outer end of the tube 248. On the other hand, the opposite end of the beam 247 is supported by the tube 249 in a manner which permits compensation for expansion of the parts exposed to the highly-heated atmosphere of the sealing section. For this purpose, the end of tube 249 is formed with a square portion 260 that is slidably received in a yoke 261 formed in the related end of the beam 247 and a plate 262 is secured, as by bolting, to the outer surface of square portion 260 to prevent endwise motion of the yoke.

The vacuum platen 246 may aptly be termed the "traverse" platen because it is mounted for movement toward and away from the platen 245 and for rotation about its axis. For these purposes, the platform 240 is formed with upwardly directed ears 263, equally spaced from the transverse axis of the platform and aligned in pairs to support the ends of a pair of rods 264. A base member 265 is slidably mounted on the rods 264 by means of sleeve bearings 266 contained in lugs 267 extending outwardly from the base 265. On the upper surface of the base member 265, a hollow shaft 268 is journaled in bearings 269 positioned on said base member in vertical parallelism with the transverse axis of the platform 240 and the reciprocal axis of motion of the base 265.

At its end, remote from the base 265, the hollow shaft 268 mounts the vacuum plate 246 by means of a bracket 270 flanged at both ends. As shown in FIGS. 32 and 40, the bracket 270 is bolted to the rear wall 271 of platen 246 and accurate mounting is established through an axially disposed pilot plug 272 projecting from the bracket into an annular recess 273 provided in said rear wall of the platen. The opposite flanged end of the bracket 270 is similarly provided with a pilot plug 274 secured into a recessed block 275 serving to close the immediate end of hollow shaft 268. Thus, the platen 246 is mounted on the base 265 for reciprocating motion by a cylinder 276 toward and away from the stationary platen 245 and, in addition, for rotary motion by means of a gear drive 277, associated with the opposite end of the shaft 268.

The reciprocatory and rotary movements of the platen 246 are accurately controlled by a monitor system which, at the initiation of the sealing operation, stops forward motion of the platen 246 with respect to the stationary platen 245 to determine the distance between the glass sheets 11 and 12 and thereby establish the thickness of the dead-air space 17 in the completed all-glass glazing unit. During the sequential steps of the sealing operation, the monitor system is further adapted to stop the platen 246 with respect to the platen 245 to enable rotation of a partially completed unit as it is indexed to position unsealed edges of the glass sheets for sealing. Additionally, such subsequent spacing of the platens from one another reduces, if not eliminates, any possibility for the surface of the sheet, proximate the platen 245, to be scratched or otherwise marred as it is moved or rotated with reference thereto.

Forward and rearward reciprocal motion of the platen 246 is effected by means of the cylinder 276 which, as viewed in FIG. 30, is mounted on the platform 240 in spaced relation to the base 265 and connected thereto by the connection of the outer end of a piston rod 278 to a mounting block 279 carried by an adjoining lug 267. Hydraulic pressure is applied alternatively to the opposite ends of cylinder 276 through a four-way control valve 280 and tubing conduits 281 and 282. The valve 280 is mounted on a supply tank 283 and is connected in a conventional manner to a motor driven pump 284.

The monitored limit of the forward component of the reciprocal movements of the base member 265 is established by several gaging elements, generally designated by the numerals 285, 286 and 287 in FIGS. 30, 34 and 35; while the rearward component of movement is controlled by the length of "stroke" of the cylinder. An element 288 (FIG. 34) is attached to the movable base 265 by a block 289 secured to the previously described block 279. In order to adjust the amount of forward movement, the element 288 consists of a threaded rod 290 equipped with pairs of lock-nuts 291, 292 and 293. The lock-nuts 291 are located adjacent the outermost end of rod 290 and limit the forward movement thereof according to their spacing from a block 294 mounted on a fixed support plate 295 secured to the upper surface of the platform 240 and which constitutes the first gaging device 285. The extent of spacing between the lock-nuts 291 and block 294 of this first gaging device defines the length of forward movement required by the base 265 to carry the vacuum platen 246 into surface contact with a glass sheet, such as the sheet 11, when said sheet and the mating sheet 12 are supported in substantially surface contact on the rack J in the transfer area E. This accurately gaged distance or length of movement is for the purpose of gently urging the outer surface of platen 246 against the outwardly facing surface of sheet 11 while lightly pressing the surface of platen 245 against the outwardly facing surface of sheet 12.

The pairs of lock-nuts 292 and 293 are respectively engaged by similar gaging devices 286 and 287. The gaging devices 286 and 287, as seen in FIGS. 34 and 35, are each comprised of a sliding yoke block movable into and out of the reciprocatory path of the rod 290 and, upon engagement with the respective pairs of lock-nuts 292 and 293 thereon, interrupt the forward motion of the base 265. For this purpose, each gaging device is formed by a similarly mounted yoke block 296 or 297 supported on individual brackets 298 or 299. Likewise, each block 296 or 297 is provided with a notch 300 through which the rod 290 is moved. In the instance of the gaging device 286, the block 296 thereof is operatively connected by a rod 301 to the armature 302 of a solenoid 303 mounted on plate 295. On the other hand, the block 297 of gaging device 287 is connected by a rod 304 to the armature 305 of a solenoid 306. Accordingly, for purposes to be hereinafter more fully described, the lock-nuts 291 upon contact with the gaging device 285, set up a first length of movement of the traverse platen 246; the lock-nuts 292, upon contact with the gaging device 286, determining a second length of movement for the platen 246; and the lock-nuts 293, upon contact with the gaging device 287, determining a third length of motion for the platen 246.

Rotary movement of the hollow axle 268 and the platen 246 is accomplished by the gear drive 277 which, as shown in detail in FIGS. 37 and 38, includes a driving worm gear 307 and a driven element 308. The drive worm 307 has a single tooth 309 successively engageable with a plurality of radially spaced rollers 310 on the driven element 308. The generated lead of tooth 309, in approximately two-thirds of a full revolution of said drive gear, produces approximately a one-quarter turn of the shaft 268 through progressive engagement with the rollers 310 rotatably mounted on a collar member 311 connected to the end of the shaft 268. The remaining one-third rotation of the worm 307 constitutes a "dwell" period during which the platen 246 and sheet or sheets of glass rotated thereby will be slowly brought to a stop position wherein the sides of the sheets to be next sealed are horizontal.

The worm 307 is secured to a shaft 312 that is journaled by bearings 313 in a housing 314, secured to the base member 265. One end of shaft 312 is connected through an electro-magnetic clutch 315 to a continuously operating motorized transmission unit 316 (FIG. 31). A brake element 317 for the clutch 315 is mounted on a vertically-disposed plate 318 bolted to a portion of the wall of the housing 314. The motorized unit 316 is carried by a bracket 319 on the base member 265 as shown in FIG. 31. On the opposite end of shaft 312 is a control lever 320, adapted during each complete rotation of the shaft 312 to actuate the lever of a limit switch 321 mounted by bracket 322 on the base member 265, thereby disengaging the clutch 315 upon completion of rotation of the axle 268 through an arc of substantially 90°. However, during certain steps in the sealing operation, the switch 321 is shunted out by a further control device whereby the vacuum plate 246 and glass sheets are rotated 180°.

During the above-described movement of the platen 246, the sheets 11 and 12 are supported by the continuous application of a vacuum to the platen 246 and by the intermittent application of a vacuum to the platen 245 through systems originating in vacuum pumps 323 and 324. Each of these pumps and the motors therefor is mounted on a rectangular platform 325 supported on and above the surface of the base member 265 by posts 326 arranged at the corners thereof. The vacuum side of pump 323 is connected by flexible tubing 327 to the inlet side of a four-way valve 328 supported by a bracket 329 on the platform 240. This valve may be actuated by an electric control indicated at 330. One side of valve 328 is connected by tubing 331, equipped with a T fitting 332, to a conventional air filter 333 mounted on bracket 329. The opposite side of the filter is connected by tubing 334, having an expansion coil 335 therein, to the platen 245.

A major portion of the tubing 334 is axially located in the support tube 248 and at the outer end thereof extends laterally along the beam 247 and into the centrally disposed, chambered recess of the support member 251. To reduce vibration, the tubing is supported by a bracket 336 on the adjacent surface of the beam 247. The tubing 334 is connected, through a suitable coupling 337, to the stationary platen 245.

The opposite side of the valve 328 is connected by tubing 338 to the above-described T fitting 332 which operates to provide a positive pressure within the tubing 334 thereby forcing the sheet of glass out of contact with the platen 245 in the event that one or both of the sheets is damaged. Likewise, the valve 328 is connected by tubing 339 to a similar filter 340 carried on bracket 329 which affords an open source for the pump 323 when no vacuum is to be applied to the platen 245. The exhaust side of the valve may be open to atmosphere as at an open fitting 341 so that the evacuated condition of tubing 334 may be immediately vented or relieved when desired. A suitable gage 342 may be interposed in this vacuum system.

The complementary pump 324 is connected by tubing 343 to a four-way valve 344 supported on a shelf 345 carried by the bracket 319 and the movable base member 265, as distinct from the valve 328 which is mounted on the base platform 240 of the carrier. As in the case of valve 328 (FIG. 33), the valve 344 is connected by pieces of tubing 346 and 347 and a T fitting 348 to one side of an air filter 349. The opposite side of the filter 349 is connected by tubing 350, provided with an expansion coil 351, to a rotary gland 352, carried on a bracket 353 attached to the rear wall of housing 314. However, a T fitting 354 is interposed in this piping arrangement which by tubing 355 completes the control of valve 344 to a vacuum actuated switch device 356 suitably mounted on the bracket 322. Likewise, the valve 344 is connected by tubing 357 to a second filter 358. In this particular instance, the exhaust side of the vacuum pump 324 is connected by tubing 359 to the exhaust side of the valve 344 which otherwise would normally open the tubing pieces 346–347 to atmospheric pressures through the valve. This connection is for the purpose of directing air under pressure through the respective tubings 346, 350 and the gland 352 at one step of the sealing operation. The opposite side of gland 352 is connected by tubing 360, within the hollow shaft 268 to the vacuum platen 246. The bracket 270 supports the tubing at the platen. The control 330 for valve 328 and the similar control 361 for valve 344 provide means for simultaneously creating a vacuous condition for both of the platens 245 and 246, or to individually control one or the other of the said valves. This will operate to vacuously sustain the glass sheets on their respective platens or permit the glass sheets while united as a partially completed, or as a completed unit, to be vacuously supported on one of the platens only.

In FIGS. 39 and 40, there is disclosed the "working" surface of either of the platens 245 or 246 and a vertical detail section through the same. The working surface of each platen is provided with a plurality of vertically and horizontally disposed, substantially rectangular grooves 362 and 363 which subdivide the surface into a plurality of contact areas 364. The outermost grooves 362 and 363 are interconnected to form a continuous boundary groove 365. By means of these intersecting open grooves, communication is afforded across the platen surface with a centrally disposed aperture 366. In the platen 245, the aperture 366 is open to the fitting or coupling 337 and completed through tubing 334 to the vacuum pump 323 while in platen 246, the aperture 366 communicates through the tubing 360 with the vacuum pump 324.

It has been found advisable to treat the surfaces of the platens with a composition to produce a thin surface film thereupon which operates to "soften" the effect of contact of the hard metallic surface against the slightly plastic glass surface. The contact may to some extent be controlled by the spaced distance between the opposed surfaces of the platens, particularly in the transfer area E, to prevent the formation of "shadowy" impressions of the platen surfaces on the glass surfaces which may impair the optical clarity of the finished glazing units.

The controls for the four-way valves 280, 328 and 344, as well as the solenoids 303 and 306, together with other controls to be hereinafter described, are contained within a panel box 367 which with a transformer 368 is mounted on the carrier platform 240 as shown in FIG. 30. Each carrier is equipped with sliding electrical contactors or brushes 369, 370 and 371 pivotally supported on the undersurface of the platform by means of substantially identical levers 372, as shown in FIG. 31, and electrically connected to the transformer 368. Referring to FIG. 30, the contactors are adapted to slidably engage bus bars 373, 374 and 375 insulatingly mounted on the conveyor system 120 and shielded from one another by insulation plates or strips 376.

The functioning of the control devices for the platens 245 and 246 is initiated and terminated by a plurality of limit switches carried by the carrier K and adapted to be engaged in sequence by stationary cam plates or the like mounted on the structure of the conveyor 120. The relative positions of these switches is shown best in FIGS. 30, 31 and 32, wherein it will be observed that switches 377 to 384 inclusive and a contactor block 385 are mounted on a vertically disposed bracket 386 secured to the platform 240. The previously described limit switch 321 is of course supported on bracket 322 and operated by the lever 320. Likewise, a block 387 is carried at the lower end of an armature 388 of the solenoid 389 mounted on the bracket 386; said block being normally held in an inoperative position by a spring 390.

Broadly stated, the air-controlled switch 356, when influenced by a vacuous condition in the tubing pieces 350 and 355, will energize the solenoid 389 to lower the block 387 to sequentially engage one or more limit switches situated along the frame of the conveyor system 120, with the closure of each switch initiating or terminating a particular function or step of the sealing operation. Obviously when a carrier K traverses the conveyor 120 and a pair of glass sheets are not supported on the platens 245 and 246, an evacuated condition does not exist in the tubing pieces 350, 355 and 360 and switch 356 and solenoid 389 will not be activated. This will eliminate the sealing functions normally carried out in the section C since the block 387 will remain in its upper position and will not engage the limit switches as the carrier K traverses the conveyor 120.

Each carrier K is additionally equipped with a device, generally designated by the numeral 391 in FIGS. 30, 32 and 36, for signaling when the lower, unsealed edges of the glass sheets are not horizontal and therefore not properly aligned with respect to a sealing station. This indicating device is comprised of a rotating member 392 and a vertically movable rod 393; the actuator member 392 being rigidly mounted on the hollow shaft 268 and rotatably moving therewith during each indexing step to locate a successive pair of marginal edges of the glass sheets in the sealing position. The rod 393 is supported for vertically reciprocal motion by a frame 394, mounted on the movable base member 265, and the rod is provided with an adjustably mounted washer 395 and a spring 396 urging the rod 393 downwardly. At its lower end, the rod carries a yoke block 397 supporting a roller 398.

The roller 398 traverses the annular periphery of the actuator member 392 entering any one of four notches 399 spaced equally about the periphery of the member. As viewed in FIG. 36, as the hollow shaft 268 rotates through an arc of 90° or 180°, the roller 398 will be moved outwardly of a notch 399 and caused to traverse the intervening peripheral surface 392' of the member 392 toward an adjoining notch; this action raising the rod 393, against the compression of the spring 396, to elevate the cross-arm 393' above the position shown in FIG. 36.

In the event that indexing of the platen 246 results in either over-travel or under-travel, the cross-arm 393' will remain elevated to actuate a limit switch and signal an alarm, as will be fully described hereinafter. Specifically, the device 391 is employed to alert operators of the apparatus that the edges of the glass sheets to be next sealed together have not been properly turned to a desired horizontal plane. Upon a normal completion of an indexing motion, the roller 398 again enters a notch 399 and consequently the spring 396 retracts the cross-arm 393' as the rod 393 is moved downwardly. In order that the rod 393 will be confined to vertically directed movements, guide rollers 400, mounted in brackets 401 carried by the frame 394, engage the oppositely disposed sides of the yoke block 397.

The above-described devices on each carrier K are shielded from the highly heated atmosphere of the sealing section C by a thermal barrier 402 (FIG. 32) mounted on the outer surface of the side wall 242 of the carrier platform 240 by bolts 403. The end walls of each carrier are equipped with wooden bars 404 which serve as bumpers to prevent serious damage to the apparatus in the event the carriers should collide while they are moved along the conveyor 120 in end-to-end relation.

*The sealing section of the apparatus*

The sealing section C, positioned between the preheating section B and the annealing section D, is defined by communicating passageways through which the platens 245 and 246 are conveyed while the main body of each carrier K traverses the externally disposed conveyor systems 120 and 122 and is carried upwardly and downwardly by the elevators 119 and 121. The section C is thus formed by a sealing passageway 405 (FIG. 23), a return passageway 406 (FIG. 26), an elevator well or shaft 407 in the transfer area E and a like elevator shaft 408 in the oppositely disposed transfer area F.

The passageways 405 and 406 are defined by a suitably insulated front wall 409, a rear wall 410, top wall or ceiling 411 and bottom wall or floor 412. A horizontally disposed partitioning wall 413 is interposed between the ceiling 411 and floor 412 walls to thermally separate passageways 405 and 406 from one another. The section C is further enclosed by end walls 414 and 415 situated in the transfer areas E and F respectively. The sealing passageway 405 is normally closed by the door 130 between the sealing section C and the return tunnel H and by a similar door (not shown) between section C and the return tunnel R.

The return passageway 406 is enclosed and heated to maintain the temperature of the platens 245 and 246 of each carrier K at substantially the same temperature as that of the glass sheets transferred thereto at area E. The path N of the carriers K, previously described with reference to FIGS. 1 and 2, accordingly is along the upper return conveyor system 122, downwardly on loading elevator 119 through the shaft 407, forwardly along the conveyor section 120 and then upwardly on the unloading elevator 121 through the shaft area 408.

In order that the platens 245 and 246, the beam 247 and portions of the bars 248 and 249 may be moved through the enclosed passageways 405 and 406 with the body or platform of each carrier K movably supported on the external conveyors 120 and 122, the rear wall 410 is provided with elongated slots 417 and 418. To substantially reduce loss of heat from and prevent ingress of cooler air into the passageways 405 and 406, each of the slots is closed by a flexible curtain 419 comprised of a plurality of metallic bead chains 420 individually suspended in juxtaposition and adapted to slide over the tubes 248 and 249 and drop into place as a carrier K traverses the conveyors 120 and 122.

To prevent excessive heat loss during the vertical movements of the carriage 140 of elevator 119 within the shafts 407 and 408, the rear wall 410 is provided with a vertically open area 421 that is sealed by the previously described insulating panels 165 and 166 carried by the carriage 140 as the elevator moves up and down. As viewed in FIGS. 22 and 23, it will be seen that the panels close the major portion of the open area 421 while the lower end thereof is closed by an insulation panel 422 and the upper end by a similar panel 423 (FIG. 27). The panels 165 and 166 are spaced from one another a distance substantially equal to either of the slots 417 or 418 to accommodate movement of the bars 248 and 249 as a carrier K is moved horizontally onto and from the carriage 140. Likewise, to allow vertical movements of the bars 248 and 249 and the shaft 268 into and from the transfer area E, the panel 422 is provided with elongated vertically disposed notches or slots 424 thereby enabling a carrier K to be lowered to the "Transfer" level. Upon reference to FIGS. 22, 23 and 27, it will thus become apparent that vertical movement of the elevator carriage 140, the panels 165 and 166 cooperate to close the area 421 of the shaft 407.

Heating elements 425 (FIG. 41) are mounted on the walls 409 and 410 to maintain the atmosphere of the passageway 405 at the required temperature for the glass sheets during the sealing operations.

Referring to FIG. 21, the floor 412 of the sealing section C, in the vicinity of the transfer area E, is provided with one or more hoppers 426, suitably closed by doors 427. The hoppers 426 are adapted to receive both of the glass sheets in the event that either is broken or damaged sufficiently to break the vacuum at the corresponding platen. As previously disclosed, and when a vacuum is not applied to the platen 246, the block 387 will be held in its uppermost position and out of contact with any of the limit switches that it normally engages. In this event, the associated carrier K continues through the sealing areas without causing operation of the sealing devices in the sealing areas.

To support a pair of glass sheets as they are moved along a straight path through the first and second sealing stations, vacuum is applied to both of the platens 245 and 246 to hold the respective sheets thereagainst. However, as described above, motion of the platen 246 is stopped by engagement of lock-nuts 293 with the gaging device 287 as the carrier K approaches the third and proceeds through the fourth sealing stations. This spaces the sheet 12 from the platen 245 and consequently the partially completed unit is then moved along a path parallel to its original line of movement. To receive the sheets for the fusing operation in the third and fourth stations, the sealing units therein are located in an aligned relation parallel to but spaced from the alignment of the preceding units a distance substantially equal to the space between the sheet 12 and the platen 245.

The sealing unit

As previously set forth, the glass sheets 11 and 12 are carried through the several sealing stations, designated by the legends 1, 2, 3 and 4, where the marginal edges on each of the four sides are progressively heated to a semiplastic state and are then passed between forming rollers to press the margins together, thereby fusing the glass in the contacting area into integral side walls. Immediately after a side wall has been formed between the rollers, the exterior surface of the side wall is fire-polished in a second heating area.

Each of the sealing stations is provided with a unit generally designated by the numeral 430, and which includes a control device 431, a fusing burner 432, a pair of forming rollers 433 and a polishing burner 434. As shown in FIGS. 42 to 53 inclusive, the unit 430 is comprised of a base frame 435, a mounting platform 436 and a support structure 437 for the control device 431, burner 432, forming rollers 433 and burner 434. More particularly, the base frame 435 (FIG. 46) includes a horizontally disposed plate 438 provided with webs or bracing members 439 and annular sleeves 440 arranged in the corners of the plate 438. As viewed in FIGS. 42, 43 and 46, the base frame 435 is adapted to traverse horizontally mounted rails 441 by means of casters 442; said rails being supported on bases 443. The shafts 444 for casters 442 are fixedly mounted in blocks 445 forming integral parts of the base frame. Upon lowering of the sealing unit as described below, it is possible to remove the same from within the sealing section C to a point outside of the apparatus where the several elements thereof can be serviced when necessary.

The mounting platform 436 includes a rectangular and horizontally disposed table member 446, the undersurface of which is provided with a centrally disposed hub 447 and with annular brackets 448 arranged in the corners thereof. The platform 436 is supported above the base frame 435 on the piston rod 450 of a vertically disposed cylinder 449 and is guided by a plurality of rods 451. The cylinder is secured to the plate 438 while the piston rod 450, passing through an aperture 452 in plate 438, is attached at its upper end to the table 446 of the mounting platform in the hub 447 thereof. On the other hand, the guide rods 451 are secured at their upper ends in the brackets 448 and are slidably received in bearings 453 fitting into the opposite ends of base frame sleeves 440 and retained by cap plates 454.

The support structure 437, carried by the platform 436, includes an upper plate 455 (FIG. 44) and lower plate 456 which are joined by hollow sleeves 457. The plate 455 is rectangular in outline and has substantially the same area as the table 446 of the mounting platform while the lower plate 456 (FIG. 45) is generally in the form of a cross, having longitudinally and transversely disposed extensions 458. The support structure 437 is fastened to the mounting platform 436 by keys 459 (FIG. 45) and bolts 460 that are passed through the sleeves 457 and threaded into tapped openings in the table 446. The structure 437 together with the fusing equipment mounted thereupon accordingly can be bodily removed from the mounting platform 436 by withdrawal of the bolts 460. In assembled relation, the support structure and mounting platform are enclosed by hollow panels 461 that are attached by bolts 462 to blocks 463 arranged in the corners of the table member 446 and blocks 464 similarly disposed on the plate 455. Each of the panels 461 in its opposed lower corners is equipped with pipes 465 and 466 connected to sources of a fluid coolant whereby the operating devices, enclosed by the panels, are shielded from the high temperatures maintained in the sealing section C. The box-like enclosure 467 formed by the panels 461 is moved vertically by the cylinder 449 through an opening 468 provided in the lower floor 412 of the sealing section. The clearance between the walls of the opening 468 and the surfaces of the panels 461, as shown in FIG. 42, may be sealed by insulation material 469, supported by brackets 470, to prevent entry of cooler air into the sealing section.

The control device 431, the burner 432, the forming rollers 433 and burner 434 comprising the elements of the sealing unit, are illustrated in one embodiment of their respective positions in FIG. 44. This arrangement is typical of the sealing units associated with the sealing stations 2, 3 and 4; however, at the first sealing station, a device, generally designated by the numeral 471 in FIG. 47, is interposed between the burner 432 and the pair of forming rollers to insert a hollow grommet into the side wall as it is fused.

Attention is first directed to the control device 431, as illustrated in FIGS. 44 and 49, which includes a U-shaped body or bifurcated block 472 mounted by means of bolts 473 on the upper plate 455 of the structure 437. The oppositely disposed inner surfaces of the vertically disposed legs 474 and 475 of the block 472 are substantially equally spaced from the longitudinal axis of the sealing unit, and more significantly, equally spaced from the outer surfaces of the sheets 11 and 12 as they are advanced through the sealing section C by a carrier K. The surface 476 of leg 474 is provided with recesses in which plates 477 and 478 are secured. The plates are each equipped at their center with a small elongated, vertically disposed slot or orifice, respectively numbered 479 and 480. Rearwardly of the plates 477 and 478, the leg 474 is tapped to receive the threaded ends of pipe fittings 481 and 482. Through suitable conduits 483 and 484, air under pressure is directed by a distribution block 485 from a pipe 486 which includes a coiled section 487 and a fitting 488 connected to a supply pipe. The air passing through the coils 487 is heated, prior to emergence from the plate orifices 479 and 480, to sustain the relatively high temperature at the marginal edges of the sheets. This also operates to reduce turbulence and rapid expansion of air as it is directed into the hot atmosphere.

The opposed leg 475 of the block 472 is similarly provided with plates 489 and 490, having vertically disposed orifices 491 and 492 respectively, aligned in a horizontal plane with the orifices 479 and 480 of the plates 477 and 478 in block leg 474. Likewise, the leg 475 is tapped to receive the threaded ends of pipes 493 and 494. Jets of air suitably heated and under pressure are directed from the orifice 479 in plate 477 toward orifice 491 in opposed plate 489 and from orifice 480 in plate 478 to the orifice 492 in plate 490.

The utility of two jets or streams of air is directed to the use of a diaphragm control valve that is activated by any unbalance created between the upper air stream $u$ and the lower air stream $l$ (FIG. 49). In the specific embodiment herein disclosed, the upper stream or jet of air is directed across the path traversed by the glass sheets 11 and 12 and the amount of pressure received at the orifice 491 becomes instrumental in causing the sealing unit 430 to be moved vertically—i.e. upwardly or downwardly—until the burner 432, the pair of rollers 433 and the second burner 434 are situated at a predetermined elevation with reference to the margins of the lowermost edges of the glass sheets.

In order that the relative elevations can be repetitively established, a gaging member 495 is employed to obstruct the volume of the lower air stream between the orifices 480 and 492, or in other words, to reduce the effective pressure received in orifice 492 to approximately half the pressure emitted from orifice 480. Therefore, between the sealing operations, there will exist a full volume of pressure between the upper orifices 479 and 491 and a lesser volume received at the lower orifice 492 and from the opposed orifice 480. However, when the leading lower corners of the glass sheets 11 and 12 pass between legs 474 and 475 of the control device, the effective pressure of the upper air stream will be dependent upon the elevation of the sheets' lowermost edges. In other words, a desired pressure condition is obtained when the said edges are disposed so as to reduce the volume of the upper air stream to the volume of the normally maintained reduced pressure of the lower air stream.

Accordingly, when the entering sheet corners obstruct the upper air stream so as to reduce the pressure thereof below that pressure of the lower air stream, the level of the sealing unit is too high to produce a satisfactory seal. Likewise, if the pressure of the upper air stream is higher than that of the lower air stream, the level of the sealing unit is too low. Either of these conditions is reflected in the diaphragm control valve which activates a mechanism for raising or lowering the sealing unit to the optimum elevation. During the passage of the marginal edges of the sheets through control device 431, the automatic phase of its operation is maintained. However, as the following corners of the sheets approach this device, means is herein provided for removing the device from automatic control and, as the following corners are carried beyond the burner 434, further means is provided for automatically lowering the sealing unit.

Referring to FIGS. 44 and 51, the burner 432 has a substantially rectangular body portion 500 supported by posts 501 on the plate 455 of the structure 437. The body 500 is provided with passageways 502 for supplying a combustible gas mixture to the burner tips 503 which project inwardly from divergent walls 504. The passageways 502 communicate through pipe 505 with a conventional mixer unit 506 to which are connected supply pipes 507 and 508. Likewise, the burner body is equipped with passageways 509 through which a coolant is carried from a source pipe 510 to a drain pipe 511. As herein shown, the coolant circulates through the housing 512 of the mixer unit 506 and enters the burner body 500 through ports 513. The gas mixture to the burner tips 503 is controlled by valves, which will be described hereinafter, and which are opened upon the approach of a carrier K toward the particular sealing station. Upon opening of the valves, the gas from the burner tips 503 is ignited by means of a pilot burner 514 mounted on a supply pipe 515 and adjustable by a valve 516.

Moving from the flames of the burners 503, the then semi-plastic lowermost marginal edges of the sheets of glass are passed between the pair of forming rollers 433 and are thereby pressed and fused together to form one side wall of the glazing unit. As shown in FIG. 52, the rollers 433 are individually mounted on shafts 517 journaled in bearings 518 contained in a housing 519. This housing is a hollow unit having coolant supply pipes 520 and 521 to maintain the space within the housing at a relatively lower temperature than the temperatures maintained in the sealing section C. The shafts 517 are joined for synchronized rotation by gears 522 (FIG. 52) while one of the shafts is connected to a gear unit 523 (FIG 45) through couplings 524 and shaft extension 525 to a motor 526. The gear unit 523 and the motor 526 are based on the lower plate 456 of the support structure 437.

To remove any tool markings or other irregularities from the surface of the newly-formed side wall and to polish the surface thereof, the polishing burner 434 is positioned adjacent the pair of forming rolls 433 and adapted to direct flames therefrom not only at an upwardly inclined angle along the side portions of the side wall but also directly upward onto the side wall Therefore, burner 434 is provided with a body portion 527 (FIG. 53) having passageways 528 connecting the burner tips 529 to a mixer unit 530, and additional passageways for moving a fluid coolant through the body from the ports 531 to the drain pipe 532. A pilot burner 514 is provided for the fire-polishing burner 434, as shown in FIG. 44.

Thus, in sequence, the steps in the formation of a side wall are as follows: the margins of the lowermost edges of a pair of glass sheets are carried initially into and between the air stream directed from the orifice 479 to the orifice 491 of the control device 431 which operates to adjust the elevation of the sealing unit 430; the edges are then heated to a semi-plastic condition by the burner 432; forming pressure is applied by the rollers 433 to fuse the marginal edges of the sheet into an integral side wall; and thereafter the side wall is polished by the flames of the burner 434.

One salient structural difference however is found in the sealing unit 430 identified with the first sealing station. This difference resides in the provision of the device 471 (FIGS. 47 and 48) for inserting a metal tube or grommet of relatively small diameter between the spaced margins of the sheets as the sheets are fused together at the forming rollers 433. This device includes a magazine or reservoir 535, a supply tube 536 and a reciprocating bar 537 which deposits individual grommets 538 on a vertical plunger 539. This plunger is supported and actuated by a parallelogram type of linkage whereby it will carry a supported grommet or sleeve in an upwardly and forwardly directed path of movement to a position between the heated marginal edges of the glass sheets as they are fused between the rollers 433. The plunger then descends and returns to its grommet receiving position. To accommodate the movements of the plunger 539, the housing 540 (FIGS. 47 and 54) for the forming rollers includes a vertically disposed slot 541 while the forming rollers 542 per se are formed with a peripheral rim or flange 543 for stripping the grommet from the plunger as it descends.

The grommet provides an opening in the glazing unit by means of which the air space therein can be dehydrated. After dehydration the opening is permanently sealed. The grommet insertion operation is initiated by the engagement of the block 385 on the carrier K with a switch. An intermittently operated burner 544 heats the grommet immediately prior to its insertion into the side wall. The accurate spacing between the glass sheets, the highly plastic condition of their heated marginal edges and the pressure exerted by the forming rollers 433 fuses the grommet in the related side wall to provide an opening for dehydrating the unit, as illustrated in FIG. 55. In the event the marginal edges tend to "warp" inwardly thereby materially reducing the spacing between the sheets, it has been found advantageous to direct cooling jets of air from nozzles 545, connected to a manifold block 546, onto the outer surfaces of the glass sheets in advance of the forming rollers 433.

*Apparatus conveyor systems*

Referring now to FIGS. 56 and 57, there is shown a substantially continuous relationship between the loading elevator 119 (at the leftmost end of FIG. 56) and the entry end of the sealing conveyor 120 and the exit end of the return conveyor 122. This portion of FIG. 56 is identical with the structure shown in FIG. 21 when viewed in the opposite direction. Likewise, as illustrated at the extreme right of FIG. 57, a similar relationship exists between the exit end of the sealing conveyor system 120, the entry end of the return conveyor system 122 and the unloading elevator 121. Accordingly, in FIGS. 56 and 57, the carriers K, each supporting pairs of glass sheets 11 and 12 in spaced face-to-face relation, proceed from left to right on the sealing conveyor 120 while the empty carriers K proceed from right to left on the return conveyor 122.

As previously set forth, the conveyor systems 120 and 122 are supported by the main structure 189 of the sealing apparatus. Thus, the rolls 193, on each conveyor, are mounted on shafts 192 supported in bearings 191 carried by beams 190. The shafts 192 are driven by several sources of power 198 through a combination of gear drives and electrically operated clutches. Since a considerable portion of the automatic control for the movements of the carriers K depends upon the continuous operation of the apparatus generally, the return conveyor system 122 is divided into individual zones or flights in which the carriers may be automatically halted in succession and upon engagement with interlocked control switches which are dependent upon initial actuation by the carrier approaching the exit end of the conveyor.

Referring particularly to FIG. 41, the sealing conveyor system 120 is supported upon a combination of transversely and longitudinally disposed channels 560 rigidly connected to the main framework 189. The horizontal components of the channels 560 support beams 561 on which are mounted transversely related pairs of bearings 562, each pair supporting a shaft 563. Each of shafts 563 is equipped with rolls 564, with one end thereof projecting through the bearing 562 to carry a pinion 565 which is meshed with a worm 566 mounted on a drive shaft 567 journaled in bearings 568. The sealing conveyor system 120 is provided with several sources of power as indicated at 569, 570 and 571 in FIG. 56. The series of supporting rolls in the entry end of the conveyor, indicated generally by the numeral 572, may be driven at variable rates of speed, in a manner hereinafter set forth, by a motor 573 associated with the power source 569. Similarly the rolls of series 574 are driven by a motor 575 associated with the power source 570 while the rolls in series 576 at the exit end of the sealing conveyor system may be driven at a variable rate of speed by the motor 577 associated with the power source 571.

The channels 560 also support a number of panels 578, 579, 580, 581 and 582 (FIGS. 41, 56 and 57) on which are adjustably affixed bars of various lengths. These bars are respectively positioned in elevational alignment with the individual planes in which the switches 377 to 384 inclusive (FIG. 41) on each carrier K are moved. Thus, there is provided on the panel 578 two control bars 583 and 584; on the panel 579, a bar 584 and additional bars 585 and 586; on panels 580 and 581, bars 585 and 586 and an additional bar 587; while the panel 582 is equipped with control bars 584, 585 and 586. Described in their relation to the switches, the bar 583 is adapted to actuate the limit switch 384; the bars 584, in each instance, operating the limit switch 380; the bars 585, the switch 381; the bars 586, the switch 382 and the bars 587 likewise operating the switch 383. Limit switch 377 is operated when a carrier K is situated on the loading elevator 119; the switch 378 while a carrier is on the unloading elevator 121; the switch 379 being in the nature of an emergency control which is actuated in a manner to be hereinafter disclosed.

Also, at each of the sealing stations 1, 2, 3 and 4, individual brackets 588 support a series of limit switches 589, 590 and 591 which are sequentially engaged by the block 387 carried on each carrier K when the block occupies its lowermost position. These limit switches complete electrical circuits for controlling the operation of the sealing units 430 at each of the stations. At the sealing station "1," an additional limit switch 592 mounted on a bracket 593 initiates operation of the grommet feeding device 471. The operable devices of each carrier K are accordingly caused to function in proper timing to movement of the carriers along the sealing conveyor system 120 and, during such movements, each of the carriers will actuate switches located in the path of their movement. On the other hand, vertically movable, solenoid operated plungers 594 (FIG. 56) are mounted on the frame of panel 578 to engage the limit switch 379 when the plungers are raised upon completion of a circuit through closure of a manually operable switch. Also, as is indicated in FIGS. 30 and 41, the plurality of bus bars 373, 374 and 375 are mounted on the conveyor system 120 to supply electrical current to each carrier through the sliding contactors 369, 370 and 371.

The position of the glass sheets relative to each sealing station is monitored as the carrier approaches each station. This is particularly important when the sheets have been turned or indexed by the gear drive 277 to position a succeeding pair of marginal edges for sealing. As shown in detail in FIG. 36, the indexing or rotating operation actuates the indicating device 391 and in normal operation the cross-arm 393′ is raised and lowered. However, in the event the indexing movement over-travels or under-travels so that the lower edges of the sheets are not parallel with the upper horizontal surface of the sealing station, the cross-arm 393′ remains in a raised position and engages a switch operating member.

As shown in FIG. 57, a pair of levers 595, fixed on rods 596 supported in brackets 597, are located between the first and second and the third and fourth sealing stations.

The unloading elevator system

Since the unloading elevator 121 is intended to carry out substantially the same functions as the loading elevator 119, but in a reverse order of sequence, it is believed apparent that an equivalent structure can be located in the transfer area F and that the details of this structure, as seen in FIG. 58, are identical with those found in FIGS. 22, 24 and 27. However, the elevator 121 lowers a carrier K, with a completed glazing unit 10, from the Sealing level to the Transfer level; raises the empty carrier to the Return level and then returns to the Sealing level to receive a succeeding carrier supporting a completed glazing unit. For this purpose, the elevator 121 has a framework 600 along which the elevator carriage 601 moves vertically upon the application of power supplied by a transmission unit 602 and a motor 603. The carriage 601, which is structurally similar to the carriage 140, is equipped with rolls 604 which are driven by a motor 605 through a transmission unit 606. By means of suitable controls, to be described later, the rolls 604 receive a carrier thereupon and ultimately propel the carrier onto the rolls 193 of the return conveyor system 122.

The annealing section

The section D of the apparatus is, as previously set forth, composed of an annealing tunnel P and the return tunnel R through which the racks O are moved to carry the completed units 10 from the transfer area F to the unloading area U and then return the empty racks to the transfer area. These tunnels are substantially identical to the tunnels G and H of the Preheat Section B, with the exception that the tunnel P may be longer to permit a more gradual reduction in the temperature of the units 10 during the annealing. The tunnel P is provided with a "walking-beam conveyor 610 having rack support beams 611 that are adapted to be raised and lowered by gear drives 612 operated by a motor 613. The beams 611 are caused to move between the ends of the tunnel P and relative to fixed rails 614 therein by means of a cylinder 615 which is synchronized in its operation with the motor 613. The walking-beam conveyor 616 of the return tunnel, though not shown in detail, is provided with a similar motor 617 and cylinder 618, as are shown diagrammatically in FIG. 70 of the drawings. In addition, the operations of motors 613 and 617 and cylinders 615 and 618 are synchronized with the operation of rack conveyors 620 and 621.

The rack conveyor 620, situated in the transfer area F (FIG. 58), includes a cart 622 and a lift bar 623, similar to the previously described carts 56 and 126, and is adapted to advance an empty rack O from an intermediate position on fixed tracks 624 to the transfer area F adjoining the entry end of the annealing tunnel P while simultaneously advancing a rack O from the end of the tracks 624 in the exit end of the return tunnel R to the intermediate position. Likewise, the rack conveyor 621 is adapted, by means of cart 625 and associated lift bar 626, to remove a rack O, loaded with a completed glazing unit 10, to the intermediate position of fixed tracks 627 in the unloading area U while advancing an emptied rack to the end of the tracks 627 adjoining the entry end of the return tunnel R.

For these purposes, the cart 622 is moved by a cylinder 628 in the same manner as that described in connection with the cart 56 and cylinder 66. Similarly, the lift bar 623 of the cart 622 is raised and lowered by a cylinder 629 mounted on the cart to advance the racks O along the tracks 624. The cart conveyor 625 is likewise moved by a cylinder 630 and the lift bar 626 thereof raised and lowered by an associated cylinder 631.

Operation of the sealing apparatus

Reference is now made to FIGS. 62 to 70 inclusive, wherein electrico-mechanical power and control systems have been combined in diagrammatic representation. From the foregoing description, it is believed apparent that the timed sequences of each cycle or the inter-related steps of each cycle is controlled by suitable timing relay devices. Thus, operation of the Preheating Section B of the sealing apparatus, while adapted to be carried out independently of the remainder of the apparatus, is interlocked with the operation of the elevator 119 so that the elevator carriage 140 will not descend from the Return level until the cycling of the Preheat Section has been completed. Likewise, the initiation of such cycles of the Preheat Section is dependent upon the upward movement of the carriage 140 from the Sealing level and upon the reception of a loaded carrier K upon the sealing conveyor system 120.

In like manner, the control switches on each carrier K are actuated by devices on the frame of the conveyor 120 while switches mounted on the conveyor are activated by elements on the moving carrier K to initiate a sequence of operations at each of sealing stations identified as 1, 2, 3 and 4. As well, movement of each carrier K from the conveyor 120 and onto the unloading elevator 121 are controlled by movements of the elevator carriage thereof. In other words, the operation in the transfer area F is so timed that after the descent of the elevator carriage 601 a completed glazing unit can be discharged from the carrier K at the Transfer level; the carrier raised to the Return level and moved onto the entry end of the return conveyor system 122 and the empty elevator carriage then lowered to the Sealing level at the exit end of the conveyor 120 before the next carrier K with a completed unit will have arrived for reception onto the said elevator carriage. Finally, the operation of the Annealing Section D is synchronized with the ascending and descending movements of the elevator 121 so that the cycles thereof will be instituted upon the upward movement of the elevator carriage 601 from the Transfer area F.

In the normal operation of the sealing apparatus A, it is quite obvious that the several conveyors, the elevators and the carriers will interact automatically during the sealing operation; however, it is also believed apparent that the Preheating Section B and the Annealing Section D can be operated independently of each other and of the remainder of the sealing apparatus.

Therefore, the diagram of FIG. 62 is particularly directed to operation of the Preheat Section; the digram of FIG. 63 to operation of the elevator 119 and FIG. 64 to the circuitry for operation of the conveyor system 122 and the entry end of the conveyor system 120. In some instances, reference will be made from one figure to another to explain the inter-relation of the various operations although the circuitries of none of any of the figures is to be understood as restrictive to the spirit of the invention or the method and apparatus covered thereby since other means could be substituted therefor without departure from the invention.

Thus, as will be seen in FIG. 62, upon closure of a master control switch 640, source lines 641, 642 and 643 will be completed to one side of a control switch 644 and thus extended to supply lines 645, 646 and 647. The primary of a transformer 648 is connected to lines 641 and 642 while the secondary thereof by line 649 establishes a pilot source line for the preheating section of the apparatus.

Now, with a rack J at the loading end of the platform 57 at the outlet end of the return tunnel H and with a pair of glass sheets 11 and 12 loaded thereon, a manual switch 650 is engaged to complete a circuit at contact 651 thereof. This temporarily completes a supply line 652 to the solenoid 653 of a spring-biased relay switch 654 and thence to source line 655. Upon closure of contacts 656, a circuit will be completed by lines 658 and 659 to a timer 660; line 659 being temporarily a power source for said timer. Switch 650 is then reversed to complete the source line 649 at the contact 661, said timer then being in circuit with supply lines 649 and 655 to the transformer 648.

The timer 660 is adapted to produce the substantially automatic repetition of cycles, about to be described, and by means of which the racks J are moved through the Preheating Section B. The timer 660 for this purpose and by line 662 initiates the action of a timing relay 663, said relay being in circuit with supply lines 649 and 655. Timer 663 is connected by line 664 to one side of a hydraulic valve 665, associated with the cylinder 72, to cause the same to raise the bar 67 and lift the presently loaded rack J from the fixed tracks 57 of the conveyor mechanism 54. At the upper limit of its predetermined movement, the lift bar 67 causes closure of the above-described limit switch 95.

By means of the limit switch 95 carried on the conveyor cart 56, a circiut from supply line 649 is completed by line 667 through the normally closed contacts 668 of the switch 116 to the solenoid 669 of a spring-biased relay switch 670 and thence to supply line 655. The contacts 671 of this switch, when engaged, complete a circuit from supply line 649 by line 673 to a valve 674 and thence to supply line 655. The valve 674 is associated with the cylinder 66 whereby the cart 56 which will be operated to carry the supported rack J into the intermediate position of the conveyor mechanism 54 preparatory to entry into the preheat tunnel G. At this interval, the contacts 668 of switch 116 are opened to de-energize the solenoid 669 permitting the contacts 671 of switch 670 to be disengaged. Simultaneously contacts 675 of switch 116 are are closed to complete a circuit from supply line 649 by line 676 to a timing relay 677, said relay being in circuit with supply lines 649 and 655. This timer, when activated, is adapted to cause the lowering of the rack J onto the tracks 57 and in sequence initiate the movement of the cart 56 outwardly from the tunnel G and again to the loading end of the tracks 57 adjoining the outer end of the return tunnel H.

For this purpose, the timer 677 by line 678 is adapted to reverse the valve 665 and consequently cause the cylinder 72 to lower the bar 67 and the rack carried thereupon; this action also producing opening of switch contacts 95. Timer 677, after a predetermined delay, then completes a circuit from supply line 649 by line 679 through the normally closed contacts 680 of the switch 117 to the solenoid 681 of a relay switch 682. At this time, a manually operable switch 683 is closed in order that a controlled recycling of the above-described sequence of operations can be repeatedly carried out if desired and as required for the purpose of placing pairs of glass sheets 11 and 12 on racks J in the loading area L.

Continuing, the pair of contacts 684 of switch 682 complete a circuit from supply line 649 by line 686 to the opposite side of valve 674 and thence to supply line 655. This operates to reverse the pressure in cylinder 66 and consequently produces movement of the conveyor cart 56 toward the loading end of the tracks 57 whereupon contacts 675 of switch 116 are disengaged while contacts 668 are reclosed. When the cart arrives at the loading end of the tracks, the limit switch 117 is reversed to open contacts 680 and close contacts 687 thereof to complete a circuit from supply line 649 by line 688 to a timer 689; said timer being in circuit with supply lines 649 and 655.

When the timer 689 becomes active, a line 690 completes a circuit from supply line 649 to solenoid 691 of a relay switch 692 and thence to supply line 655. The pairs of contacts 693, 694 and 695 of the switch 692 will accordingly be engaged to complete circuits from supply lines to lines 696, 697 and 698 connecting to the motor 699 which operates the gear drives of the "walking-beam" conveyor 129 in the return tunnel. The beams 128 of the conveyor thereupon lift a plurality of empty racks J from the adjoining fixed rails 127. At the upper limit of their movement, the beams engage a limit switch 700, mounted on the structure of the conveyor 129, to cause completion of a circuit from supply line 649 by line 701 through the normally closed contacts 702 of switch 703 to the solenoid 704 of a spring-biased relay switch 705 and then to supply line 655. This switch closes pairs of contacts 707 and 708. Contacts 707 complete a circuit by line 709 to a valve 710 and thence to supply line 655; this valve being operatively associated with the cylinder 711 of the conveyor 129. This cylinder causes the elevated beams 128 to be moved outwardly toward the conveyor mechanism 54 until the outermost empty rack J is positioned above the tracks 57 thereof.

Likewise, the contacts 708 by line 712 complete a circuit to a valve 713 associated with the cylinder 111 of the "walking-beam" conveyor 102. This cylinder causes the said conveyor to carry the beams 104 in a lowered position toward the entry end of the preheating tunnel G. Upon arriving at this position, conveyor 102 causes opening of the pair of contacts 702 of switch 703 to de-energize the solenoid 704 of switch 705 with the resultant opening of contacts 707 and 708. Simultaneously the pair of contacts 714 of switch 703 are engaged to complete a circuit from supply line 649 and by line 715 to the solenoid 716 of relay switch 692 to open the circuits of lines 696, 697 and 698 at contacts 693, 694 and 695. By branch 717 to solenoid 718 of relay switch 719, the pairs of contacts 720, 721 and 722 thereof are engaged, against the bias of spring 723, to reverse the polarity of motor 699 by connection of lines 645, 646 and 647 to lines 696, 697 and 698 through lines 724, 725 and 726. This operates to lower the beams 128 to deposit one rack J on the tracks 57 and the remainer of the empty racks on the fixed rails 127 within the return tunnel H. Lowering of the beam 128 also acts to open limit switch 700.

Now, by means of a second branch line 727 from line 715 to the closed contacts 728 of switch 729, a circuit is established by line 730 to line 662 and timer 663. Switch 729 is then manually reversed to open the contacts 728 thereof and close the contacts 731. These contacts by line 732 connect the solenoid 733 of a spring-biased switch 734 to the supply 649 whereupon the contacts 735 will establish a circuit from supply line 649 by line 736 to the opposite side of valves 710 and 713 to cylinders 711 and 110 whereupon the conveyors 102 and 129 will be caused to carry the respective beams 104 and 128 rearwardly and out of their association with the tracks 57. The switch 729 through contacts 728 is adapted to cause the location of a second empty rack J in position to be loaded and movement of a precedingly loaded rack into the intermediate position of the tracks 57. However, as will shortly be described, closure of contacts 731 will adapt this position of the control system to automatic operation through solenoid 733 of switch 734.

As hereinabove described, when the timer 663 again becomes active, the cylinder 72 causes the bar 67 to raise a loaded rack from the tracks 57. However, in the present instance and during the predetermined delay interval of the timer, the second rack J is loaded with glass sheets 11 and 12. Accordingly, when the timer actuates the valve 665 and cylinder 72, the bar 67 will now raise two loaded racks and, upon operation of cylinder 66 through the valve 674, will be carried laterally by the cart 56 until the loaded rack from the so-called intermediate position will be delivered into the entry end of the preheat tunnel G, following opening of the doors 97, while the second rack will be delivered to the intermediate position. Now, manual switch 737 is moved to its closed position. Consequently when the above-described sequence of events have been repeated up to closure of the contacts 714 and energization of solenoid 733, an automatic cycling of operation of the Preheat Section can be established. Thus, when a circuit is again established in lines 715 and 727, the line 727 by line 738 through switch 737 will activate a timer 739; said timer being in circuit with supply lines 649 and 655.

After a suitable time delay, the timer 739 completes a circuit by line 740 to a valve 741 and thence to source 655. This valve is associated with the cylinder 135 which operates the bar 134 of the conveyor cart 126 to lift two empty racks J from the tracks 123 in the transfer area E of the sealing apparatus. At the upper limit of movement of the bar 134, a limit switch 742 is closed to complete the circuit of a line 743 from supply line 649 through the normally closed contacts 744 of switch 745 to the solenoid 746 of spring-biased relay switch 747 and thence to supply line 655. This causes pair of contacts 748 to complete a circuit by line 750 to a valve 751. This valve is associated with the cylinder 136 by means of which the conveyor cart 126 will move the bar 134 laterally toward the return tunnel H. This action will carry an empty rack J from the illustrated intermediate position and an empty rack from the transfer area E to the said intermediate position. Accordingly when either of these racks is suitably located and especially the leading rack in position to be ultimately transferred to the walking-beam conveyor 129 in the return tunnel, switch 745 is engaged to open contacts 744, thereby de-energizing solenoid 746 and separating contacts 748, and substantially simultaneously closing pair of contacts 752. These contacts complete a circuit by line 753 to timer 754, in circuit with supply lines 649 and 655, and also by branch line 755 to the opposite side of valve 741 to produce the reversal thereof. This reversal causes the cylinder 135 to lower the bar 134 and consequently deposit the empty racks J, carried thereby, onto the tracks 123 while simultaneously opening switch 742.

In timed relation, the timer 754 completes a circuit by line 756 from supply line 649 through limit switch 757 to the solenoid 758 of spring-biased relay switch 759 and thence to supply line 655. Action of this switch engages pair of contacts 760 to complete a circuit by line 762 to the opposite side of the valve 751 and thence to supply line 655. This action is reflected in the cylinder 136 to the end that the cart 126, with the bar 134 in a lowered position, may be returned to its position between the end of tracks 123 adjoining the end of preheat tunnel G. At this time, the limit switch 757 is opened to deactivate solenoid 758, thereby disengaging contacts 760 to open circuit of line 762 while contacts 752 of switch 745 are separated and contacts 744 are reclosed. However, after the interval of time required for the cyclic activity of the conveyor cart 126, the timer 754 is adapted to control the sequential movements of the racks J by initiating the operation of a timing device 763 through circuit of line 764; said timing device being in circuit with supply lines 649 and 655.

Now, the timing device 763 is adapted by line 765 through normally closed switch 766 to complete a circuit from supply line 649 to the solenoid 767 of relay switch 768 and thence to supply line 655. Activation of this switch produces the closure of pairs of contacts 769 and 770 to complete circuits by lines 772 and 773. The circuit of line 772 through line 736 connects to the opposite side of valve 710 whereby the cylinder 711 will be reversed to cause the movement of the "walking-beam" conveyor 129 inwardly from the tracks 57 in the entry end of the tunnel G and the loading area L with the beams 128 thereof in their lowermost position. This permits the switch 703 to open the contacts 714 and reclose the contacts 702 thereof. When the pair of contacts 714 are separated, the circuit to solenoid 718 by way of line 717 will be opened thereby allowing spring 723 to open pairs of contacts 720, 721 and 722.

On the other hand, circuit line 773 from contacts 770 completes a circuit to the solenoid 774 of relay switch 775 and thence to supply line 655. This produces the engagement of pairs of contacts 776, 777 and 778 to complete circuits from lines 645, 646 and 647 to lines 779, 780 and 781 associated with the motor 115 of the "walking-beam" conveyor 102. Motor 115 operates gear drives 113 to raise the conveyor beams 104 to lift the loaded rack J from the tracks 57 as well as the preceding and previously advanced racks from the fixed rails 99.

When the rails 128 of conveyor 129 are suitably positioned with reference to the adjoining end of the tracks 123, limit switch 766 is engaged to de-energize the solenoid 767 thereby permitting separation of the pairs of contacts 769 and 770. However, before opening of these contacts of the switch 768 and when the beams 104 of the conveyor 102 are elevated, a switch 782 is engaged to complete a circuit by line 783 through the normally closed contacts 784 of switch 785 to connect the solenoid 786 of spring-biased relay switch 787 to the supply lines 649 and 655. Contacts 788 complete a circuit by line 790 from supply line 649 and line 736 to the opposite side of valve 713 and thence to supply line 655 whereupon the cylinder 111 becomes operable to move the "walking-beam" conveyor 102 inwardly until the innermost loaded rack J has been advanced another sequential step toward the tracks 123 in the transfer area E of the sealing apparatus.

At this point in the cyclic operation, the forward movement of the conveyor 129 will have actuated the switch 785 thereby separating contacts 784 and engaging the contacts 791 thereof. The circuit of line 783 will accordingly be opened at contacts 784 to de-energize solenoid 786 of relay switch 787 and disengage contacts 788 while closure of contacts 791 will complete a circuit by line 792 from supply line 649 to an opposed solenoid 793 of relay switch 775 to disengage pairs of contacts 776, 777 and 778 with resultant opening of lines 779, 780 and 781 to motor 115. However, line 792 by branch 794 also energizes solenoid 795 of relay switch 796. This switch with pairs of contacts 797, 798 and 799, against action of spring 800, completes circuits from supply lines 645, 646 and 647 to lines 779, 780 and 781 but in the reverse order which operates to change the polarity of motor 115 thereby causing the beams 104 of conveyor 102 to lower the supported and loaded racks J onto the fixed rails 99. At this time, the switch 782 is opened.

During this sequence of events, a branch line 805 from line 792 completes a circuit from supply line 649 to the solenoid 806 of a spring-biased relay switch 807 and thence to supply line 655 to disengage contacts 808. These contacts 808 operate to temporarily open the circuit of a line 810 which becomes instrumental in the switch control of the activity of the elevator 119 as will be hereinafter more fully set forth in detail. Likewise, by branch line 811 from control line 792, a circuit from line 649 will be completed to the solenoid 812 of relay switch 813 to disengage contacts 814 thereof. These contacts 814, as in the case of the contacts 808, will complete the circuit of a line 816 having further utility in the operation of the elevator 119. Generally stated when closure of contacts 808 is regained, the elevator carriage 140 descends from the Return level to lower a carrier K to the Transfer level since the walking-beam conveyor 102 is not then in operation. This will prevent the delivery of an empty carrier K downwardly into the Transfer area E before a rack J loaded with glass sheets has been placed on the tracks 123 therein. On the other hand, when the circuit of line 816 is re-established at the contacts 814 of relay switch 813, the movement of a carrier K at the Sealing level onto the conveyor system 120 will be instrumental in the resumption of the automatic operation of the Preheat Section B by way of line 818 through a manually operable switch 819 to the timer 660.

In the above-described course of events, it will be appreciated that the "filling" of the preheat tunnel G with pairs of glass sheets 11 and 12 on racks J is for the purpose of suitably raising the temperature thereof, by means of the heating sources 118, until the sheets have obtained a condition of heat above the point of strain. Consequently, before actually setting the entire sealing apparatus into operation, and at least at the initial stages of first operation, it is of course preferable to repetitively carry out the movement of the racks J forwardly through the preheating tunnel G until the innermost rack has been located on the tracks 123 in the transfer area E. As previously mentioned, the duration of each time interval is substantially equal to that amount of time required for the elevator 119 to receive a carrier K from the return conveyor line 122; to lower the same to the transfer area E to receive a pair of glass sheets 11 and 12 from a rack J and then raise the carrier K upwardly until it can be removed onto the conveyor system 120 at the Sealing level. In other words, the accumulative time elapsing between the entry of each pair of glass sheets on a rack J into the preheat tunnel G at its entry end at tracks 57 and their ultimate arrival on the tracks 123 in the transfer area E will insure the gradual heating of the glass to the temperature of the sealing cycle.

For this purpose, the conveyor mechanisms 54, 102, 122 and 129 may be sequentially operated during the individual use of the Preheat Section B to progressively move a plurality of racks J from the loading area L toward the transfer area E. The timing device 660 is therefore reactivated upon the completion of each sequential cycle by means of a branch line 817 from line 805 and a circuit is completed from supply line 649, through line 792 and switch 683, and thence by line 818 to complete the circuit to timing device 660 whereupon the timing device 663 will again be activated through line 662.

Now, when a rack loaded with a pair of suitably heated glass sheets is deposited on the tracks 123 and the preheat tunnel G has thus been filled with racks suitably loaded with glass sheets that are graduallly being heated, the switch 683 is opened and the manual switch 819 is closed. At this time, a circuit control switch 820 is closed (FIG. 63) to connect lines 641, 642 and 643 to service lines 821, 822 and 823 for operation of the elevator 119. As well, manual switch 824 is closed in line 821 to activate the control system therefor. Lines 821 and 822 connect to the primary of transformer 827, the secondary having feed lines 828 and 829.

When manual switch 830 is temporarily closed, a circuit is established by line 831 from supply line 828 to a control line 832 connecting to the solenoid 833 of a relay switch 834 and thence to supply line 829. Energization of solenoid 833 causes the closure of pairs of contacts 835, 836 and 837 to complete circuits from lines 821, 822 and 823 to lines 838, 839 and 840 attached to the elevator motor 145; a variable resistance 841 being interposed in line 838. The elevator carriage 140 is equipped with switch contactor plates 842 and 843 on one end surface thereof (FIG. 24) and a similar contactor plate 844 on the opposite end surface. These contactor plates are adapted, during vertical movements of the carriage, to engage a plurality of limit switches which control the inter-related steps in the operation of the elevator 119, the conveyor system 120 and the operation of the Preheat Section B.

Accordingly, in the event that the elevator has been halted at the sealing level activation of the motor 145 by relay switch 834 will complete the upwardly vertical motion of the carriage 140 toward the Return level (FIG. 27). As this level is approached, the contactor plate 842 closes a limit switch 845 which by line 846 from supply line 828 completes a circuit to the solenoid 847 of a spring-biased relay switch 848. This action closes pair of contacts 849 to complete a circuit from supply line 828 by line 851 to a solenoid 852 and thence to supply line 829. The armature 853 of this solenoid is adapted to increase the resistance of the resistor 841 to progressively reduce the speed of the motor 145. The plate 842, in being carried upwardly, then engages and closes limit switch 854 and finally engages and similarly closes a limit switch 855.

As earlier described, as the elevator carriage approaches the upper limit of its vertical motion, it engages the lever 203 of the carrier stop device 201. This is a safety device and normally not engaged but is adapted in instances of emergency to positively arrest further movement of a carrier in the event that the switch devices, previously designtaed at 200, have failed to operate properly. These switches designated 856 and 857 in FIG. 64 are normally open. One side of switch 856 is connected to supply line 828 while the opposite side is completed by line 858a through normally closed contacts 859 of relay switch 860 and line 858b through normally closed contacts 861 of relay switch 862 to the solenoid 863 of the switch 862. The switch 857, on the other hand, is connected on one side to supply line 828 and on the opposite side by line 864 to one side of a normally open switch 865. This particular switch is connected by line 866 to the solenoid 867 of a relay switch 868.

Accordingly when a carrier K is being carried along the rolls 193 of the conveyor system 122, the extent of its traversal is more or less predetermined or selectively arranged to be terminated in any one of several areas of the conveyor system. This is to insure that in the event a carrier, located at the exit end of the conveyor adjoining the elevator 119, is held beyond an interval of time normally contemplated in the operation of the apparatus generally, each succeeding carrier traversing the conveyor system will be halted in advance of its colliding movement with a precedingly halted carrier. For this purpose, a mechanical connection between the sources of power 198 and the shafts 196 may be afforded in a conventional manner by means of electromagnetic clutches. Accordingly, as shown in FIGS. 63 and 64, there are provided a plurality of limit switches adapted to be sequentially engaged by each carrier as it is moved therepast and with the said plurality of switches being arranged in pairs one of which is interlocked with the switch of a succeeding pair of switches. Thus, when a carrier arrives at the end of the return conveyor system adjoining the elevator 119, it causes the closure of switches 856 and 857. In the first instance, switch 856 completes the circuit of lines 858a and 858b from supply line 828 through switches 860 and 862 to solenoid 863; this operating to open pairs of contacts 861 and 869 of relay switch 862 upon movement of the switch armature in one direction. Contacts 861 open circuit of line 858 while contacts 869 open circuit of line 870 from supply line 828 to an electromagnetic clutch 871. This clutch when disengaged stops the operation of the rolls 193 in the last (exit) area of the conveyor system. Limit switch 857 completes a circuit from supply line 828 by line 864 to one side of switch 865.

In the event that the next succeeding carrier K is delivered into the area of the conveyor adjacent the exit area while a carrier still occupies the exit area, upon closure of switch 865, the circuit of line 864 will be completed by line 866 to the solenoid 867 of relay switch 868 and thence to supply line 829. Separation of switch contacts 872 against tension of spring 873 opens the circuit of line 874 from supply line 828 to the electromagnetic clutch 875 controlling the operation of the rolls 193 in the area of the conveyor system 122 adjacent the exit area. While a carrier is halted to maintain switch 865 closed, it likewise closes a related switch 876 connected by line 877 to one side of a limit switch 878 in the area of the conveyor adjacent the exit area. Ultimate closure of switch 878 and a related switch 879 will fulfill the same purpose as that carried out by switches 865 and 876. Obviously, repeating the location of similar switches along and at predetermined areas of the conveyor 122 will accomplish the sequential halting of succeeding carriers K as they are delivered to the said conveyor system from the elevator 121 if a preceding carrier stops.

Returning now to the discussion of limit switch 845, when initially engaged by the contactor plate 842, this switch was described as being adapted to actuate the resistance 841 to slow the upwardly rising movement of the elevator carriage 140 by reducing speed of the motor 145. Switch 845 also, by branch line 880, completes a circuit from supply line 828 to solenoid 881 of a relay switch 882 and thence to supply line 829. The pairs of contacts 883, 884 and 885 which are then moved from their closed positions to disconnect the circuit of lines 886, 887 and 888 from source lines 821, 822 and 823 to the bus bars 889, 890 and 891 mounted on the frame 163 of the elevator carriage (FIG. 23).

Continued upward travel of the elevator carriage 140 carries contactor plate 842 into engagement with the limit switch 854 whereupon a circuit from supply line 828 is completed by line 892 to solenoid 893 of a relay switch 894 and by branch 895 to solenoid 896 of relay switch 897 and thence to supply line 829. The contacts 898, 899 and 900 of relay switch 894 complete the circuits of lines 901, 902 and 903 from source lines 821, 822 and 823, a variable resistance 904 interposed in line 903, to the motor 218 which through gear unit 219 rotates the rolls 207 on the carriage 140. As viewed in FIG. 24, upon closure of the contactors of switch 894, the motor is energized to cause the several pairs of rolls 207 to move a carrier K in a leftward direction when the same has been moved thereupon from the rolls 193 of the conveyor system 122.

On the other hand, the contacts 905 of relay switch 897, when closed, complete a circuit from supply line 828 by line 906 to a solenoid operated valve 907 and thence to supply line 829. Valve 907 controls the direction of pressure to the cylinder 226 of the stop device 221 (FIG. 29) and at this instant the pressure is reversed or reduced to enable the spring 225 to move the dog 223 upwardly into position to engage the notch 231 of plate 230 mounted on a runner bar 241 of each carrier K. Action of the limit switch 854 accordingly puts into motion the rolls 207 on the elevator carriage 140 to move a carrier K thereon and raises the dog 223 to halt the carrier when it is substantially centrally located thereon.

The limit of upward travel of the elevator carriage is determined by the position of limit switch 855 and the further motion of the carriage is arrested when the contactor plate 842 closes this switch. Now, by line 908 from supply line 828, a circuit is completed to the solenoid 909 of spring-biased relay switch 910 and thence to supply line 829. Contacts 911 now complete the circuit of line 913 from supply 828 to solenoid 914 of relay switch 834 and thence to supply 829. This operates to separate contacts 835, 836 and 837 with consequent stopping of motor 145 when the lines 838, 839 and 840 thereto are opened.

Also by line 915 to solenoid 916 of relay switch 860, the contacts 859 thereof are opened while pairs of contacts 917 and 918 are engaged. The separation of contacts 859 opens the circuit of line 858 whereupon the control by limit switch 856 is temporarily by-passed; however, upon closure of contacts 917, a circuit from supply line 828 will be completed by line 919 to a timing device 920 (FIG. 64) in circuit with lines 828 and 829. The purpose of this timing device is to set up a delay interval during which the elevator carriage arrives at the limit of its upward movement and becomes stationary.

Also by branch line 921 a similar circuit is completed to the solenoid 922 of relay switch 923. The contacts 924 of this switch then complete a circuit by line 926 to solenoid 927 which is adapted, by opposed motion of the armature 853, to remove the control of resistance 841 from motor line 838. Of course, when switch 845 was released by contactor plate 842, the circuit to solenoid 847 of switch 848 was opened; the spring bias thereof separating the contacts 849.

With the rolls 207 of the elevator carriage 140 at the same elevation as the rolls 193 of the return conveyor system 122 and the slide plate 202 of the stop device 201 in its retracted position, the timer 920 completes a circuit from supply line 828 by line 928 to solenoid 929 of relay switch 862 and thence to supply line 829. The contacts 861 and 869 of switch 862 now being again closed; contacts 869 re-establish the circuit of line 870 to re-engage the clutch 871 while the circuit of lines 858a and 858b through contacts 861 to opposed solenoid 863 will be open at contacts 859 of relay switch 860 as previously set forth. Accordingly the rolls 193 in the first area of the conveyor 122 will again be operatively driven to propel the immediate carrier K from said conveyor and onto the elevator carriage 140.

In entering upon the elevator carriage, the carrier sequentially engages and closes a series of limit switches 930, 931 and 932 and finally switch 933. When a carrier K is removed from the exit area of the conveyor, the limit switch 856 is released as well as the switch 857 which controlled the activity of relay switch 868 (in the second conveyor area) through limit switch 865 in the event the same is closed. However, upon closure of switch 930, a holding circuit to the switch 865 is created by line 934 through closed contacts 918 of switch 860 and line 864 (FIG. 64). This insures that while the elevator carriage 140 is at the Return level and a carrier is being delivered thereon, a second carrier will be restrained from moving into the last or exit conveyor area. Of course, since the stop device 201 has been retracted, any relaxation of control of clutch 875 would result in a second carrier moving through the said exit area and toward the carrier K presently positioned on the elevator carriage.

Limit switch 931 completes a circuit by line 935 from supply line 828 to solenoid 936 of relay switch 937. Contacts 938 thereof then complete a circuit by line 940 to solenoid 941 which motivates the armature 942 of resistance 904, interposed in line 903 of motor 218, to reduce the operating speed thereof and consequently of the carriage rolls 207. Closure of limit switch 932 creates a circuit by line 943 from supply line 828 to the opposed solenoid 944 of relay switch 894. Thereupon, the pairs of contacts 898, 899 and 900 are separated to render motor 218 idle. Further and by branch line 945, switch 932 is connected to the solenoid 946 of relay switch 947. The contacts 948 of this switch complete a circuit by line 950 from supply line 828 to opposed solenoid 951 which by the armature 942 reverses control of resistance 904. Lastly, by branch line 952 to the solenoid 953 of relay switch 954, the switch 932 initiates the descent of the elevator carriage 140. This action however is dependent upon the condition of relay switch 807 (FIG. 62) which, as described is sequentially opened and closed during the previously described operation of the conveyors in the Preheat Section B. In the event the contacts 808 of switch 807 are closed, the circuit of the line 810a through the then closed contacts 955 of switch 954 will be completed through the contacts 808 (FIG. 62) and line 810b to the solenoid 956 of relay switch 957. The pairs of contacts 958, 959 and 960, when closed, will complete circuits from source lines 821, 822 and 823 to lines 961, 962 and 963, connecting to lines 838, 839 and 840 of motor 145. Since these circuits are presently completed in substantially the reverse order from that previously described in raising the elevator carriage 140, the polarity of motor 145 will now cause the gear unit 147 to operate the shaft 146 so that the pair of chains 150 will lower the elevator carriage 140. Also by branch line 964 from line 810b to opposed solenoid 965 of relay switch 954, the contacts 955 thereof will be reopened.

During this phase of the operation, the limit switch 933 completes a circuit by line 966 from supply line 828 to opposed solenoid 967 of relay switch 882 and thence to supply line 829. Thereupon the pairs of contacts 883, 884 and 885 are closed to re-establish the circuits from lines 821, 822 and 823 to lines 886, 887 and 888 connecting to the bus bars 889, 890 and 891 carried on the elevator carriage 140. Eventually these bus bars become instrumental in servicing the operating circuits of a carrier K while it is located on the elevator carriage 140 and by engagement of the sliding contactors 369, 370 and 371 on each carrier.

During descent of the elevator carriage 140 and upon opening of the limit switch 855 after its release from engagement by the contact plate 842, the solenoid 916 of relay switch 860 is de-energized to disengage contacts 918 thereby opening the circuit of line 934 and re-engaging the contacts 859. In the first instance and especially with reference to line 934, although the switch 930 is held closed by the carrier on the elevator carriage, the circuit of line 934 through line 864 to the switch 865 and solenoid 867 will be discontinued allowing the spring 873 to close the contacts 872 and thereby re-energize the electromagnetic clutch 875 to drive the rolls 193 in the area of the conveyor 122 adjoining the exit end thereof. Since this occurs when the elevator carriage begins its descent, the release of the lever 203 of the stop 201 permits the spring 206 to raise the slide plate 202 into the position in which it will obstruct further movement of a carrier in the event the switches 856 and 857 fail to function immediately.

In the second instance, the circuit of lines 858a and 858b will be restored at the contacts 859 and completed through contacts 861 of switch 862 pending ultimate engagement of the limit switch 856. This of course will occur in due course when a carrier K, advancing from the second conveyor area, engages switches 856 and 857 in the exit conveyor area and is thus automatically halted.

As the elevator carriage approaches the lower limit of its travel at the level, designated by the legend "Transfer" in FIG. 27, a rack J, loaded with heated glass sheets 11 and 12, will have been placed on the tracks 123 and with the vertical plane in which the glass sheets are supported coincident with the vertical plane between the spaced platens 245 and 246 of the carrier K. In descending into the transfer area E, the carriage 140 causes the contactor plate 842 to sequentially engage limit switches 968 and 969. Switch 968 through line 970 from supply line 828 completes a circuit to the solenoid 971 of spring-biased relay switch 972 closing the contacts 973 thereof. A circuit from supply line 828 is completed by line 975 to line 851 and solenoid 852. This circuit again operates armature 853 to increase resistance 841 to reduce speed of motor 145.

Limit switch 969, when closed, is adapted to stop motor 145; decrease resistance 841; and then initiate the effective control circuits of the carrier K by closure of limit switch 377 mounted thereon. Thus by line 976 from supply line 741, the switch 969 completes a circuit to the opposed solenoid 977 of the relay switch 957 to open the contacts 958, 959 and 960 thereby opening the circuits to the motor 145. By branch line 978, a circuit is also established to the solenoid 979 of relay switch 980, causing the contacts 981 thereof to close. This completes a circuit by line 983 to line 926 and solenoid 927 to reduce the control of resistance 841. Line 976 also activates timing devices 984 and 985; both timers being in circuit with supply lines 828 and 829.

When descent of the elevator carriage 140 is terminated, coincidence of the horizontal axial line through the platens 245 and 246 with a similar horizontal axial line through the centers of the glass sheets 11 and 12 must substantially be obtained. This position of the elevator carriage 140 and the carrier K thereon in relation to the sheets 11 and 12 is shown in broken line in FIG. 22. As shown in FIG. 22, one means for such a purpose is provided in a frame structure 990 formed of vertically disposed side members 991 and bracing members 992. A horizontally disposed channel 993 is attached to the side members 991; said channel being equipped with vertically disposed posts 994. The posts are adapted to serve as centering or locating pegs for a variety of wood bars 995 and metal shims 996 that are built up to a height at which the uppermost wood bar will be engaged by the bottom channel 161 of the elevator carriage 140 substantially at the same time the motor 145 is halted. Suitably disposed openings in the channel may be provided to receive any projecting portions of the posts 994.

Also while the elevator carriage is descending and approaches a position as illustrated in FIG. 22 and the platens 245 and 246, shown in broken line, are located in spaced relation to the outer surfaces of the glass sheets 11 and 12, the support afforded by the clamping members 41 is automatically removed by the downward movement of the carrier and consequent engagement by the beam 247 with the handles 47 and, by downward swinging motion of the handles, move the contact members 41 to positions of disengagement.

At this interval, the timing device 984 completes a circuit from supply line 828 by line 1000 to solenoid 1001 of control device 1002 mounted on the carriage 140, as shown in FIG. 24. The armature 1003 of this switch, against the tension of spring 1004, moves a pivotally mounted lever 1005 forwardly so that it engages and temporarily closes limit switch 377 on the carrier K. Each of the carriers, employed in carrying out the improved method of and forming a part of the sealing apparatus of this invention, are equipped with identical structures and switch controlled electrical devices. In addition, each carrier is dependent upon the sliding contactors 369, 370 and 371 for connection to sources of electrical energy. Thus, the said sliding contactors on the elevator carriage 140 will be in engagement with the bus bars 889, 890 and 891 to supply electrical energy for all circuits to be created on the carrier. Also when a carrier has been removed onto the sealing conveyor system 120, the sliding contactors will traverse bus bars 373, 374 and 375 to serve the same function. Consequently like numbers have been assigned to the same device lines in FIG. 65.

Now, by means of sliding contactors 369, 370 and 371, supply lines 1006, 1007 and 1008 will be established for the carrier circuits, the controls for which have been heretofore described as being generally contained in a panel box 367. The supply lines 1007 and 1008 connect to the primary of the transformer 368, the secondary providing source lines 1010 and 1011. To indicate to an operator that the above-named supply lines are completed, an electric lamp 1012 suitably mounted on the panel box 367 may be illuminated. Likewise, the lines 1006, 1007 and 1008 are connected directly to the motor 1014 for the hydraulic pump 284. These lines also are connected through the contacts 1015, 1016 and 1017 of relay switch 1018 to lines 1019, 1020 and 1021 attached to the motor unit 316. As well, the lines 1010 and 1011 are adapted to complete service lines for the motors 1022 and 1023 for the vacuum pumps 323 and 324 respectively. Thus, when the limit switch 377 is temporarily held closed, the circuits to the various pumps and motors are established. The initiation of operation of these several devices enables the valves 328 and 344 to create an evacuated condition at the platens 245 and 246; the valve 280 to advance and retract the platen 246 and the gear drive 277 to sequentially rotate the platen 246.

Switch 377 is particularly instrumental in completing a circuit from source line 1010 by line 1024 to the solenoid 303 of the gaging device 286 and by line 1025 through contacts 1026 of a spring-biased relay switch 1027 to the solenoid 1028 of a relay switch 1029. Solenoid 303 retracts gaging device 286, by armature 302 and against spring 1030, from the path of longitudinal movement of the rod 290. Contacts 1031 of relay switch 1029 by line 1032 complete a similar circuit to the solenoid 305 thereby retracting gaging device 287 by armature 306 and against spring 1033. By line extension 1034 and through contacts 1035 of relay switch 1027, line 1034 is completed to line 1036 and the solenoid 1037 of relay switch 1038. This operates to open a pair of contacts 1039 and close opposed contacts 1040 to complete the circuit of a line 1041 to the valve 280.

Accordingly while the timing device 985 (FIG. 63) is monitoring the duration of the time interval before the elevator carriage rises, the base member 265 on the carrier K, and on which the hollow shaft 268 and traverse platen 246 are mounted, is advanced by means of the direction of pressure to the cylinder 276 through conduit 282 while the rod 290 associated therewith, is similarly moved with reference to the above-mentioned gaging devices. The limit of forward movement of the vacuum platen 246 is determined by engagement of the lock-nuts 291 with the gaging device 285; said lock-nuts being adjustably positioned to stop the advance of platen 246 when the distance between the opposed surfaces of the platens 245 and 246 is substantially equal to or slightly greater than the combined thicknesses of the glass sheets 11 and 12 therebetween.

By branch lines 1042 and 1043, the temporary circuit through limit switch 377 further energizes the solenoid 1044 of relay switch 1045 and like solenoid 1046 of relay switch 1047. In the first instance, closure of contacts 1048 of switch 1045 completes a circuit by line 1049 to the control device 330 for vacuum valve 328. An evacuated condition at the surface of the fixed platen 245, to adhere the glass sheet thereagainst, will now be created through pipes 331 and 338, filter 333 and conduit 334. On the other hand, closure of the contacts 1050 will complete a circuit by line 1051 to the control device 361 for vacuum valve 344. The evacuated condition at the surface of the traverse platen 246 will now likewise be effected through pipes 346–347, filter 349 and conduit 350. Accordingly the glass sheets 11 and 12 will be vacuously adhered to their respective platens 245 and 246.

As hereinabove described, the vacuum in conduit 350 is communicated through conduit 355 to the vacuum control switch 356 to cause closure of the contacts 1052 thereof. These contacts complete the circuit of line 1053 to the solenoid 389 thereby moving the armature 388 and block 387 downwardly against tension of the spring 390. The block 387, in a lowered position, is adapted to sequentially engage several limit switches mounted at each of the sealing stations designated 1, 2, 3 and 4; said switches causing operation of control devices to effect operation of the sealing unit 430. In the event that the vacuum is interrupted at the platen 246 and in conduits 350 and 355, the control 356 will not function and the block 387 will be retained in, or returned to, its uppermost position by spring 390. This will guard against the futile operation of any or all of the sealing units 430 during movement of a carrier K along the conveyor 120 without glass sheets supported thereon.

Upon inaction of the timing device 984, the spring 1004 retracts the lever 1005 to permit reopening of the limit 377. This will only affect the energization of the solenoid 303 to allow the spring 1030 (FIG. 65) to move the gaging device 286 into operative position. However, since the circuit of line 1032 is maintained through contacts 1031 of switch 1029, the energized condition of the solenoid 305 will retain the gaging device 287 in its retracted position.

Now, referring again to FIG. 63, upon activation of the timing device 985, a circuit from supply line 828 will be completed by line 1054 to line 832 and solenoid 833 of relay switch 834. As previously explained, the switch contacts 835, 836 and 837 will now complete the circuits of motor 145 between lines 821, 822 and 823 and 838, 839 and 840. As the elevator carriage 140 rises toward the "Sealing" level at the elevation of the conveyor system 120, the contactor plate 843 engages limit switch 1055 to complete a circuit by line 1056 from supply line 828 to the opposed solenoid 1057 of the relay switch 897 to reclose contacts 905 whereby the circuit of line 906 will be restored to the solenoid valve 907. Valve 907 thereby reverses the direction of pressure to cylinder 226 to move the dog 223 downwardly against the compression of spring 225. This will withdraw the dog from the notch 231 of plate 230 thus removing the locked relation of the carrier K and enabling it to eventually be freely movable from the elevator carriage.

In approaching the "Sealing" level, the contactor plate 844 engages limit switch 1058 to complete a circuit from supply line 828 by line 1059 to line 970 and the solenoid 971 of switch 972. As previously actuated, this switch by line 975 energizes the solenoid 852 to reduce the speed of motor 145 by increasing the resistance 841 in line 838. Limit switch 1060, disposed immediately above switch 1058 and next engaged by contactor plate 844, completes the circuit of line 1061 from supply line 828 to the solenoid 1062 of relay switch 1063 and by branch line 1064 to the solenoid 1065 of a relay switch 1066 and thence to supply line 829 in both instances. Firstly, the contacts 1067 of switch 1063 will temporarily complete a circuit from supply line 828 by line 1068 to line 913 and solenoid 914 of relay switch 834 to open the circuit of motor 145 at contacts 835, 836 and 837. Secondly, and by line 1064, the contacts 1069 of relay switch 1066 complete a circuit by line 1070 to line 926 thereby again energizing solenoid 927 to reduce the control of resistance 841 in line 838.

Now, in the entry area of the conveyor 120, a plurality of switches 1071, 1072, 1073 and 1074 are mounted on the framework 560 to be engaged by a carrier as the same is moved thereover. The switches 1071, 1072 and 1073 are adapted to operate pairs of contacts which individually complete their respective circuits. Thus, in the present instance, a branch line 1075 from line 1061 is completed through the normally closed contacts 1076 of switch 1073 to a timing device 1077. This timer is adapted to determine a delay interval while the elevator carriage becomes stationary at the "Sealing" level and then by line 1078 will complete a circuit from supply line 828 to the solenoid 1079 of a relay switch 1080. The pairs of contacts 1081, 1082 and 1083 of this switch complete the circuits through lines 901, 902 and 903 to the motor 218, whereupon the rolls 207 are operated by the gear unit 219 to move the supported carrier K to the right, as viewed in FIG. 24, and onto the rolls 564 in the entry area 572 of the sealing conveyor system 120.

As previously described, the shafts 563 for rolls 564 are driven from one source of power, such as the motor 573. This motor is operable at variable rates of speed whereby the carrier will be rapidly propelled from the elevator carriage 140 onto the conveyor system and then slowed in its movement to the speed of the rolls in the conveyor area 574 which are driven from the motor 575. For this purpose, in FIG. 64, the service lines 641, 642 and 643 are completed through a control switch 1085 to lines 1086, 1087 and 1088 through the normally closed pairs of contacts 1089, 1090 and 1091 of relay switch 1092 to the motor 573; a resistance 1093 being interposed in the motor line 1086. The limit switches 1071, 1073 and 1074 (FIG. 63) control the speed of operation of the motor 573 or halt the same.

For this purpose, the switch 1071 is equipped with pairs of normally open contacts 1094 and 1095. Contacts 1094 are connected by line 1096 to the normally open contacts 1097 of switch 1073 and when switches 1071 and 1073 are simultaneously engaged by a carrier K, a circuit will be completed to line 1098 at contacts 1094 by way of line 1096 and contacts 1097 from supply line 828. Circuit of line 1098 completes to solenoid 1099 (FIG. 64) whereby the armature 1100 against the bias of spring 1101 will effect a decrease in resistance 1093 to increase the speed of rolls 564 from motor 573. When the carrier K clears limit switch 1071, the circuit of lines 1096 and 1098 will be opened and spring 1101 will effect an increase in resistance 1093, thereby again reducing the speed of rolls 564 in the entry conveyor area 572. In the event that the circuits to motor 575 have been broken and the rolls in conveyor area 574 are halted while the preceding carrier is engaging limit switch 1074, upon engagement of the limit switch 1071 and closure of contacts 1095 thereof a circuit is completed from line 828, through switch 1074, line 1102 to contacts 1095 and a line 1103. This circuit energizes the solenoid 1104 of relay switch 1092 (FIG. 64) whereby the contacts 1089, 1090 and 1091 overcome the tension of spring 1105 thereby breaking the circuit to lines 1086, 1087 and 1088 and the motor 573. Since the limit switches 1071 and 1074 are spaced apart a distance greater than the length of a carrier K, concurrent closure of both switches will not be made due to the fact that by the predeterminedly timed motion of the elevator 119 the preceding carrier will have moved from engagement with the switch 1074 in advance of the entry of a succeeding carrier onto the conveyor system 120.

Likewise, the limit switch 1072 will be located so as to insure that the following end of the carrier K has cleared the first of the rolls 564 before the carrier causes closure of the switch. Thus, upon engagement, the contacts 1106 of the switch 1072 will complete a circuit by line 1107 to solenoid 1108 of spring-biased relay switch 1109. The contacts 1110 of switch 1109 will then complete a circuit by line 1112 from supply line 828 to the opposed solenoid 1113 of the relay switch 1080 to open the contacts thereof and thereby stop the motor 218. Also by branch line 1114 a circuit is completed to the solenoid 833 of relay switch 834 to close contacts 835, 836 and 837 to restore service lines to motor 145 and consequently cause the elevator carriage to resume its upward motion. Contactor plate 844 then engages limit switch 1115. Switch 1115 through line 1116 and closed contacts 1117 completes the circuit of line 816 which, referring to FIG. 62, operates through the closed contacts 814 of switch 813 to complete line 818 through switch 819 to reactivate the timer 660. This initiates another cycling of the racks J through the Preheating Section B by means of the electrical system of FIG. 62. Also as the contactor plate 842 is carried upwardly by the elevator carriage 140, it engages the limit switches 845, 854 and 855 in sequence to again halt the elevator at the Return level preparatory to receiving a succeeding carrier K on the said carriage thereof. This will again set into operation the electrical apparatus discussed in connection with FIG. 63.

Now it is believed that when the glass sheets 11 and 12 are received between the vacuum platens 245 and 246, there may and probably will exist a differential between the temperature at which the sheets were conditioned by preheating and the residual heat in the surfaces of the vacuum platens. Accordingly the platen 246 is gently urged against the glass sheet 11 and thereby the sheet 12 against the platen 245 for the duration of a time interval while the carrier K is being moved outwardly from the elevator carriage 140 and is received on the rolls of the conveyor system 120. By leaving the sheets and platens in surface to surface contact, a condition gradually develops that may conveniently be termed "mellowing" whereby the temperatures of the sheets and their relation to the adjoining surfaces of the platens will approach a balanced condition with the result that the sheets become vacuously adhered to said platen without shock and easily separate from one another when the traverse platen 246 is retracted. Thus, during the course of events incurred by closure of the limit switches 1071 to 1074 inclusive, the carrier K is moved forwardly to carry the limit switches 380 and 384 thereon first into engagement with the bar 583 on panel 578 and then the bar 584 thereon (FIG. 56).

Now, referring to FIG. 65, closure of switch 384 by bar 583 will complete a circuit from source lines 1010 by line 1116' to solenoid 1117' of relay switch 1038 to open contacts 1040 and reclose contacts 1039. This will create a circuit by line 1118 to reverse the valve 280 thereby directing pressure through conduit 281 to cylinder 276. Thereupon the base 265 and hollow shaft 268 are moved rearwardly thus spacing the sheet 11 on traverse platen 246 from the glass sheet 12 on fixed platen 245. Upon temporary closure of limit switch 380 by bar 584, a circuit is completed by line 1119 to the solenoid 1120 of relay switch 1027 to open contacts 1026 and 1035 and close contacts 1122. Contacts 1122 establish a circuit by line 1123 to line 1036 and solenoid 1037 of relay switch 1038 to reopen contacts 1039 and reclose contacts 1040 whereby the circuit through line 1041 will be effective in reversing the pressure from valve 280 to cylinder 276. Thus through conduit 282, the cylinder will advance the base 265, the traverse platen 246 and the gaging device 288. Since the stop 286 was repositioned by spring 1030 while the stop 287 was held retracted by the closure of switch 1029, forward movement of the base 265 generally will be arrested upon engagement of the locknuts 292 with the stop 286. This operates to space the glass sheet 11 a predetermined distance from the sheet 12 which will establish the thickness of the air space 17 in the completed glazing unit 10.

In the event it is observed that one, or both, of the glass sheets has been damaged, during the preheating thereof or upon being supported on the platens 245 and 246, a manual switch 1124 is closed by an operator to complete a line 1125 to the solenoid or solenoids 1126 adapted to operate, against the tension of spring 1127, one or both of the plungers 594 situated in the entry area of the conveyor system 120 in the vicinity of the panel 578. When actively located, either plunger will be positioned to engage the limit switch 379 and, as shown in FIG. 56, it will be noted that the plungers 594 are spaced from one another due to the fact that operation of the switch 1124 may be carried out after the carrier K has been moved to bear the limit switch 379 beyond the first plunger but still in the path of the second plunger. Upon closure of the switch 379, a circuit is completed by line 1128 from source line 1010 to the solenoid 1129 of a relay switch 1130. The contacts 1131 thereof complete the circuit of line 1133 through the normally closed contacts 1134 of relay switch 1135 to lines 1136 and 1137. Line 1136 is extended through normally closed contacts 1138 of relay switch 1139, contacts 1140 of a relay switch 1141 to the opposed solenoid 1142 of relay switch 1045, and thence to source line 1011. Energization of solenoid 1142 causes opening of contacts 1048 to the end that the electrical control 330 for vacuum valve 328 is rendered inactive which reduces the evacuated condition at the platen 245. Likewise the line 1137 through the closed contacts 1143 of relay switch 1135 completes a circuit by line 1144 to the opposed solenoid 1145 of relay switch 1047. This acts to open line 1051 at the contacts 1050 whereupon the influence of device 361 on vacuum valve 344 is removed and consequently the evacuated condition at platen 246 is reduced. The glass sheets 11 and 12 are released from the platens and fall into a hopper 426. Moreover, when atmospheric pressure is again restored in conduit 350, the same result is obtained in conduit 355 whereby the vacuum switch 356 is rendered inactive and the contacts 1052 are opened and the spring 390 raises the block 387 so that it will not operate limit switches 589, 590 and 591 in any of the sealing stations 1 to 4 inclusive.

However, as a carrier K, loaded with glass, proceeds toward and through the first sealing station, the limit switches 589, 590 and 591 are sequentially engaged by the block 387 while the limit switch 592 is similarly engaged by the block 385. Upon the initial closure of the limit switch 589, the control device 431 is activated to correct the elevation of the sealing unit 430 with respect to the lower edges of the glass sheets 11 and 12.

The control device 431, which is thus adapted to be activated by the switches 589, 590 and 591 at each of the sealing stations, is first caused to function upon engagement of the switches by the block 387 in its lowered position. The diaphragm control valve, previously mentioned in connection with the control device, and designated by the numeral 1146 in FIG. 66, includes a compartment 1147 that is divided into two chambers 1148 and 1149 by a flexible diaphragm 1150. Chamber 1148 is subject to pressure from pipe 493 while chamber 1149 is similarly subject to pressure from pipe 494; the pressures existent in pipe 494 acting as a counter-balance to pressures created in chamber 1148 by the increased pressure of heated air in pipe 493.

Diaphragm 1150 is axially connected by wire 1151 to a jet pipe 1152 and an adjusted neutral position may be obtained by means of balancing springs 1153 provided with tension adjustment screws 1154. The jet pipe 1152 is connected to a pressure supply source 1155 and is mounted in chamber 1148 for pivotal movement relative to receiving jets 1156 and 1157. Jet 1156 is connected by conduit 1158 to a pressure operable switch 1159 while in the same manner jet 1157 is connected by conduit 1160 to a switch 1161.

Switch 1159 is attached by line 1162 through a normally closed switch 1163 and contacts 1164 of relay switch 1165 to line 1166 connecting to one side of a four-way valve 1167. Likewise switch 1161 is connected by line 1168 through normally closed switch 1169 and contacts 1170 of relay switch 1165 by line 1171 to the opposite side of the valve 1167. The valve 1167 is connected by pipe 1172 to an inter-lock valve 1173 having a plunger 1174, biased in one direction by a spring 1175, to connect pipe 1172 through passageway 1176 to a pipe 1177 connected to the lower end of cylinder 449. On the other hand, pipe 1178 from opposite side of valve 1167 may be connected through passageway 1179 of valve plunger 1174 to a pipe 1180 connected to the upper end of cylinder 449.

In the inactive condition of the control device 431, a circuit is normally closed to a solenoid valve controller 1181 to resist spring 1175 and close passageways through valve 1173 between pipes 1172–1177 and 1178–1180. This circuit is established by line 1182 through the normally closed contacts 1183 of relay switch 1184 to line 1185 from source 1186 and thence to source line 1187.

In intially determining a rest or lowered position for the sealing unit, the switches 1163 and 1169 are opened and either of manual switches 1188 and 1189 may be employed. Switch 1188 is adapted to energize solenoid 1191 of a spring-biased relay switch 1192 and thence to source line 1187. This causes the then closed pair of contacts 1193 to complete a circuit from line 1186 by line 1195 to the solenoid 1196 of relay switch 1184. Energization of this solenoid opens the circuit to solenoid valve controller 1181 at contacts 1183 thereby permitting plunger 1174 to establish communications between pipes 1172 and 1177 and 1178 and 1180. Line 1197, from closed contacts 1198 of relay switch 1192 and through line 1166, completes a circuit from source 1186 to one end of valve 1167 and thence to source line 1187. This operates to direct pressure through pipe 1172 and passageway 1176 of plunger 1174 to pipe 1177 since de-energization of solenoid valve control 1181, upon opening of contacts 1183, will permit plunger 1174 to dispose passageway 1176 in communication therebetween. Pressure to the lower end of cylinder 449 will now operate to raise the table 455 with the device 431, burners 432 and 434 and rolls 433 mounted thereon.

In the event switch 1189 is closed, a circuit is completed from source 1186 to the solenoid 1199 of relay switch 1200. This closes pairs of contacts 1201 and 1202 to complete a circuit through line 1204 from source line 1186 to line 1195 and solenoid 1196 thereby operating relay switch 1184 to open inter-lock valve 1173 as above described and contacts 1202 complete a circuit from source line 1186 through line 1205 to line 1171 and the opposite side of valve 1167 to direct pressure through pipes 1178 and 1180 to the upper end of cylinder 449 thereby lowering the table 455. Opening of either switch 1188 or 1189 and closure of switches 1163 and 1169 will recondition the system for automatic operation as controlled by switches 589, 590 and 591.

Accordingly, when a block 387 engages the limit switch 589, the leading corners of the glass sheets 11 and 12 will have entered between the legs 474 and 475 of the control device 431. At this moment, switch 589 completes a circuit from source 1186 by line 1206 to solenoid 1207 of relay switch 1208 to cause closure of pairs of contacts 1209 and 1210. Contacts 1209 will complete a circuit by line 1212 from source 1186 to solenoid 1213 of switch 1165 to close contacts 1164 and 1170 thus completing lines 1162–1166 and 1168–1171 to valve 1167. Simultaneously contacts 1210 will create a circuit by line 1214 to the solenoid 1196 of relay switch 1184 to open contacts 1183. Accordingly, solenoid valve control 1181 will be de-energized and plunger 1174 will complete communication of pipes 1172–1177 and 1178–1180 through passageways 1176–1179 respectively.

At the same instant, the switch 589 by branch line 1215 will complete a circuit to an electric control valve 1216 adapted to open supply lines to pipes 507 and 508 connected to the mixers 512 and 530 for the sealing burner 432 and fire-polish burner 434. This increases the gas pressures thereto to produce the flames required to carry out these functions.

The pressure in pipe 493 will be reflected in a pivotal movement of the jet 1152 whereby the degree of pressure in pipes 1158 or 1160 will activate one or the other of the associated switches 1159 or 1161 to control the valve 1167. Accordingly, when this situation exists, the pressures between orifices 479–490 and 480–492 will cause the control device 431 to "sense" the presence of the glass sheets and will in turn raise or lower the table 455 until the air pressure between orifices 479–490 will be balanced to the pressure between orifices 480–492. This positions the burners and forming rolls 433 at the optimum elevation for the sealing operation.

Upon engagement of the limit switch 590, by the block 387, a circuit is completed by line 1217 to the opposed solenoid 1218 of relay switch 1184 thereby reenergizing solenoid valve control 1181 of valve 1173 through lines 1182 and 1185 at contacts 1183. This locks the sealing unit 430 at the desired elevation by immobilizing the valve 1146 until the lower edge of the sheets have cleared the burner 434. Otherwise, the resultant unbalance of pressures in the control device 431 would cause the sealing unit 430 to rise prematurely, resulting in an unsatisfactory sealing of the sheets' edges in the vicinity of the following corners thereof.

When the sealing operation to form one wall, or here the first side wall 13, of the unit has been completed, the block 387 engages the limit switch 591 to establish a line 1219 from source 1186 to the solenoid 1220 of a relay switch 1221, and by branch line 1222 to the opposite side of valves 1216 to reduce the pressure supply to pipes 507 and 508. The pairs of contacts 1223, 1224 and 1225 overcome spring 1226 thereby completing circuits to lower the sealing unit 430; to open the controls of switches 1159 and 1161 at contacts 1164–1170 of relay switch 1165 and temporarily deenergize solenoid valve control 1181 to enable suitable direction of pressure to cylinder 449. Thus, contacts 1223 of this switch temporarily complete a line 1227 from source 1186 to the opposed solenoid 1228 of relay switch 1165 to open the circuits of lines 1162–1166 and 1169–1171 at contacts 1164 and 1170 thus rendering control of switches 1159 or 1161 to cylinder 1167 inactive. Simultaneously, line 1229 from contacts 1224 will complete a circuit to line 1171 and valve 1167 to produce downward movement of the sealing unit 430 to its inoperative position as pressure through pipes 1178 and 1180 is directed to the upper end of cylinder 449. Likewise, the circuit of line 1230 from contacts 1225 and through lines 1195 and 1214 will activate solenoid 1196 of relay switch 1184 to generally permit communication through interlock valve 1173, and then by branch 1231 to operate the timer 1232.

Upon activation of the timer 1232, a circuit will be made by line 1233 and 1217 to the opposed solenoid 1218 of relay switch 1184 which will energize solenoid valve control 1181 to cause plunger 1174 to close passageways 1176 and 1179 and thereby restore circuitry of the control device 431 to its inactive condition.

If for any reason, subsequent to operation of the limit switch 589, the table 455 should continue to rise due to failure of the device 431, or in the event that the switch 589 is accidentally engaged when there are no sheets of glass supported on the carrier, means is herein provided to shunt the majority of the controlled circuits and "lock" the table from further upward movement since the control device would otherwise cause the same to move upwardly as it continues to "sense" or "hunt" for the normally present margins of the glass sheets. For this purpose, one or more limit switches 1234 are suitably mounted in fixed relation to the sealing unit 430 as to be engaged thereby in the event said unit is raised by the cylinder 449 beyond the normally predetermined height. The limit switch 1234, when so engaged, completes a circuit from source 1186 to solenoid 1235 of relay switch 1236. Pairs of contacts 1238 and 1239 are then closed; the first pair completing a line 1240 to line 1227 and solenoid 1228 of relay switch 1165 to open the contacts 1164–1170 thereof and the second pair of contacts 1239 completing a line 1241 to line 1217 and solenoid 1218 whereby solenoid valve control 1181 will be reenergized by lines 1182 and 1185 through contacts 1183. This acts to automatically arrest movement of the sealing unit until it is lowered upon the engagement of limit switch 591 or by manual intervention if necessary.

As previously mentioned, to provide at least one dehydration opening into the air space 17 of the completed glazing unit, a small metal tube or grommet 538 is fused into the side wall of the unit coincident with the formation thereof by the rolls 542 at sealing station 1 and preferably adjacent the leading edge. For this purpose, limit switch 592 described in connection with FIG. 56, initiates the cycling of the grommet insertion mechanism 471. Although one dehydration opening is sufficient for the glazing units 10, in some, produced according to this invention, it may be found advantageous to include two limit switches 592 thereby inserting two grommets at equally spaced distances from the opposite corners along one side of the unit. However, since each switch 592 will initiate the same cyclic functions and one such opening may be employed to advantage under most circumstances, the following description will be directed to the use of one switch. The grommet feeding device 471, as shown in FIG. 67, is fully set forth and claimed in the co-pending patent application of Davis et al., Serial No. 804,355, assigned to the assignee of the present application.

As herein set forth, the limit switch 592 is adjustably mounted on the bracket 593 by means of a plate 1242 having a pointer 1243 registering with a linear scale 1243' fixed on said bracket. A suitable predetermined distance from one corner of the unit may thus be selected and the switch is then located in position to be engaged by the block 385 on each carrier K as the following corners of the glass sheets 11 and 12 are substantially passing through the control device 431. The switch causes the completion of circuits (not shown) for operation of the reciprocally mounted bar 537 which feeds a grommet to the tip of the plunger 539. Another circuit is completed by line 1244 from source line 1245 through switch 592 to the solenoid 1246 of a relay switch 1247 and thence to source line 1248. This switch is equipped with normally open pairs of contacts 1249 and 1250 and a normally closed pair of contacts 1251. Upon energization of the solenoid 1246, the contacts 1249 against bias of spring 1252 will complete a line 1253 from source line 1245 to one side of a conventional valve 1254 and thence to source line 1248. In the manner described in the above-mentioned Davis et al. application, the valve 1254 is connected to a cylinder 1255 through pipes 1256 and 1257 by suitable linkages and cams indicated generally at 1258 and 1259, causes the plunger 539 to be moved forwardly and upwardly to supply a grommet 538. Likewise, contacts 1250 will complete line 1260 to an electric control valve 1261 to open the gas pressure line to burner 544 to heat the grommet in advance of its insertion between the glass sheets. Now by suitable timing means, not shown, the relay switch is adapted to be reversed; opening contacts 1249 and 1250 and reclosing contacts 1251 to reverse the cylinder 1255 thereby returning the plunger 539 generally to its original position to receive a subsequent grommet. When the limit switch 591 in the first sealing station has been released and the carrier K moved forwardly therefrom, the glass sheets 11 and 12 will have been interjoined by the formation of the side wall 13 as indicated in FIG. 56. Also a dehydration opening, as provided by a grommet 538, will have been created in the wall 13.

Continuing forwardly the carrier causes the limit switches 381, 382 and 380, in this respective order, to be engaged by the bars 585, 586 and 584 on the panel 579 in the vicinity of the second sealing station. Limit switch 381, when temporarily closed, completes a circuit by line 1270 from source line 1010 to the solenoid 1271 of the relay switch 1141; this acting to open contacts 1140 and simultaneously closing contacts 1273. Contacts 1273 create a line circuit to line 1136 and solenoid 1142 of the relay switch 1045 to open the contacts 1048 thereof with consequent reversal of the vacuum valve 328. This operates to break the vacuum at platen 245 and release the sheet 12 therefrom. The limit switch 381 may also initiate the action of a timer to reclose the contacts 1048 but more preferably is held engaged by the bar 585 the length of which is predetermined to hold such engagement during the engagement of limit switch 382.

Now limit switch 382, when engaged by bar 586, completes line 1275 from source line 1010 to solenoid 1276 of relay switch 1277 and solenoid 1278 of relay switch 1279. Contacts 1280 of switch 1277 then complete a line 1282 connecting to line 1116' and thus to solenoid 1117' of the relay switch 1038 to open the contacts 1039 and close contacts 1040. As previously described, this produces reversal of valve 280 by line 1041 whereupon the cylinder 276 retracts the traverse platen 246 and at this time removes the glass sheet 12 from contact with the fixed platen 245. Solenoid 1278 opens contacts 1283 of switch 1279 and closes contacts 1284 thereof. The contacts 1284 by line 1286 from line 1275 complete a circuit to the solenoid 1287 of relay switch 1288 to complete another circuit from source line 1010 through contacts 1289 by line 1290 to the electromagnetic clutch 315 which controls operation of the indexing gear drive 277. The drive 277 now proceeds to index the traverse platen 246 and glass sheets by means of the gear 307 and driven element 308.

As originally described, one revolution of the gear 307 produces one-quarter rotation of the element 308 and hollow shaft 268. This normally is terminated upon engagement of the lever 320 with the limit switch 321; however, as also mentioned, this switch is periodically shunted to continue rotation of the shaft 268 to a full half-rotation or 180°. Switch 321 by line 1291 through contacts 1283 of relay switch 1279 is connected to opposed solenoid 1292 of relay switch 1288. However, since the length of bar 586 causes the limit switch 382 to hold relay switch 1279 so that the contacts 1283 are open, the switch 321 is inoperable. When the turning of the glass sheets 11 and 12 to locate the opposite marginal edges in position to be sealed has been nearly completed, the limit switch 382 is released thereby permitting contacts 1280 of relay switch 1277 to open; contacts 1284 to open and contacts 1283 of relay switch 1279 to be reclosed. Thus, as the turning of the element 308 and shaft 268 reaches a substantially half-revolution, the switch 321 will be closed by lever 320 on the drive shaft 312 of the gear 307. The circuit of line 1291 to solenoid 1292 thus will open contacts 1289 of switch 1288 and consequently disengage the clutch 315.

Since it is imperative that this next pair of marginal edges of the glass sheets 11 and 12 be exactly located in a horizontal plane, the device 391 is provided on each carrier K to be operated during and by rotation of the hollow shaft 268. Accordingly, the roller 398 of the rod 393 will traverse the periphery 392' of the element 392 and at regularly spaced areas arranged at substantially 90° to one another the roller is received in a notch 399. Therefore upon halting rotation of the gear 307 at the clutch 315, the roller must have properly entered a notch to lower the rod and cross-arm 393' at the top thereof. In the event that the cross-arm is held in its uppermost position, further movement of the carrier will carry the cross-arm into engagement with one of the arms 595. Upon swinging of the arm 595, a switch, as indicated at 1293, will be closed to complete the circuit of an alarm device, such as a bell 1294, to alert operating personnel that the next step in the sealing operation will not be properly accomplished.

However, if upon completion of the indexing motion the lower edges of the sheets are horizontal, the rod 393 will be lowered and the cross-arm 393' disposed to pass beneath the lever 595 while the limit switch 381 is released from its riding engagement on the bar 585. The timer 1295 will now function to energize the solenoid 1044 of relay switch 1045 while the opening of contacts 1273 and reclosing of contacts 1140 of relay switch 1141 will be accomplished. Simultaneously with these activities, the limit switch 380 engages bar 584 and thereby creates the previously described circuit through line 1119 and contacts 1122 of relay switch 1026 to solenoid 1037 to reclose contacts 1039 of relay switch 1038 while opening contacts 1040 thereof. This again reverses the valve 280 and cylinder 276 to cause the base 265 to move forwardly until the locknuts 292 engage the stop 286 and the sheet 12 is again in surface contact with the stationary platen 245. Also when solenoid 1044 of relay switch 1045 is re-energized, the circuit of line 1049 will be restored to control 330 for valve 328 thereby creating a vacuous condition at the platen 245. Under these circumstances, the carrier K proceeds through the second sealing station and sequentially causes the block 387 to engage limit switches 589, 590 and 591 to activate the control device 431, and the burners 432 and 434 of the second sealing unit 430 to fusingly form the second or side wall 14 of the glazing unit.

In being moved along the rolls 564 toward the third sealing station, the carrier K is caused to carry the limit switch 383 first into engagement with the bar 587 on the panel 580. This switch through line 1296 completes a circuit to the solenoid 1297 of relay switch 1139 whereupon the contacts 1298 complete a circuit from source line 1010 and line 1300 to line 1136 and solenoid 1142 through presently closed contacts 1140 of relay 1141. The contacts 1048 of relay switch 1045 are resultantly opened to again de-energize the control 330 for vacuum valve 328. At this time, the contacts of relay switch 1045 remain disengaged since in the normal operation of the apparatus further use of vacuum at the platen 245 is dispensed with.

By branch line 1301, limit switch 383 is instrumental in connecting the source line 1010 to a timer 1302; the solenoid 1303 of relay switch 1018; and solenoid 1304 of relay switch 1029. Firstly, the timer 1302 initiates an interval during which the circuits of the motor 316 will be reversed and secondly, the solenoid 1303 causes opening of contacts 1015, 1016 and 1017 and closure of contacts 1305, 1306 and 1307 to reverse the connection of lines 1006, 1007 and 1008 to motor lines 1019, 1020 and 1021. In the last instance, the solenoid 1304 causes opening of the contacts 1031 of relay 1029 to de-energize solenoid 305 and permit spring 1033 to advance the stop 287.

While these functions are being carried out, engagement of the limit switch 382 by bar 586 again activates solenoids 1276 and 1278 of relay switches 1277 and 1279 respectively. The present bar 586 is shorter than the bar 586 associated with the second sealing station and does not hold the switch 382 closed for a sufficient length of time to nullify operation of the limit switch 321. Accordingly, when the switch 382 opens the contacts 1283 and closes contacts 1284 as above described, it energizes the solenoid 1287 of relay 1288 to engage the electromagnetic clutch 315 and upon the closure of contacts 1280 of relay 1277, the line 1282 is temporarily restored to cause the traverse platen 246 to move the glass sheets 11 and 12, now joined by the oppositely disposed side walls 13 and 14, rearwardly from the fixed platen 245. As above mentioned and when the clutch 315 is energized, the motor 316 will be operated to drive the gear 307 in a reverse direction until the lever 320 engages the switch 321 and the partially completed unit has been turned through a one-quarter revolution. Since contacts 1283 of relay switch 1279 have reclosed in advance of this engagement of the switch 321, the circuit of line 1291 to the solenoid 1292 will open contacts 1289 of relay switch 1288 to de-energize the clutch 315.

Upon subsequent engagement of the bar 584 by limit switch 380, the circuit of line 1119 is again completed to reverse the contacts 1039 and 1040 of switch 1038 which effects operation of the valve 280 and cylinder 276 to move the base 265 and traverse platen 246 forwardly. Now, the spaced arrangement of the lock-nuts 293 in relation to the stop 287 becomes instrumental in arresting the forward movement of the platen so that the glass sheet 12 will be hereafter spaced from the surface of the platen 245. In this new position of the sheets, they are advanced along a path aligned with the third and fourth sealing stations. In the third sealing station, the block 387 becomes again effective in operation of the control device 431 and burners 432 and 434 of the third sealing unit 430 and upon sequential engagement with the third set of limit switches 589, 590 and 591. Upon departure of the carrier from the third sealing station, the partially completed unit will appear as between stations 3 and 4 in FIG. 57 with the third side wall 15 having been finished. And the timer 1302 will have become active to complete a circuit by line 1308 to opposed solenoid 1309 of relay switch 1018 to open contacts 1305, 1306 and 1307 and reclose contacts 1015, 1016 and 1017 thereby reversing the polarity of motor 316 to its original direction of rotation.

Now, as the carrier is advanced between the third and fourth sealing stations, the panel 581 next approached has only two bars 586 and 584 mounted thereupon. The bar 586 in the present instance is of a length approximating the bar on panel 579 between the first and second stations; consequently when the switch 382 is again held engaged, the limit switch 321 will be held inoperative when closed upon first engagement by the lever 320 but will become active upon the second engagement or when the partially completed glazing unit has been turned by rotation of the shaft 268 a full half turn to locate the remaining marginal edges of the sheets in position to be sealed. Also in this area of the sealing conveyor system, a second lever 595 is located to signal over-travel or under-travel of the indexing mechanism.

Upon engagement of the limit switch 384 by the bar 583 on panel 581, the described circuitry of relay switch 1038 is repeated to cause the cylinder 276 to advance the platen 246 until the lock-nuts 293 are engaged by the stop 287. This is followed by sequential engagement of the limit switches 589, 590 and 591 in the fourth sealing station to effect the formation of the side wall 16 and completion of the four sides of a multiple glass sheet glazing unit.

In advancing from the fourth sealing station, subsequent engagement of the switch 382 by a bar 586 and the switch 380 by a bar 584 causes the platen 246 to be retracted, turned through a quarter-revolution and then advanced to the forward position determined by the stop 287. The purpose of so turning a unit at this time is to locate the side wall 13, originally formed, on the bottom of the unit since it has been found advantageous to locate the elevation in which the racks O receive the completed glazing unit at the same level as the elevation in which the racks J were delivered into the transfer area E. Accordingly, the dimension of the unit from the center of the platen 246 to its lower side wall will be substantially identical to the same distance as from the center of the platens 245 and 246 to the lower edges of the glass sheets 11 and 12 when they were received therebetween. And this is to prevent dropping of the unit onto a rack O when the vacuum of platen 246 is discontinued, or the impacting of the unit against the rack; either events may possibly cause marring or total destruction of the unit.

When a carrier K, with a completed multiple glass sheet glazing unit 10 carried on the platen 246 thereof, enters the exit end of the conveyor system 120, the rolls 564 on which it is propelled forwardly are driven from the motor 577, the circuit for which is illustrated in FIG. 68. The carrier K closes a limit switch 1315, located near the end of the conveyor, to complete a circuit from source line 828 thereby increasing the speed of the motor. However, before making more specific reference to this situation, attention is directed to FIG. 69 wherein a representative electrical system for the unloading elevator 121 is diagrammatically illustrated. Thus, the originally described source lines 641, 642 and 643 are completed to service lines 1316, 1317 and 1318 through a control switch 1319. Similarly, a manual switch 1320 is closed in line 1316 to activate control circuitry for said elevator through a transformer 1321 which through its secondary has source lines 1322 and 1323. In normal operations of the sealing apparatus, the elevator carriage 601 is halted at the sealing level to receive a carrier K from the end of the conveyor 120 and it is presently to be understood and by means hereinafter to be described that the circuits to bus bars 1324, 1325 and 1326 have been completed. Likewise, the rolls 604 are being driven from the motor 605 while the dog 1327 of the stop device 1328 has been raised to its operable position by the spring 1329. Further, the elevator carriage is equipped with limit switches 1330, 1331 and 1332 positioned to be engaged by the entering carrier.

Accordingly, when the leading end of the carrier closes limit switch 1315 (FIG. 68) a circuit from source line 828 will be completed by line 1333a to one side of limit switch 1330 but since this switch is located at the adjoining end of the carriage 601, the closure thereof is rapidly accomplished. Line 828 through line 1333 is thus completed by line 1333b to a solenoid 1334 and thence to 829. The source lines 1335, 1336 and 1337 to motor 577 are completed from lines 641, 642 and 643 through a control switch 1338; the line 1337 having a resistance 1339 interposed therein. The solenoid 1334, when energized, is adapted to reduce the resistance against the bias of spring 1340 which, in this instance, increases the speed of rolls 564 to a rate of speed comparable to that at which the rolls 604 are being operated. When the limit switch 1315 is released upon complete entry of the carrier K onto the elevator carriage 601, the opened circuit of line 1333 enables the spring 1340 to effect an increase in the resistance 1339 whereby the rolls 564 will resume a rate of speed similar to those rolls in the central area of the conveyor system 120.

As the carrier K progresses onto the carriage 601, it sequentially causes closure of switches 1331 and then the switch 1332 substantially simultaneously with entry of the dog 1327 into the notch 232 in plate 230 on the body of the carrier. Also, as the rear end of the carrier clears the end of the carriage, the sliding contactors 369, 370 and 371 (FIG. 65) will be engaged with bus bars 1324, 1325 and 1326. Thus the electrical system on the carrier K will be maintained and, particularly, the operation of the vacuum pump 324 (FIG. 65) will be continued thereby sustaining the completed unit on the platen 246.

Closure of limit switch 1331 completes a circuit from source line 1322 by line 1341 to solenoid 1342 of a spring-biased relay switch 1343 and thence to source line 1323. The contacts 1344 of this switch complete a circuit from source 1322 by line 1346 to solenoid 1347 controlling a resistance in the service lines to motor 605 for the rolls 601. This rotor is connected to service lines 1316, 1317 and 1318 through the presently closed pairs of contacts 1348, 1349 and 1350 of relay switch 1351. Accordingly when solenoid 1347 is energized, the resistance 1352 in one line will be increased to reduce the speed of rolls 604 as the carrier K approaches a centralized position on the carriage 601. Upon closure of the limit switch 1332, a circuit is established from source line 1322 by line 1353 through the normally closed contacts 1354 of relay switch 1355 to the solenoid 1356 thereof and thence to source line 1323. Temporary energization of solenoid 1356 acts to close a pair of contacts 1357 to establish circuits from source 1322 by lines 1358 and 1359, first to solenoid 1360 of relay switch 1351 and then to solenoid 1361 of relay switch 1362. The solenoid 1360 acts to open pairs of contacts 1348, 1349 and 1350 thereby opening circuits of service lines 1316, 1317 and 1318 to lines 1363, 1364 and 1365 and motor 605. As this motor and the rolls 604 rotated thereby are halted, the solenoid 1361 acts to close contacts 1366 of switch 1362 and this produces a circuit from source line 1322 by line 1367 to an opposed solenoid 1368 whereby the resistance 1352 in line 1365 will be reduced to its minimum. Closed contacts 1369 of relay switch 1355 further complete a circuit from source line 1322 by line 1370 to the solenoid 1371 of relay switch 1372. This switch controls operation of motor 603 to produce downward motion of the elevator carriage 601 through pairs of contacts 1373, 1374 and 1375 and by lines 1376, 1377 and 1378 from source lines 1316, 1317 and 1318 to said motor. And a variable resistance 1379 is interposed in the motor line 1378.

The elevator carriage 601, as in the case of the elevator carriage 140, is equipped with adjustably mounted switch contactor plates 1380, 1381 and 1382. As the carriage is lowered to the transfer area F, contactor plate 1380 closes limit switch 1383 to complete a circuit from source line 1322 through line 1384 to the solenoid 1385 of relay switch 1386 whereupon the contacts 1387 thereof temporarily complete a circuit by line 1389 from source line 1322 to the solenoid 1390 controlling resistance 1379. This increases the resistance in line 1378 and reduces the speed of the motor 603 to reduce the rate of descent of the elevator carriage.

When the carriage reaches the level at which the completed glazing unit is transferred from the platen 246 to a support rack O, the contactor plate 1380 closes limit switch 1391 to complete a circuit by line 1392 from source line 1322 to opposed solenoid 1393 of relay switch 1372 and also activates three timing devices 1394, 1395 and 1396. Solenoid 1393, when energized, causes opening of service lines 1376, 1377 and 1378 at contacts 1373, 1374 and 1375 of switch 1372 to halt motor 603. At this time, the elevator carriage 601 is lowered substantially into contact with the uppermost surface of a platform 1397 which, as in the case of the previously described platform 990 in the base of loading elevator 119, is located in the base structure of the unloading elevator 121 and the said surface, determined by the height of the bar 1398, positively stops the carriage when the lower side wall of the unit rests upon the support blocks 1399 on the rack O.

The timing devices 1394, 1395 and 1396 operate in a selected sequence to release the unit 10 from the platen 246; to open the circuits to bus bars 1324, 1325 and 1326 on the elevator carriage 601 and to raise the empty carrier K to the level of the Return conveyor system 122. Thus, when the timer 1394 becomes active, a circuit from source line 1322 is completed by line 1400 to solenoid 1401 of a control device 1402 mounted on the carriage 601. The armature 1403 of this device causes forward movement of a pivotally mounted lever 1404, against tension of spring 1405, so that the limit switch 378 on the carrier K is temporarily closed. Referring again to FIG. 65, it will be seen that the switch 378 conpletes a circuit from source line 1010 by line 1406 to the solenoid 1407 of relay switch 1135 to open contacts 1134 and 1143 and close contacts 1408 thereby completing a circuit from source 1010 through lines 1409 and 1144 to the opposed solenoid 1145 of relay switch 1047 to open the contacts 1050 thereof. Contacts 1050, during the sealing operation, were connected by line 1051 to control the activity of the control 361 for vacuum valve 344; however, under the present circumstances, opening of the line 1051 reverses the direction of the evacuation action to conduit 350 to increase the pressure at the surface of the vacuum plate 246. This is also reflected in the opening of contacts 1052 of vacuum switch 356 whereupon spring 390 operates to raise the actuator block 357 to its inactive position.

As earlier described, the air discharge port of the vacuum pump 324 is connected by conduit 359 to the valve 344 whereupon the intake of air through the filter 358 and tubing 357 is redirected from the valve and pump to opposite passageways in said valve to pipes 346 and 347 and conduit 350. This operates to create a positive air pressure at the surface of the platen 246 to push the glazing unit therefrom whereby the unit will be freely supported on the blocks 1399 of the rack O and vertically sustained between the pairs of rolls 1410.

Switch 378, by branch line 1412 from line 1406, energizes solenoid 1413 of a spring-biased relay switch 1414 whose contacts 1415 complete a circuit through line 1417 by way of lines 1282 and 1116' to the solenoid 1117' of relay switch 1038. As previously described, the contacts 1040 of the relay 1038 are now opened and contacts 1039 closed to reverse the control of valve 280 thereby pressurizing the cylinder 276 to retract the base 265 so that the traverse platen 246 is spaced the full distance from the stationary platen 245.

On the other hand, timing device 1395, FIG. 69, when active and connected to source lines 1322 and 1323, completes a circuit by line 1418 to solenoid 1419 of relay switch 1420 to open the pairs of contacts 1421, 1422 and 1423, thereby disconnecting the service from lines 1316, 1317 and 1318 to the circuits of bus bars 1324, 1325 and 1326. The electrical circuits to the carrier K on elevator carriage 601 are now open with consequential stopping of the motor 1014 for pump 284; the motor 316 for gear unit 307; the motors 1022 and 1023 for the vacuum pumps 323 and 324 and the circuit to the signal lamp 1012.

Now, when timer 1396 becomes active, it will complete a circuit from source line 1322 by lines 1424 and 1425 to the solenoid 1426 of relay switch 1427 and solenoid 1428 of relay switch 1429. In the first instance, the contacts 1430 of relay 1427 will complete a line 1431 to the opposed solenoid 1432 of resistance 1379 to reduce the control thereof in a service line 1378. Secondly, the solenoid 1428 of relay switch 1429 will operate to close pairs of contacts 1433, 1434 and 1435 thereby completing the circuitry of lines 1316–1376, 1317–1377 and 1318–1378 to motor 603 but with reversed polarity. The elevator carriage 601 consequently will now be raised through the Sealing level to the Return level.

During upward motion of the carriage, the contactor plate 1381 engages a limit switch 1436 which completes a circuit from source line 1322 by line 1437 to the electrical system by which the conveyors of the Annealing Section are caused to sequentially operate as illustrated in FIG. 70. Accordingly, when the elevator carriage 601 has reached this point in its upward movement, the limit switch 1436 actuates the "walking-beam" conveyor 610 to pick up the freshly loaded rack O in the transfer area F and carry the same into the annealing tunnel P. This effects an interlocking relation between operation of the unloading elevator 121 and operation of the Annealing Section whereby particularly the conveyors 610 and 620 will be idle when a glazing unit is to be transferred from a carrier K.

Upon approaching the upper limit of its movement, the carriage 601 carries the contactor plate 1380 into engagement with the first of limit switches 1438, 1439 and 1440. Switch 1438 when closed completes the circuit of line 1441 from source line 1322 by line 1384 to the solenoid 1385 of relay switch 1386; this operating to energize solenoid 1390 and adjust resistance 1379 to reduce the speed of motor 603 thereby slowing the upward movement of the elevator carriage. Limit switch 1439, next closed, completes a circuit from source line 1322 by line 1442 to solenoid 1443 of relay switch 1444 whereupon the contacts 1445 will complete a circuit by line 1446 from source line 1322 to the solenoid operated valve 1447. This valve then operates to direct pressure to cylinder 1448 to move the dog 1327 of stop device 1328 downwardly against spring 1329 and out of engagement with the notch 232 of plate 230 on the carrier K.

Limit switch 1440 is adapted to halt upward motion of the carriage 601; start the rolls 604 rotating to remove the carrier K outwardly onto the rolls 193 of the return conveyor system 122; and then reduce the resistance 1379. For these purposes, switch 1440 completes a circuit from source 1322 by line 1449 to the solenoid 1450 of relay siwtch 1451. The contacts 1452 thereof now complete a circuit by line 1454 to the opposed solenoid 1455 of relay switch 1429 to open the contacts 1433, 1434 and 1435 and thus the service lines to motor 603. Contacts 1456 of switch 1451 likewise complete the circuit of line 1457 to the solenoid 1458 of relay switch 1459. The contacts 1460, 1461 and 1462 now complete the circuits of lines 1365, 1364 and 1363 to motor 605 reversing the polarity thereof and causing the rolls 604 to move the carrier K, outwardly or leftwardly as viewed in FIG. 57, onto the conveyor 122. Lastly from switch 1440 and by line 1466, a circuit is completed to solenoid 1467 of relay switch 1468. The contacts 1469 of this switch complete a circuit from source line 1322 by lines 1431 and 1471 to the solenoid 1432 to reduce the control of resistance 1379.

When the carrier K is received on the rolls 193 and the following end of the carriage has cleared the entry end of conveyor 122, a limit switch 1472 mounted on the conveyor is engaged to halt rotation of the rolls 604 and initiate downward movement of elevator carriage 601. For this purpose, switch 1472 completes the circuit of line 1473 from source 1322 to the opposed solenoid 1474 of relay switch 1459 to open contacts 1460, 1461 and 1462. By line 1475, switch 1472 also completes a circuit to line 1370 whereupon the solenoid 1371 of relay switch 1372 causes contacts 1373, 1374 and 1375 to reclose thereby restoring service lines to motor 603 to lower the carriage 601.

Upon approaching the conveyor system 120 at the Sealing level, the carriage 601 moves contactor plate 1382 into engagement with the first of three limit switches 1476, 1477 and 1478. Switch 1476 by line 1479 completes a circuit from source line 1322 to solenoid 1480 of relay switch 1481 thereby closing contacts 1482 to complete the circuit of lines 1483 and 1389 to solenoid 1390. This operates to increase the resistance 1379 thereby slowing downward movement of the elevator carriage. By branch line 1484, switch 1476 is also instrumental in energizing opposed solenoid 1484′ of relay switch 1351 thereby reclosing contacts 1348, 1349 and 1350. These contacts, as previously described, complete the service lines 1363, 1364 and 1365 to motor 605 whereupon the rolls 604 are again driven. By a second branch line 1485, a circuit is completed to the opposed solenoid 1486 of relay switch 1420 to close the contacts 1421, 1422 and 1423 and complete the circuits of service lines 1316, 1317 and 1318 to bus bars 1324, 1325 and 1326.

Limit switch 1477, next temporarily closed, completes the circuit of line 1487 to the opposed solenoid 1488 of relay switch 1444 whereupon the contacts 1445 are reclosed to de-activate the valve 1447 and permit the spring 1329 to return the dog 1327 upwardly to its active position of engagement. The switch 1478, when engaged, completes a circuit by line 1489 to the solenoid 1490 of relay switch 1491. Contacts 1492 now complete a circuit by line 1494 from source 1322 to the line 1392 and opposed solenoid 1393 of relay switch 1372 to halt operation of motor 603 upon opening of contacts 1373, 1374 and 1375. Branch 1495 from line 1489 also energizes solenoid 1496 of relay switch 1497 to close contacts 1498 thus completing line 1499 to line 1431 and solenoid 1432. This operates to reduce resistance 1379. Upon halting of the motor 603, the elevator carriage 601 will have completed one cyclic operation and will be properly positioned to receive the next succeeding carrier K arriving at the exit end of the conveyor system 120 with a completed glazing unit 10.

As diagrammatically illustrated in FIG. 70, the electrical operating and control systems for the several conveyors in the Annealing Section D are adapted to be independently operated in the event that the operations of the preceding sections of the sealing apparatus have been stopped. This, of course, is not to be understood as a normal operating procedure but does occur when the apparatus is to be shut down. Thus, during full operation, the conveyors of the Annealing Section function in cycles that are initiated by the limit switch 1436 (FIG. 69) when the carriage 601 of the unloading elevator 121 has been carried upwardly above the Sealing level or at least upwardly from the transfer area F.

Accordingly, the previously described service lines 641, 642 and 643 may be connected to service lines 1500, 1501 and 1502 through a control switch 1503. Likewise pilot source lines 1504 and 1505 may be established from the secondary of a transformer 1506 connected to circuit lines 641 and 642 and the line 1504 completed through a manual switch 1507. Now according to one method of procedure, the beams 611 of the "walking-beam" conveyor 610 are caused to raise the rack O, with a completed glazing unit loaded thereon, from the tracks 624 and move the same outwardly to an initial position on the fixed rails of the tunnel P while advancing the preceding racks toward the tracks 627 in the unloading area U.

For this purpose, the limit switch 1436 (FIG. 69) temporarily completes the circuit of line 1437 to the solenoid 1508 of a relay switch 1509 thereby closing contacts 1510 to complete a circuit from source line 1504 by line 1512 to a timer device 1513 connected to source lines 1504 and 1505. This timer, after a suitable interval, and by line 1514 extends through the solenoid 1515 of a relay switch 1516 to the source line 1505 to close contacts 1517, 1518 and 1519 of the switch 1516 and complete line circuits 1520, 1521 and 1522 from the service lines 1500, 1501 and 1502 to the motor 613, which operates to raise the beams 611 of the conveyor 610 and lift the rack O from the tracks 624. At the upper limit of their movement, the beams close a limit switch 1523, thereby establishing a circuit from supply line 1504 by line 1524 through the normally closed contacts 1525 of switch 1526 to the solenoid 1527 of relay switch 1528 and thence to source line 1505. The pair of contacts 1529 of this switch 1528 complete a circuit by line 1530 from source line 1504 to a valve 1531 which is operatively associated with the cylinder 615 of conveyor 610. The cylinder 615 moves the elevated beams 611 outwardly toward the tracks 627 until the outermost loaded rack O is positioned thereabove.

Likewise, contacts 1532 complete a circuit by line 1533 from source line 1504 to a valve 1534 associated with the cylinder 618 of the "walking-beam" conveyor 616. The cylinder 618 causes the said conveyor to carry the beams thereof, in a lowered position, toward the tracks 627 at the entry end of the return tunnel R. Upon arriving at this area, conveyor 616 opens the contacts 1525 of switch 1526 to de-energize the solenoid 1527 of relay switch 1528 with resultant opening of contacts 1529 and 1532. Substantially simultaneously, the contacts 1535 of switch 1526 are closed to complete a circuit from supply line 1504 by line 1536 to the opposed solenoid 1537 of relay switch 1516 thereby opening contacts 1517, 1518 and 1519 and lines 1520, 1521 and 1522 to motor 613. Branch line 1538 also completes the circuit of line 1536 to solenoid 1539 of spring-biased relay switch 1540 to engage pairs of contacts 1541, 1542 and 1543 which operates to reverse the polarity of motor 613 through service lines 1520, 1521 and 1522. Consequently, the motor causes lowering of the beams 611 to deposit one rack O on the tracks 627 and the remainder of the loaded racks of the fixed rails of tunnel P. Lowering of beams 611 also acts to open switch 1523.

Now, by means of branch 1544 from line 1536, circuits are established to a timer 1545 and the solenoid 1546 of spring-biased relay switch 1547. The contacts 1548 of switch 1547 complete a circuit by lines 1549 and 1550 from source line 1504 to the opposite sides of valves 1531 and 1534, whereupon the cylinders 615 and 618 will operate conveyors 610 and 616 to carry their respective beams rearwardly and out of their association with the tracks 627. On the other hand, operation of the timing device 1545 creates a circuit by line 1551 to one side of a hydraulic valve 1552, associated with the cylinder 629, to cause the same to raise the bar 626 of cart 625 and lift a loaded rack O within the annealing tunnel P from tracks 627 and a recently unloaded rack O from the intermediate area thereof. At the upper limit of its movement, the lift bar 626 closes a limit switch 1553.

The switch 1553 is carried by the cart 625 and completes a circuit from supply line 1504 by line 1554 through the normally closed contacts 1555 of switch 1556 to the solenoid 1557 of a relay switch 1158 to close contacts 1559 thereby completing a circuit from supply line 1504 by line 1560 to one side of a valve 1561 and thence to source line 1505. The valve 1561 is associated with cylinder 628 whereby the cart 625 is operated to advance the supported racks O along and above the tracks 627, so that the empty rack will be advanced to the entry end of the return tunnel R while the second rack will be delivered to the intermediate area of the tracks where the completed glazing unit 10 is unloaded. At this time, the cart opens the contacts 1555 and closes the contacts 1562 of switch 1556. The contacts 1562 complete a circuit from supply line 1504 through line 1563 to a timing device 1564 and supply line 1505. The timer, when activated, lowers the lift bar 626 thereby placing the racks O on tracks 627 and initiates the movement of the cart 625 rearwardly into the exit end of the annealing tunnel P adjacent the end of conveyor 610.

For these purposes, timer 1564 by line 1565 is connected to the opposite side of valve 1552 thereby reversing the same and causing the cylinder 629 to lower the bar 626 which opens the switch 1553. The timer then by line 1566 completes a circuit from source line 1504 through the normally closed contacts 1567 of switch 1568 to the solenoid 1569 of spring-biased relay switch 1570 to close contacts 1571 thereby completing a circuit from source line 1504 by line 1572 to the opposite side of valve 1561, which operates to reverse the direction of pressure to the cylinder 628. Consequently, the cart 625 is moved into the annealing tunnel P and in so doing opens contacts 1562 of switch 1556 while reclosing the contacts 1555 thereof. Now, when the cart arrives in this area, the limit switch 1568 is actuated to open contacts 1567 and close contacts 1573 completing a circuit by line 1574 to a timing device 1575, said timer being in circuit with source lines 1504 and 1505.

When timer 1575 becomes active, a line 1576 is completed from source line 1504 to one side of a valve 1577 which is associated with the cylinder 631. The cylinder 631 raises the lift bar 623 and two empty racks O respectively at the exit end of return tunnel R and the intermediate area of tracks 624. At its upper limit of movement, the bar 623 closes limit switch 1578 to produce a circuit by line 1579 from source line 1504 through the normally closed contacts 1580 of switch 1581 to the solenoid 1582 of relay switch 1583. The contacts 1584 of switch 1583 complete line 1585 to one side of a valve 1586 associated with cylinder 630 which moves the cart 622 laterally toward the transfer area F and the entry end of the annealing tunnel P. This action will carry one empty rack O to the ends of tracks 624 in said transfer area and the second rack to the intermediate track area Upon arriving at this area, the cart 622 causes engagement of the switch 1581 to open the contacts 1580 and close contacts 1587 to complete a circuit by line 1588 to a timer 1589 and by branch 1590 are connected to the opposite side of valve 1577 to produce the reversal thereof. This causes the cylinder 631 to lower the bar 623 and the empty racks O onto the tracks 624 thereby opening limit switch 1578.

In timed relation, the timer 1589 completes a circuit by line 1591 from supply line 1504 through closed limit switch 1592 to the solenoid 1593 of the spring-biased relay switch 1594. Action of this switch closes contacts 1595 to complete the circuit of line 1596 from source line 1504 to the opposite side of valve 1586. This causes the cylinder 630 to return cart 622, with the lift bar 623 in its lowered position, to its location at the exit end of the return tunnel R. At this time, the switch 1592 is opened to de-energize the solenoid 1593 while the contacts 1587 of switch 1581 are opened and contacts 1580 reclosed. During the interval of time required for this cyclic activity of the cart 622, the timer 1589 is adapted to initiate the operation of a timer 1597 through line 1598, said timer being in circuit with source lines 1504 and 1505.

The timer 1597 completes the circuit of a line 1599 through closed limit switch 1600 to solenoid 1601 of a spring-biased relay switch 1602 having normally open contacts 1603 and 1604 and normally closed contacts 1605. Contacts 1603 complete a circuit by lines 1606 and 1549 from source line 1504 to the opposite side of valve 1531 whereby the direction of pressure to cylinder 615 will be reversed to move the conveyor 610 rearwardly from the tracks 627 in the unloading area U and with the beams 611 thereof in their lowered position, thereby opening contacts 1535 of switch 1526 and reclosing contacts 1525. When contacts 1535 are opened, the circuits of lines 1536 and 1538 will be discontinued to de-energize solenoids 1537 and 1539, thereby opening contacts 1541, 1542 and 1543 to the service lines for motor 613.

On the other hand, the circuit of line 1607 through contacts 1604 will be completed to solenoid 1608 of relay switch 1609 thereby closing contacts 1610, 1611 and 1612 to complete a circuit from lines 1500, 1501 and 1502 to lines 1613, 1614 and 1615 and the motor 617 of the "walking-beam" conveyor 616. The beams of the conveyor 616 will now be raised to lift the unloaded rack O from the tracks 627 and the rest of the racks O previously advanced through the return tunnel R. At their upper limit, the beams engage limit switch 1600 to open the same and de-energize the solenoid 1601 thereby separating contacts 1603 and 1604 and reclosing contacts 1605 of relay switch 1602. However, before opening of the switch 1602 by its associated spring, the upwardly moving beams have closed a limit switch 1616 which completes a circuit by line 1617 through the normally closed contacts 1618 of switch 1619 to connect the solenoid 1620 of a relay switch 1621 to supply lines 1504 and 1505. The contacts 1622 of the switch 1621 then close a circuit by line 1623 through line 1550 to the valve 1534 whereupon the cylinder 618 becomes operable to move the "walking-beam" conveyor 616 rearwardly until the innermost rack O will be positioned above the tracks 624.

At this point in the cyclic operation, the movement of the conveyor 616 will have actuated the switch 1619 to open the contacts 1618 and close contacts 1624 thereof. The circuit of line 1617 will accordingly be opened at the contacts 1618 to de-energize solenoid 1620 and contacts 1622 of switch 1621 will also be opened. Closure of contacts 1624 completes a circuit from source line 1504 by line 1625 through the presently closed contacts 1605 of relay 1602 to the opposed solenoid 1626 of the relay switch 1609 thereby opening the service lines 1613, 1614 and 1615 to motor 617 at contacts 1610, 1611 and 1612. Simultaneously, by branch line 1627, the solenoid 1628 of spring-biased relay switch 1629 is energized to close contacts 1630, 1631 and 1632 and complete the service of lines 1500, 1501 and 1502 to lines 1613, 1614 and 1615 thereby operating the motor 617 to lower the empty racks onto the rails in the return tunnel R. At this time, limit switch 1616 is opened. It will be appreciated that the contacts 1624 of switch 1619 remain closed thereby retaining solenoids 1626 and 1628 energized when the conveyor 616 reached the end of its above-described movement; however, when the solenoid 1601 of switch 1602 effects closure of contacts 1603 to energize the opposed solenoid 1608 of relay switch 1609, the opening of contacts 1605 disconnects line 1625 so that when the conveyor is moved in the second direction or toward the tracks 627, the switch 1619 will be released to open contacts 1624 and restore contacts 1618. During this sequence of events, a branch line 1633 is completed to a normally open manual switch 1634 for purposes to be fully disclosed.

The sequential cycling to move the loaded rack O from the tracks 624 in the transfer area F and into the annealing tunnel P; the advance of a preceding loaded rack onto the tracks 627 in the exit end of the annealing tunnel and the delivery of an empty rack O from the return tunnel R to the tracks 624 in the said transfer area will have now been accomplished. The various conveyors of the Annealing Section D accordingly will remain idle until reactivated by the delivery of another completed glazing unit into the transfer area F and the resultant operation of the limit switch 1436 as the elevator carriage ascends. This switch through line 1437, as previously mentioned, causes actuation of the timing device 1513 upon closure of the relay switch 1509, to initiate a succeeding cycle of operation for the conveyors 610, 616, 620 and 621.

In the event that the cyclic functioning of the Preheat Section B is terminated by opening of the manual switches 644 and 650 (FIG. 62) and the operation of the Sealing Section C is likewise halted, the switch 820 for the loading elevator 119 is opened. This will position the elevator carriage 140 either at the Sealing level at the conveyor 120 or, preferably, at the Return level at the exit end of the conveyor 122. Now, when the last carrier K to support a completed glazing unit has been received on the elevator carriage 601 of the elevator 121, the switches 1085 and 1338 (FIGS. 64 and 68) are opened to idle the motors 573 and 577 (FIG. 56). Upon unloading of the last unit 10 onto a rack O in the transfer area F and delivery of the empty carrier K onto the conveyor 122, operation of the elevator carriage 601 is halted when it arrives at the elevation of the conveyor 120 by opening of the switch 1319 (FIG. 69). Opening of the switch 862 (FIG. 64) will stop several motors of the return conveyor system 122 after the last empty carrier K is suitably located thereon.

Consequently, while the Preheat and Sealing sections of the sealing apparatus have been rendered idle, the several conveyors of the Annealing Section D can be repeatedly cycled until the last glazing unit 10 has been unloaded from the racks O in the area U. For this purpose, the manual switch 1634 (FIG. 70) is closed to complete the circuit of line 1633 to a repeating timer 1635. Thus upon the closure of contacts 1624 of switch 1619, the lines 1625 and 1633 activate the timing device 1635 which, at the end of a timed interval, completes a circuit by line 1636 to line 1512 and the timer 1513 thereby instituting a "closed" electrical system for operating the Annealing Section D until the control switches 1503 and 1507 are opened.

It is now believed apparent that by means of a sealing apparatus constructed in accordance with this invention, the improved method of forming a multiple glass sheet glazing unit can be efficiently and effectively carried out. Thus, the heating of pairs of glass sheets 11 and 12 in the Preheating Section B is accomplished on a substantially automatic basis until they are received in the Transfer Section E. More than this, the formation of the side walls 13, 14, 15 and 16 to provide the hermetically sealed air space 17 within the unit 10 is believed to have been clearly set forth in the substantially automatic operation of the elevator 119; the conveyor system 120 and the sealing units 430 disposed in the stations 1, 2, 3 and 4; the elevator 121 and the return conveyor system 122. As well, the automatically occurring functions of the instrumentalities on the carrier K as herein described materially add to the advantage of the sealing apparatus. The glazing unit 10 which is thereby produced in the Sealing Section C and then annealed in the Annealing Section D of the apparatus is subsequently received in the unloading area U without manual operations. The completed units are then dehydrated in the customary manner and hermetically sealed by the closure of the grommet 538 with a suitable material, as shown in FIG. 55.

It is to be understood that the form of the invention herewith shown and described is to be taken as a preferred embodiment of the same, but that various changes in the shape, size and arrangement of parts may be resorted to without departing from the spirit of the invention.

We claim:

1. In apparatus for producing all-glass multiple sheet glazing units, a sealing chamber, a plurality of carriers, conveyor means for supporting the carriers and for moving them through said sealing chamber, means on each of said carriers for supporting a pair of glass sheets in vertically disposed spaced parallel relation, said sealing chamber being provided with a plurality of sealing stations arranged in longitudinally spaced relation to one another, means in each of the sealing stations for sealing the marginal edge portions of the pair of glass sheets together, means on each of said carriers for rotating the glass sheet supporting means about a substantially horizontal axis, a source of power for driving said rotating means, actuating means carried by each of said carriers, and means adjacent each of said sealing stations for actuating said actuating means when the carrier reaches a predetermined position to effect operation of said source of power to drive said sheet support rotating means.

2. In apparatus for producing all-glass multiple sheet glazing units as claimed in claim 1, in which the glass sheet supporting means includes a pair of vacuum platens on each of said carriers, means for supporting one of the vacuum platens for limited movement toward and away from the other vacuum platen, means on the carrier for creating a vacuum in the opposed faces of the vacuum platens to support the glass sheets thereon, and vacuum for moving the first platen relative to the second platen to establish a predetermined spacing between the glass sheets.

3. In apparatus for producing all-glass multiple sheet glazing units as claimed in claim 2, in which the means for moving the first platen relative to the second platen comprises hydraulically operated means connected with said first platen, actuating means carried by the carrier, and means adjacent each of said sealing stations for actuating said actuating means when the carrier reaches a predetermined position to effect the operation of said hydraulic means.

4. In apparatus for producing all-glass multiple sheet glazing units as claimed in claim 2, in which the means for creating the vacuum in the opposed faces of the vacuum platens includes a vacuum pump connected with the first platen and a second vacuum pump connected with the second vacuum platen, means between the first vacuum pump and first platen for controlling the vacuum in the surface thereof, a second means between the second vacuum pump and the second platen for controlling the vacuum in the surface thereof, means automatically operated when the carrier reaches a predetermined position for simultaneously effecting operation of the first and second control means to produce a vacuum at the surfaces of the first and second platens, and means automatically operated when the carrier reaches a second predetermined position for effecting operation of the first control means to produce a vacuum at the surface of the first platen independently of the second platen.

5. In apparatus for producing all-glass multiple sheet glazing units as claimed in claim 4, in which means is provided between the first and second positions for actuating the second control means to release the vacuum at the face of said second vacuum platen.

6. In apparatus for producing all-glass multiple sheet glazing units as claimed in claim 2, in which the means for supporting the first vacuum platen comprises a horizontal hollow member secured at one end thereof to said platen, means for supporting the second vacuum platen in fixed position on the carrier in axial alignment with the first vacuum platen, a platform supported on the carrier for movement transversely thereof, means for rotatably mounting the hollow member on the platform, hydraulic means on the carrier for moving the platform to carry the hollow support member and first vacuum platen toward and away from the second vacuum platen, means controlling said hydraulic means, and drive means on the platform for rotating the hollow member and first vacuum platen relative to the second vacuum platen.

7. In apparatus for producing all-glass multiple sheet glazing units as claimed in claim 6, in which means is included for limiting movement of the platform in one direction to establish a predetermined distance between the first vacuum platen and the second vacuum platen.

8. In apparatus for producing all-glass multiple sheet glazing units as claimed in claim 7, in which the means for limiting the movement of the platform comprises a rod carried by the platform, a gaging element carried by said rod, and a stop member on the carrier engageable by said gaging element when said platform reaches a predetermined position.

9. In apparatus for producing all-glass multiple sheet glazing units as claimed in claim 6, in which means in provided for stopping the rotation of the hollow support member and first vacuum platen after a predetermined degree of rotation.

(References on following page)

References Cited by the Examiner

UNITED STATES PATENTS

| | | | |
|---|---|---|---|
| 1,753,560 | 4/1930 | Emmert | 214—89 |
| 2,761,249 | 9/1956 | Olson et al. | |
| 2,900,761 | 8/1959 | Clever. | |
| 2,902,181 | 9/1959 | Hauck | 214—89 |
| 2,928,158 | 3/1960 | Miller | 49—47 |
| 2,954,644 | 10/1960 | Montgomery | 65—152 X |
| 2,986,125 | 1/1961 | Cowley | 65—152 |
| 3,048,943 | 8/1962 | Davis | 65—152 |
| 3,097,943 | 7/1963 | Dean et al. | 65—58 X |

FOREIGN PATENTS

| | | |
|---|---|---|
| 203,179 | 8/1956 | Australia. |
| 215,116 | 5/1958 | Australia. |

DONALL H. SYLVESTER, *Primary Examiner.*

IVAN R. LADY, *Examiner.*

DANIEL CRUPAIN, *Assistant Examiner.*